(12) United States Patent
Cawse et al.

(10) Patent No.: US 11,881,988 B2
(45) Date of Patent: *Jan. 23, 2024

(54) BIG TELEMATICS DATA NETWORK COMMUNICATION FAULT IDENTIFICATION DEVICE

(71) Applicant: Geotab Inc., Oakville (CA)

(72) Inventors: Neil Charles Cawse, Oakville (CA); Daniel Michael Dodgson, Oakville (CA); Yi Zhao, Oakville (CA)

(73) Assignee: Geotab Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/534,642

(22) Filed: Nov. 24, 2021

(65) Prior Publication Data

US 2022/0086038 A1 Mar. 17, 2022

Related U.S. Application Data

(63) Continuation of application No. 16/509,975, filed on Jul. 12, 2019, now Pat. No. 11,223,518, which is a continuation of application No. 15/530,112, filed on Dec. 5, 2016, now Pat. No. 10,382,256, which is a continuation-in-part of application No. 14/757,112, filed on Nov. 20, 2015, now Pat. No. 10,074,220.

(51) Int. Cl.
*H04L 41/0677* (2022.01)
*H04W 52/02* (2009.01)
*G07C 5/08* (2006.01)

(52) U.S. Cl.
CPC ..... *H04L 41/0677* (2013.01); *H04W 52/0209* (2013.01); *G07C 5/0841* (2013.01); *Y02D 30/70* (2020.08)

(58) Field of Classification Search
None
See application file for complete search history.

(56) References Cited

U.S. PATENT DOCUMENTS

| | | | |
|---|---|---|---|
| 6,233,523 B1 | 5/2001 | Sood | |
| 6,611,755 B1 | 8/2003 | Coffee et al. | |
| 7,120,819 B1 * | 10/2006 | Gurer | G06F 11/2294 709/224 |
| 7,158,790 B1 | 1/2007 | Elliott | |
| 7,254,482 B2 | 8/2007 | Kawasaki et al. | |
| 7,260,153 B2 | 8/2007 | Nissani | |
| 7,551,677 B2 | 6/2009 | Crawford | |
| 7,672,674 B2 | 3/2010 | Mahany | |
| 7,742,388 B2 | 6/2010 | Shearer et al. | |

(Continued)

OTHER PUBLICATIONS

Extended European Search Report for European Application No. 16198358.0 dated Sep. 14, 2017.

(Continued)

*Primary Examiner* — David P. Merlino
(74) *Attorney, Agent, or Firm* — Wolf, Greenfield & Sacks, P.C.

(57) ABSTRACT

Apparatus, device, methods and system relating to a vehicular telemetry environment for identifying in real time unpredictable network communication faults in network zones based upon pre-processed raw telematics big data logs that may include gps data and an indication of vehicle status data, and supplemental data that may further include location data and network data.

22 Claims, 41 Drawing Sheets

(56) References Cited

U.S. PATENT DOCUMENTS

| | | |
|---|---|---|
| 8,218,477 B2 | 7/2012 | Rao |
| 8,468,057 B2 | 6/2013 | Ross et al. |
| 9,030,979 B2 | 5/2015 | Cheng et al. |
| 9,430,944 B2 | 8/2016 | Grimm et al. |
| 9,524,269 B1 | 12/2016 | Brinkmann et al. |
| 10,074,220 B2 | 9/2018 | Cawse et al. |
| 10,127,096 B2 | 11/2018 | Cawse et al. |
| 10,136,392 B2 | 11/2018 | Cawse et al. |
| 10,211,899 B1 | 2/2019 | Liu et al. |
| 10,299,205 B2 | 5/2019 | Cawse et al. |
| 10,382,256 B2 | 8/2019 | Cawse et al. |
| 10,587,366 B2 | 3/2020 | Chervyakov et al. |
| 11,132,246 B2 | 9/2021 | Cawse et al. |
| 11,140,631 B2 | 10/2021 | Cawse et al. |
| 11,151,806 B2 | 10/2021 | Cawse et al. |
| 11,212,746 B2 | 12/2021 | Cawse et al. |
| 11,223,518 B2 | 1/2022 | Cawse et al. |
| 11,431,537 B2 | 8/2022 | Khoryaev et al. |
| 2001/0041566 A1 | 11/2001 | Xanthos et al. |
| 2004/0236547 A1* | 11/2004 | Rappaport .............. G06F 30/13 703/2 |
| 2005/0060070 A1 | 3/2005 | Kapolka et al. |
| 2006/0052092 A1 | 3/2006 | Schwinke et al. |
| 2007/0111703 A1 | 5/2007 | Holland et al. |
| 2008/0086349 A1 | 4/2008 | Petrie |
| 2008/0310322 A1 | 12/2008 | Tidestav |
| 2009/0135731 A1 | 5/2009 | Secades et al. |
| 2009/0287369 A1 | 11/2009 | Nielsen |
| 2010/0039937 A1 | 2/2010 | Ramanujan et al. |
| 2011/0130905 A1 | 6/2011 | Mayer |
| 2013/0002455 A1 | 1/2013 | Koehrsen et al. |
| 2013/0013347 A1 | 1/2013 | Ling et al. |
| 2013/0096799 A1 | 4/2013 | Horne |
| 2013/0301501 A1 | 11/2013 | Olvera-Hernandez et al. |
| 2014/0067257 A1 | 3/2014 | Dave et al. |
| 2014/0162563 A1 | 6/2014 | Mastrototaro |
| 2014/0274182 A1 | 9/2014 | Menzel et al. |
| 2014/0274223 A1 | 9/2014 | Kleve et al. |
| 2014/0277831 A1 | 9/2014 | Hunt |
| 2014/0321343 A1 | 10/2014 | Gupta et al. |
| 2015/0025712 A1 | 1/2015 | Rush et al. |
| 2015/0031308 A1 | 1/2015 | Schmidt et al. |
| 2015/0170521 A1 | 6/2015 | McQuade et al. |
| 2015/0256630 A1 | 9/2015 | Hong et al. |
| 2016/0034823 A1 | 2/2016 | Farkas et al. |
| 2016/0049017 A1 | 2/2016 | Busse et al. |
| 2016/0057803 A1 | 2/2016 | Kim et al. |
| 2016/0086391 A1 | 3/2016 | Ricci |
| 2016/0088505 A1 | 3/2016 | Montemurro et al. |
| 2016/0105365 A1 | 4/2016 | Droste et al. |
| 2016/0232721 A1 | 8/2016 | Singh et al. |
| 2016/0269260 A1 | 9/2016 | Kazmi et al. |
| 2017/0031997 A1 | 2/2017 | Merg et al. |
| 2017/0032589 A1 | 2/2017 | Zagajac et al. |
| 2017/0048101 A1* | 2/2017 | Möller .................. H04B 17/14 |
| 2017/0127311 A1* | 5/2017 | Webb .................... H04W 4/00 |
| 2017/0147420 A1 | 5/2017 | Cawse et al. |
| 2017/0148231 A1 | 5/2017 | Cawse et al. |
| 2017/0149601 A1 | 5/2017 | Cawse et al. |
| 2017/0149602 A1 | 5/2017 | Cawse et al. |
| 2017/0149639 A1 | 5/2017 | Vasseur et al. |
| 2017/0150442 A1 | 5/2017 | Cawse et al. |
| 2017/0230850 A1* | 8/2017 | Blake .................. H04W 24/08 |
| 2017/0324833 A1 | 11/2017 | Douros et al. |
| 2017/0359412 A1 | 12/2017 | Haebler et al. |
| 2018/0042025 A1 | 2/2018 | Opshaug et al. |
| 2018/0089014 A1 | 3/2018 | Smith et al. |
| 2018/0092040 A1 | 3/2018 | Heiska et al. |
| 2018/0357117 A1 | 12/2018 | Cawse et al. |
| 2018/0368069 A1 | 12/2018 | Cawse et al. |
| 2019/0043275 A1 | 2/2019 | Cawse et al. |
| 2019/0230592 A1 | 7/2019 | Cawse et al. |
| 2019/0334763 A1 | 10/2019 | Cawse et al. |
| 2021/0373989 A1 | 12/2021 | Cawse et al. |
| 2021/0377867 A1 | 12/2021 | Cawse et al. |
| 2021/0407221 A1 | 12/2021 | Cawse et al. |
| 2022/0086753 A1 | 3/2022 | Cawse et al. |

OTHER PUBLICATIONS

Extended European Search Report for European Application No. 17204578.3 dated Apr. 26, 2018.

Extended European Search Report for European Application No. 17204582.5 dated Apr. 26, 2018.

Extended European Search Report for European Application No. 17204584.1 dated Apr. 26, 2018.

Extended European Search Report for European Application No. 17204590.8 dated Apr. 26, 2018.

Extended European Search Report for European Application No. 19154673.8 dated Mar. 14, 2019.

* cited by examiner

BIG TELEMATICS DATA NETWORK COMMUNICATION FAULT IDENTIFICATION DEVICE

CROSS-REFERENCE TO RELATED PATENT APPLICATION APPLICATIONS

This patent application claims the benefit under 35 U.S.C. § 120 as a continuation of U.S. application Ser. No. 16/509,975, titled "BIG TELEMATICS DATA NETWORK COMMUNICATION FAULT IDENTIFICATION DEVICE" and filed Jul. 12, 2019, which claims the benefit under 35 U.S.C. § 120 as a continuation of U.S. application Ser. No. 15/530,112, titled "BIG TELEMATICS DATA NETWORK COMMUNICATION FAULT IDENTIFICATION DEVICE" and filed Dec. 5, 2016, which is a continuation-in-part patent application to U.S. patent application Ser. No. 14/757,112, titled "BIG TELEMATICS DATA NETWORK COMMUNICATION FAULT IDENTIFICATION METHOD" and filed on Nov. 20, 2015. The entire contents of these applications are incorporated herein by reference in their entirety.

TECHNICAL FIELD OF THE INVENTION

The present invention generally relates to a big telematics data device, method and system for application in vehicular telemetry environments. More specifically, the present invention relates to a mobile device real time big telematics data network communication fault identification system.

BACKGROUND OF THE INVENTION

Vehicular Telemetry systems are known in the prior art where a vehicle may be equipped with a vehicular telemetry hardware device to monitor and log a range of vehicle parameters. An example of such a device is a Geotab™ GO device. The Geotab GO device interfaces to the vehicle through an on-board diagnostics (OBD) port to gain access to the vehicle network and engine control unit. Once interfaced and operational, the Geotab GO device monitors the vehicle bus and creates of log of raw vehicle data. The Geotab GO device may be further enhanced through a Geotab I/O expander to access and monitor other variables, sensors and devices resulting in a more complex and larger log of raw data. Additionally, the Geotab GO device may further include a GPS capability for tracking and logging raw GPS data. The Geotab GO device may also include an accelerometer for monitoring and logging raw accelerometer data. The real time operation of a plurality of Geotab GO devices creates and communicates multiple complex logs of some or all of this combined raw data to a remote site for subsequent analysis.

The data is considered to be big telematics data due to the complexity of the raw data, the velocity of the raw data, the variety of the raw data, the variability of the raw data and the significant volume of raw data that is communicated to a remote site on a timely basis. For example, on 10 Dec. 2014 there were approximately 250,000 Geotab GO devices in active operation monitoring, tracking and communicating multiple complex logs of raw telematics big data to a Geotab data center. The volume of raw telematics big data in a single day exceeded 300 million records and more than 40 GB of raw telematics big data.

The past approach for transforming the big telematics raw data into a format for use with a SQL database and corresponding analytics process was to delay and copy each full day of big telematics raw data to a separate database where the big telematics raw data could be processed and decoded into a format that could provide meaningful value in an analytics process. This past approach is resource consuming and is typically run during the night when the number of active Geotab GO devices is at a minimum. In this example, the processing and decoding of the big telematics raw data required more that 12 hours for each day of big telematics raw data. The analytics process and corresponding useful information to fleet managers performing fleet management activities is at least 1.5 days old, negatively influencing any real time sensitive fleet management decisions.

Past approaches to monitoring big time telematics data for network communication faults were previously limited due to the processing and delays in receipt of data. These data delays and a lack of augmented or supplemented data also impaired the ability to determine the location of a network communication fault based upon real time mobile device coordinates.

SUMMARY OF THE INVENTION

The present invention is directed to aspects in a vehicular telemetry environment. The present invention provides a new capability for a mobile device real time big telematics data network communication fault identification system.

According to a broad aspect of the invention, there is a telematics network communication fault identification device. The device includes at least one mobile device. The mobile device capable of communicating at least one of a signal or data or a message with a remote device. The mobile device includes an expected communication mode state for timely communication of the at least one of a signal or data or message with the remote device. The remote device including a communication fault determination state. The communication fault determination state monitors expected communication for each of the at least one mobile device and the communication fault determination state monitors actual communication for each of the at least on mobile device to determine a fault when the actual communication is different from expected communication.

The expected communication mode state may include an active mode state and an inactive mode state. The inactive mode state may further include a sleep state. The inactive mode state may further include a deep sleep state. The active mode state may further include a first timely communication period for communicating with the remote device. The sleep state may further include a second timely communication period for communicating with the remote device. The deep sleep state may further include a third timely communication period for communication the remote device. The first timely communication period may further establish a first expected communication. The second timely communication period may further establish a second expected communication. The third timely communication period may further establish a third expected communication. In an embodiment of the invention, the first expected communication is a period of 100 seconds. In an embodiment of the invention, the second expected communication is a period of 1800 seconds. In an embodiment of the invention, the third expected communication is a period of 86,400 seconds. The expected communication mode state may further include a plurality of timely communication periods. The plurality of timely communication periods may further be different time intervals. The different time intervals may further include at least one frequency of communication. In an embodiment of the invention, the at least one frequency of communication includes a period of 100 seconds. In another embodiment of the invention, the at least one frequency of communication includes a period of 1800 seconds. In another embodiment of the invention, the at least one frequency of communication includes a period of 86,400 seconds.

The mobile device may further include a positional device, the positional device for including a position indication of the mobile device with the communicating at least one of a signal or data or message wherein the remote device determines a location of a communication fault by a last known position indication of the mobile device.

The method may further include the at least one first concurrent process determining an active mode or an inactive mode by detecting a vehicle status. The detecting a vehicle status may further be based upon an ignition status of a vehicle. The vehicle status may further provide an indication to set an active mode. The active mode may further include a first timely communication period for communicating with the at least one remote device. The vehicle status may further provide an indication to set an inactive mode. The inactive mode may further include a second timely communication period for communicating with the at least one remote device. The inactive mode may further include a third timely communication period for communication with the at least one remote device. The inactive mode may further include a second expected communication and a third expected communication. In an embodiment of the invention, the second expected communication and the third expected communication may be further based upon a time of 86,400 seconds and upon exceeding the time of 86,400 seconds, transitioning the second expected communication to the third expected communication. The second concurrent process may further determine either an active mode or an inactive mode for each of the at least one mobile device. The active mode and the inactive mode may be further determined from the signal, or data, or message. An ignition status of a vehicle may be further contained in the signal, or data, or message to determine an active mode or an inactive mode. The active mode may further include a first timely communication period for communicating with the remote device. The inactive mode may further include a second timely communication period for communication with the at least one remote device. The inactive mode may further include a third timely communication period for communication with the at least one remote device.

The at least one expected communication period may be further based upon an active mode. The active mode may further include a first timely communication period for communicating with the remote device. The at least one expected communication period may be further based upon an inactive mode. The inactive mode may further include a second timely communication period for communicating with the remote device. The inactive mode may further include a third timely communication period for communicating with the remote device.

In an embodiment of the invention, the mobile device is a telemetry hardware system 30. The telemetry hardware system 30 includes a DTE telemetry microprocessor 31, a communications microprocessor 32 and memory. The communications microprocessor 32 may be enabled for cellular communications, satellite communications or another form of communications for communication with a remote device. The telemetry hardware system 30 may also include an I/O expander 50. A positional device may be integral to the telemetry hardware system 30, such as the GPS module 33 or the positional device may be accessible through the messaging interface 53 or an I/O expander 50. The telemetry hardware system 30 may also include an accelerometer 34. An example mobile device is a Geotab™ GO device.

In an embodiment of the invention, the remote device is at least one special purpose server 19 with application software. In alternative embodiments, the remote device may be one or more computing devices 20 (desktop computers, hand held device computers, smart phone computers, tablet computers, notebook computers, wearable devices and other computer devices with application software). The application may be resident with the remote device 44 or accessible through cloud computing. One example of application software is the MyGeotab™ fleet management application.

In an embodiment of the invention, the signal, data, or message is a communication that includes signals, data and/or commands. Persons skilled in the art that other forms of communication are contemplated by the inventions. In an embodiment of the invention, the data is in the form of a historical log of data and information.

In an embodiment of the invention, vehicle status is based upon vehicle data and information. An example vehicle status is the ignition status of either "ON" or "OFF". Vehicle status may also be selected from one or more other indicators of vehicle status from the vehicle data and information.

These and other aspects and features of non-limiting embodiments are apparent to those skilled in the art upon review of the following detailed description of the non-limiting embodiments and the accompanying drawings.

BRIEF DESCRIPTION OF THE DRAWINGS

Exemplary non-limiting embodiments of the present invention are described with reference to the accompanying drawings in which.

The drawings are not necessarily to scale and may be diagrammatic representations of the exemplary non-limiting embodiments of the present invention.

DETAILED DESCRIPTION

Vehicular Telemetry Environment & Infrastructure

Figure 1:
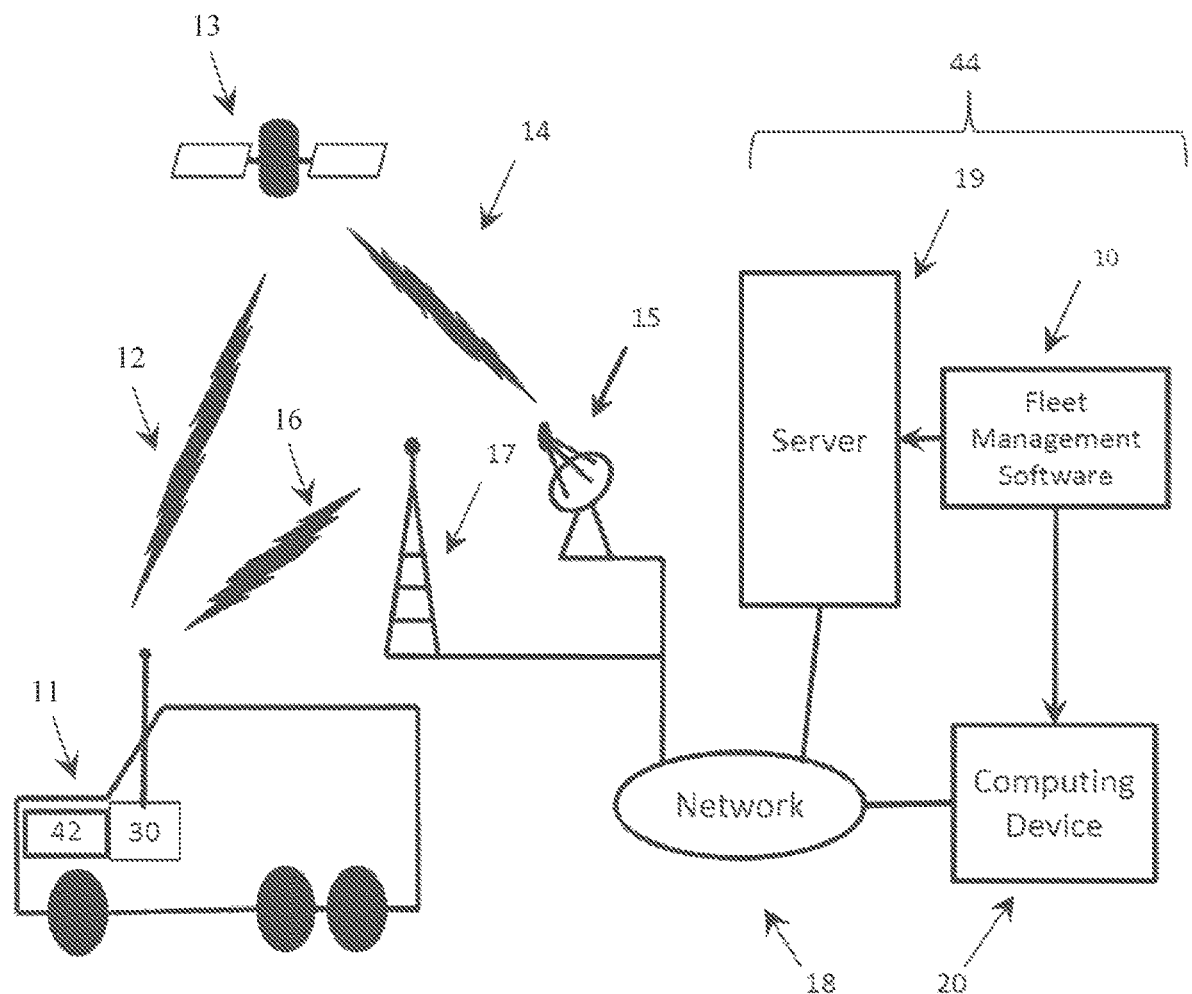
FIG. 1 is a high level diagrammatic view of a vehicular telemetry data environment and infrastructure.

Referring to FIG. 1 of the drawings, there is illustrated a high level overview of a vehicular telemetry environment and infrastructure. There is at least one vehicle generally indicated at 11. The vehicle 11 includes a vehicular telemetry hardware system 30 and a resident vehicular portion 42. Optionally connected to the telemetry hardware system 30 is at least one intelligent I/O expander 50 (not shown). In addition, there may be at least one Bluetooth module 45 (not shown) for communication with at least one of the vehicular telemetry hardware system 30 or the intelligent I/O expander 50.

The vehicular telemetry hardware system 30 monitors and logs a first category of raw telematics data known as vehicle data. The vehicular telemetry hardware system 30 may also monitor and log a second category of raw telematics data known as GPS coordinate data. The vehicular telemetry hardware system 30 may also monitor and log a third category of raw telematics data known as accelerometer data.

The intelligent I/O expander 50 may also monitor a fourth category of raw expander data. A fourth category of raw data may also be provided to the vehicular telemetry hardware system 30 for logging as raw telematics data.

The Bluetooth module 45 may also be in periodic communication with at least one Bluetooth beacon 21. The at least one Bluetooth beacon may be attached or affixed or associated with at least one object associated with the vehicle 11 to provide a range of indications concerning the objects. These objects include, but are not limited to packages, equipment, drivers and support personnel. The Bluetooth module 45 provides this fifth category of raw Bluetooth object data to the vehicular telemetry hardware system 30 either directly or indirectly through an intelligent I/O expander 50 for subsequent logging as raw telematics data.

Persons skilled in the art appreciate the five categories of data are illustrative and may further include other categories of data. In this context, a category of raw telematics data is a grouping or classification of a type of similar data. A category may be a complete set of raw telematics data or a subset of the raw telematics data. For example, GPS coordinate data is a group or type of similar data. Accelerometer data is another group or type of similar data. A log may include both GPS coordinate data and accelerometer data or a log may be separate data. Persons skilled in the art also appreciate the makeup, format and variety of each log of raw telematics data in each of the five categories is complex and significantly different. The amount of data in each of the five categories is also significantly different and the frequency and timing for communicating the data may vary greatly. Persons skilled in the art further appreciate the monitoring, logging and the communication of multiple logs or raw telematics data results in the creation of raw telematics big data.

The vehicular telemetry environment and infrastructure also provides communication and exchange of raw telematics data, information, commands, and messages between the at least one special purpose server 19, at least one computing device 20 (desktop computers, hand held device computers, smart phone computers, tablet computers, notebook computers, wearable devices and other computing devices), and vehicles 11. In one example, the communication 12 is to/from a satellite 13. The satellite 13 in turn communicates with a ground-based system 15 connected to a computer network 18. In another example, the communication 16 is to; from a cellular network 17 connected to the computer network 18. Further examples of communication devices include Wi-Fi devices and Bluetooth devices connected to the computer network 18.

Computing device 20 and special purpose server 19 with corresponding application software communicate over the computer network 18. In an embodiment of the invention, the MyGeotab™ fleet management application software runs on a special purpose server 19. The application software may also be based upon Cloud computing. Clients operating a computing device 20 communicate with the MyGeotab fleet management application software running on the special purpose server 19. Data, information, messages and commands may be sent and received over the communication environment and infrastructure between the vehicular telemetry hardware system 30 and the special purpose server 19.

Data and information may be sent from the vehicular telemetry hardware system 30 to the cellular network 17, to the computer network 18, and to the at least one special purpose server 19. Computing devices 20 may access the data and information on the special purpose servers 19. Alternatively, data, information, and commands may be sent from the at least one special purpose server 19, to the network 18, to the cellular network 17, and to the vehicular telemetry hardware system 30.

Data and information may also be sent from vehicular telemetry hardware system to an intelligent I/O expander 50, to an Iridium™ device, the satellite 13, the ground based station 15, the computer network 18, and to the at least one special purpose server 19. Computing devices 20 may access data and information on the special purpose servers 19. Data, information, and commands may also be sent from the at least one special purpose server 19, to the computer network 18, the ground based station 15, the satellite 13, an Iridium device, to an intelligent I/O expander 50, and to a vehicular telemetry hardware system.

Vehicular Telemetry Hardware System

Figure 2A:
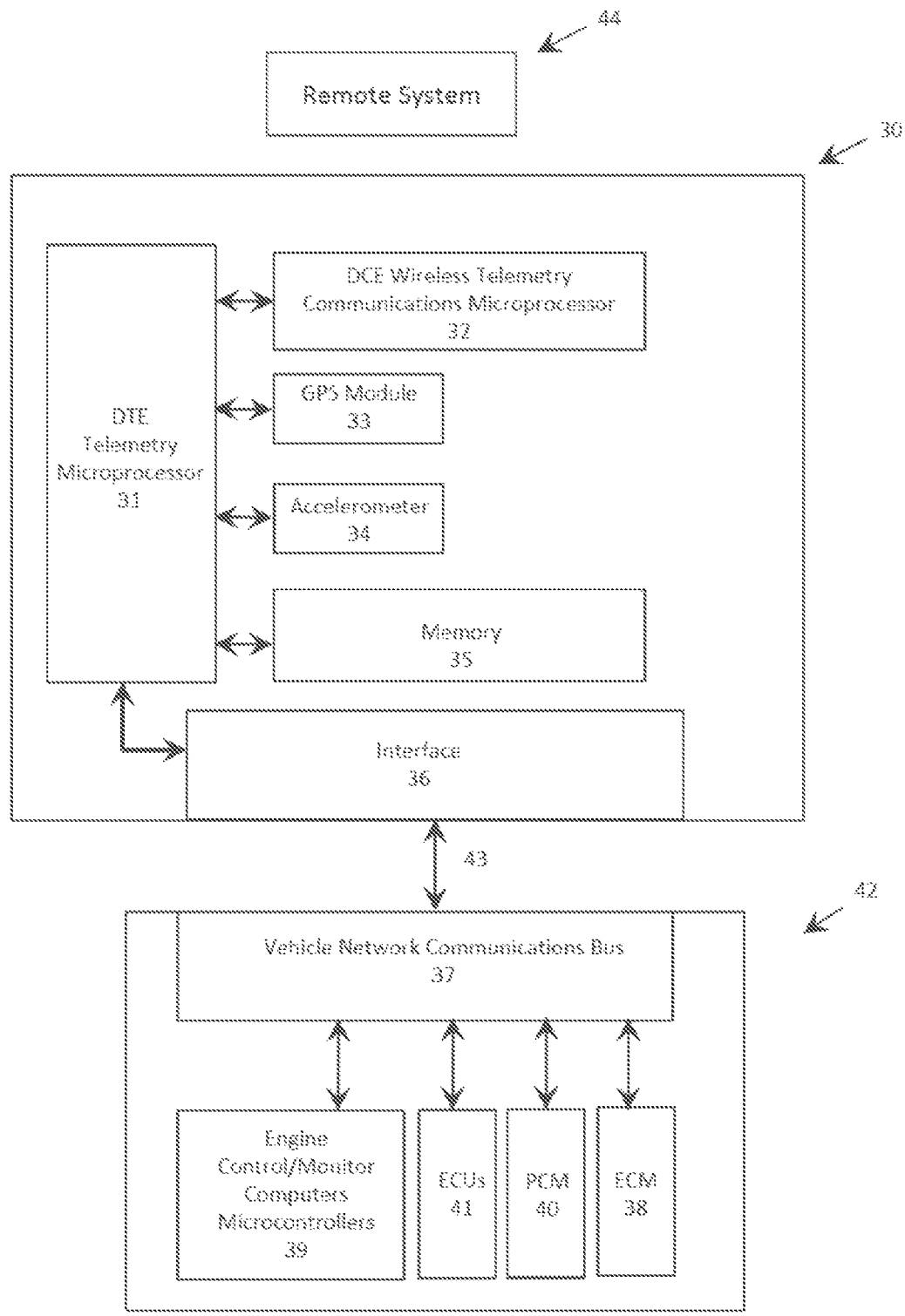
FIG. 2a is a diagrammatic view of a vehicular telemetry hardware system including an on-board portion and a resident vehicular portion.

Referring now to FIG. 2a of the drawings, there is illustrated a vehicular telemetry hardware system generally indicated at 30. The on-board portion generally includes: a DTE (data terminal equipment) telemetry microprocessor 31; a DCE (data communications equipment) wireless telemetry communications microprocessor 32; a GPS (global positioning system) module 33; an accelerometer 34; a non-volatile memory 35; and provision for an OBD (on board diagnostics) interface 36 for communication 43 with a vehicle network communications bus 37.

The resident vehicular portion 42 generally includes: the vehicle network communications bus 37; the ECM (electronic control module) 38; the PCM (power train control module) 40; the ECUs (electronic control units) 41; and other engine control/monitor computers and microcontrollers 39.

While the system is described as having an on-board portion 30 and a resident vehicular portion 42, it is also understood that this could be either a complete resident vehicular system or a complete on-board system.

The DTE telemetry microprocessor 31 is interconnected with the OBD interface 36 for communication with the vehicle network communications bus 37. The vehicle network communications bus 37 in turn connects for communication with the ECM 38, the engine control monitor computers and microcontrollers 39, the PCM 40, and the ECU 41.

The DTE telemetry microprocessor 31 has the ability through the OBD interface 36 when connected to the vehicle network communications bus 37 to monitor and receive vehicle data and information from the resident vehicular system components for further processing.

As a brief non-limiting example of a first category of raw telematics vehicle data and information, the list may include but is not limited to: a VIN (vehicle identification number), current odometer reading, current speed, engine RPM, battery voltage, engine coolant temperature, engine coolant level, accelerator peddle position, brake peddle position, various manufacturer specific vehicle DTCs (diagnostic trouble codes), tire pressure, oil level, airbag status, seatbelt indication, emission control data, engine temperature, intake manifold pressure, transmission data, braking information, mass air flow indications and fuel level. It is further understood that the amount and type of raw vehicle data and information will change from manufacturer to manufacturer and evolve with the introduction of additional vehicular technology.

Continuing now with the DTE telemetry microprocessor 31, it is further interconnected for communication with the DCE wireless telemetry communications microprocessor 32. In an embodiment of the invention, an example of the DCE wireless telemetry communications microprocessor 32 is a Leon 100 commercially available from u-blox Corporation. The Leon 100 provides mobile communications capability and functionality to the vehicular telemetry hardware system 30 for sending and receiving data to/from a remote system 44. A remote site 44 could be another vehicle or a ground based station. The ground-based station may include one or more special purpose servers connected through a computer network 18 (see FIG. 1). In addition, the ground-based station may include computer application software for data acquisition, analysis, and sending/receiving commands to/from the vehicular telemetry hardware system 30.

The DTE telemetry microprocessor 31 is also interconnected for communication to the GPS module 33. In an embodiment of the invention, an example of the GPS module 33 is a Neo-5 commercially available from u-blox Corporation. The Neo-5 provides GPS receiver capability and functionality to the vehicular telemetry hardware system 30. The GPS module 33 provides the latitude and longitude coordinates as a second category of raw telematics data and information.

The DTE telemetry microprocessor 31 is further interconnected with an external non-volatile memory 35. In an embodiment of the invention, an example of the memory 35 is a 32 MB non-volatile memory store commercially available from. Atmel Corporation. The memory 35 of the present invention is used for logging raw data.

The DTE telemetry microprocessor 31 is further interconnected for communication with an accelerometer 34. An accelerometer (34) is a device that measures the physical acceleration experienced by an object. Single and multi-axis models of accelerometers are available to detect the magnitude and direction of the acceleration, or g-force, and the device may also be used to sense orientation, coordinate acceleration, vibration, shock, and falling. The accelerometer 34 provides this data and information as a third category of raw telematics data.

In an embodiment of the invention, an example of a multi-axis accelerometer (34) is the LIS302DL MEMS Motion Sensor commercially available from STMicroelectronics. The LIS302DL integrated circuit is an ultra compact low-power three axes linear accelerometer that includes a sensing element and an IC interface able to take the information from the sensing element and to provide the measured acceleration data to other devices, such as a DTE Telemetry Microprocessor (31), through an I2C/SPI (Inter-Integrated Circuit) (Serial Peripheral Interface) serial interface. The LIS302DL integrated circuit has a user-selectable full-scale range of +−2 g and +−8 g, programmable thresholds, and is capable of measuring accelerations with an output data rate of 100 Hz or 400 Hz.

In an embodiment of the invention, the DTE telemetry microprocessor 31 also includes an amount of internal memory for storing firmware that executes in part, methods to operate and control the overall vehicular telemetry hardware system 30. In addition, the microprocessor 31 and firmware log data, format messages, receive messages, and convert or reformat messages. In an embodiment of the invention, an example of a DTE telemetry microprocessor 31 is a PIC24H microcontroller commercially available from Microchip Corporation.

Figure 2B:
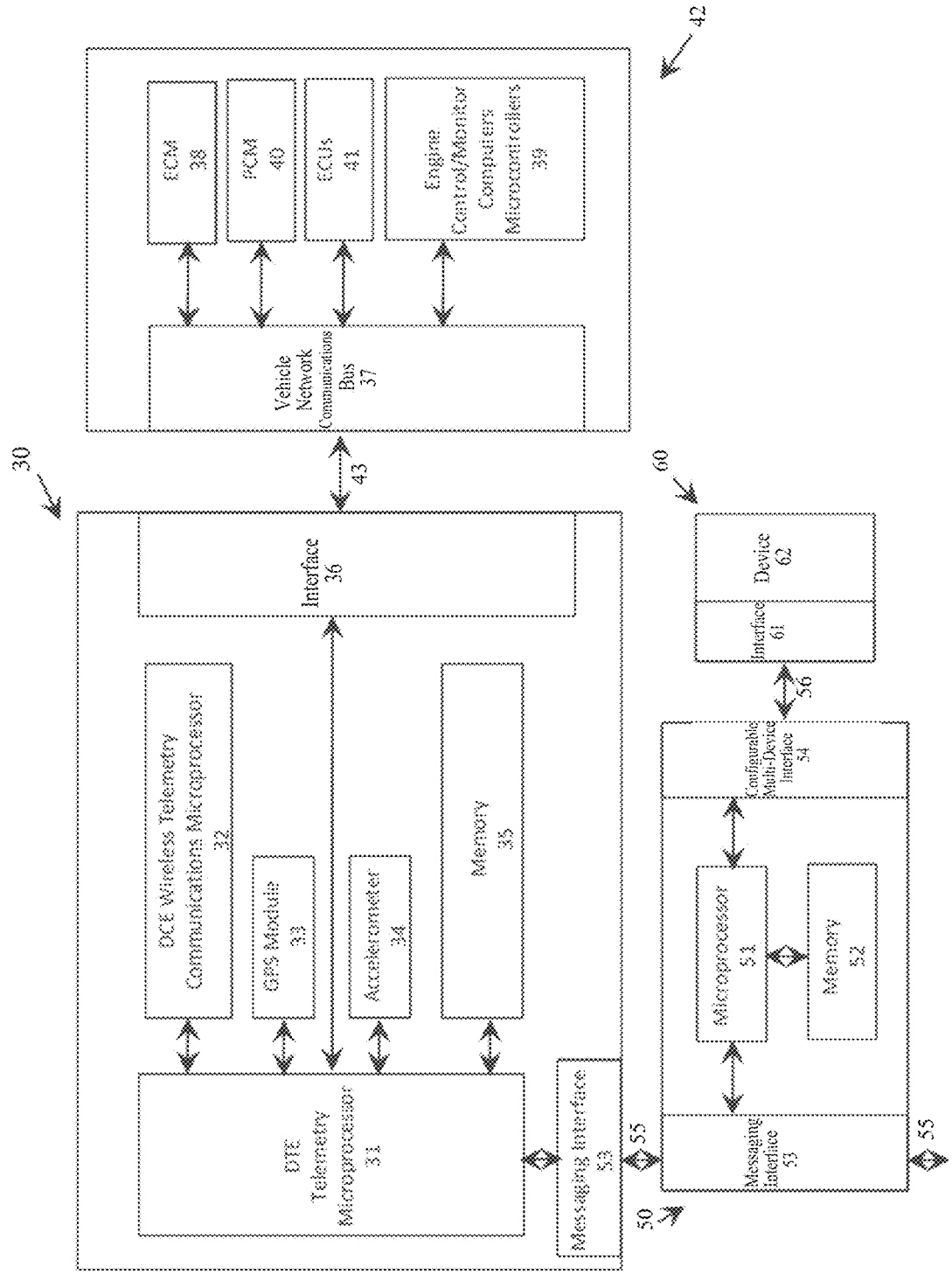
FIG. 2b is a diagrammatic view of a vehicular telemetry hardware system communicating with at least one intelligent I/O expander.

Referring now to FIG. 2b of the drawings, there is illustrated a vehicular telemetry hardware system generally indicated at 30 further communicating with at least one intelligent I/O expander 50. In this embodiment, the vehicular telemetry hardware system 30 includes a messaging interface 53. The messaging interface 53 is connected to the DTE telemetry microprocessor 31. In addition, a messaging interface 53 in an intelligent I/O expander 50 may be connected by the private bus 55. The private bus 55 permits messages to be sent and received between the vehicular telemetry hardware system 30 and the intelligent I/O expander, or a plurality of I/O expanders (not shown). The intelligent I/O expander hardware system 50 also includes a microprocessor 51 and memory 52. Alternatively, the intelligent I/O expander hardware system 50 includes a microcontroller 51. A microcontroller includes a CPU, RAM, ROM and peripherals. Persons skilled in the art appreciate the term processor contemplates either a microprocessor and memory or a microcontroller in all embodiments of the disclosed hardware (vehicle telemetry hardware system 30, intelligent I/O expander hardware system 50, Bluetooth module 45 (FIG. 2c) and Bluetooth beacon 21 (FIG. 2c)). The microprocessor 51 is also connected to the messaging interface 53 and the configurable multi-device interface 54. In an embodiment of the invention, a microcontroller 51 is an LPC1756 32 bit ARM Cortes-M3 device with up to 512 KB of program memory and 64 KB SRAM. The LP01756 also includes four UARTs, two CAN 2.0B channels, a 12-bit analog to digital converter, and a 10 bit digital to analog converter. In an alternative embodiment, the intelligent I/O expander hardware system 50 may include text to speech hardware and associated firmware (not illustrated) for audio output of a message to an operator of a vehicle 11.

The microprocessor 51 and memory 52 cooperate to monitor at least one device 60 (a device 62 and interface 61) communicating 56 with the intelligent I/O expander 50 over the configurable multi device interface 54. Data and information from the device 60 may be provided over the messaging interface 53 to the vehicular telemetry hardware system 30 where the data and information is retained in the log of raw telematics data. Data and information from a device 60 associated with an intelligent I/O expander provides the $4^{th}$ category of raw expander data and may include, but not limited to, traffic data, hours of service data, near field communication data such as driver identification, vehicle sensor data (distance, time, amount of material (solid, liquid), truck scale weight data, driver distraction data, remote worker data, school bus warning lights, and doors open/closed.

Figure 2C:
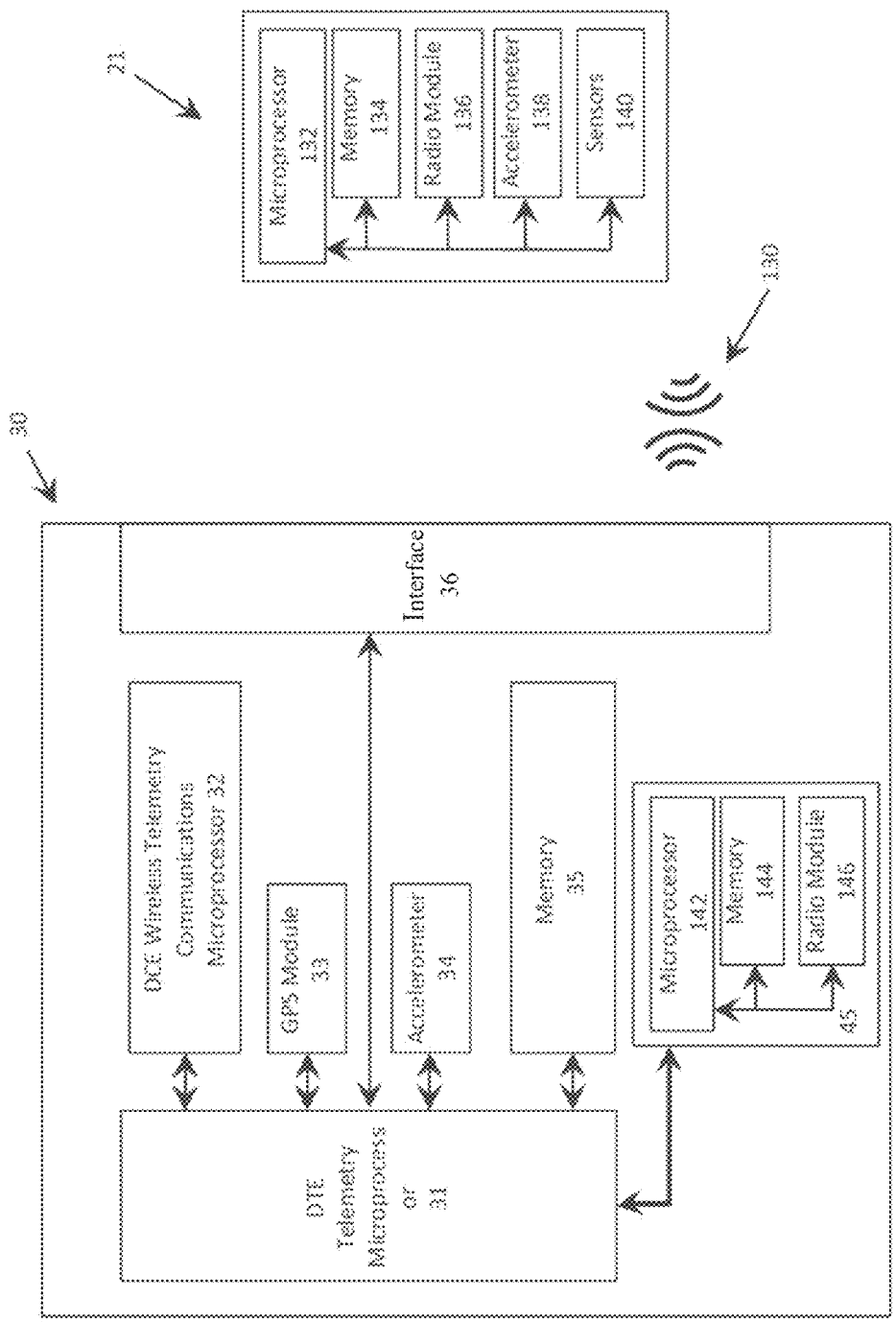
FIG. 2c is a diagrammatic view of a vehicular telemetry hardware system with an integral Bluetooth™ module capable of communication with at least one beacon module.
Figure 2D:
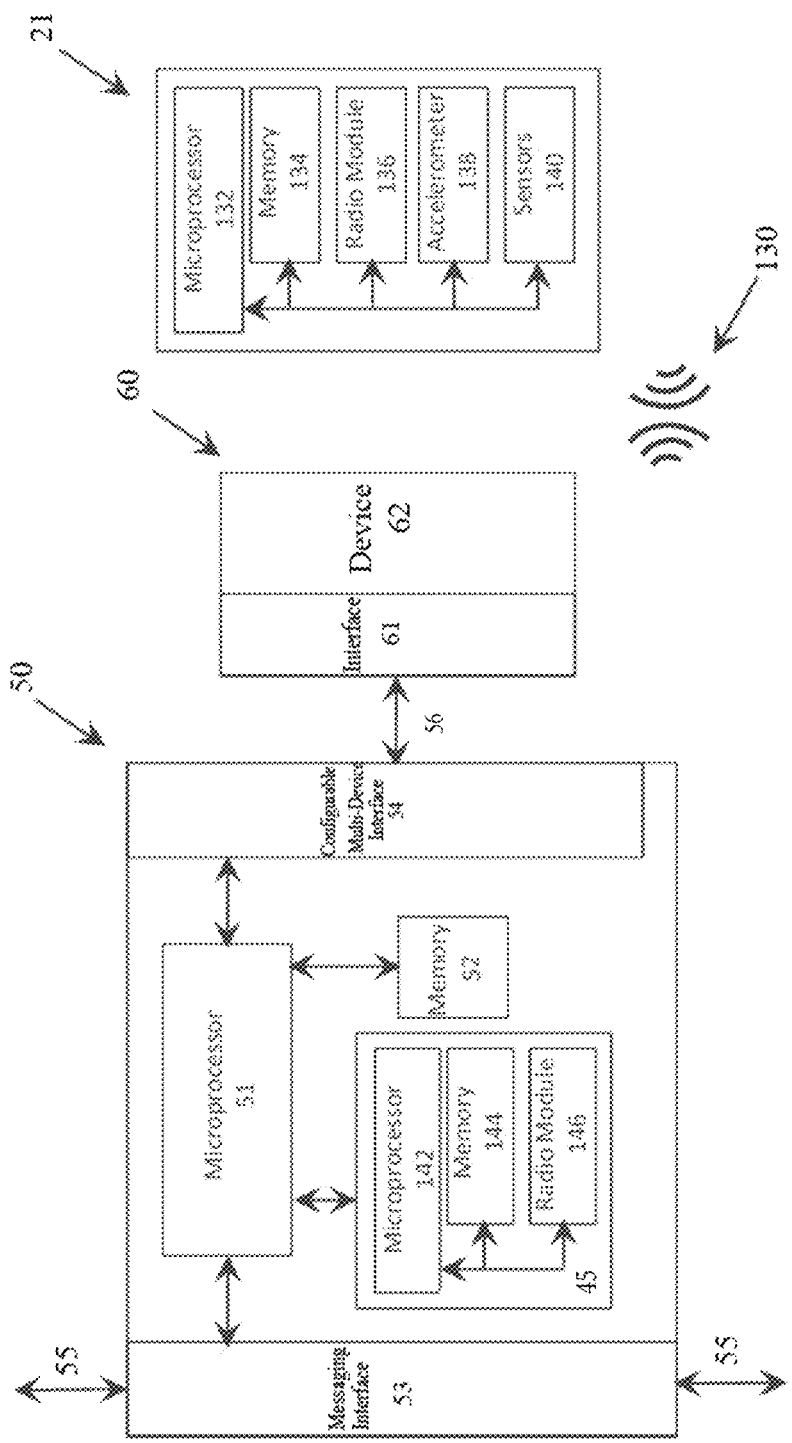
FIG. 2d is a diagrammatic view of at least on intelligent I/O expander with an integral Bluetooth module capable of communication with at least one beacon module.
Figure 2E:
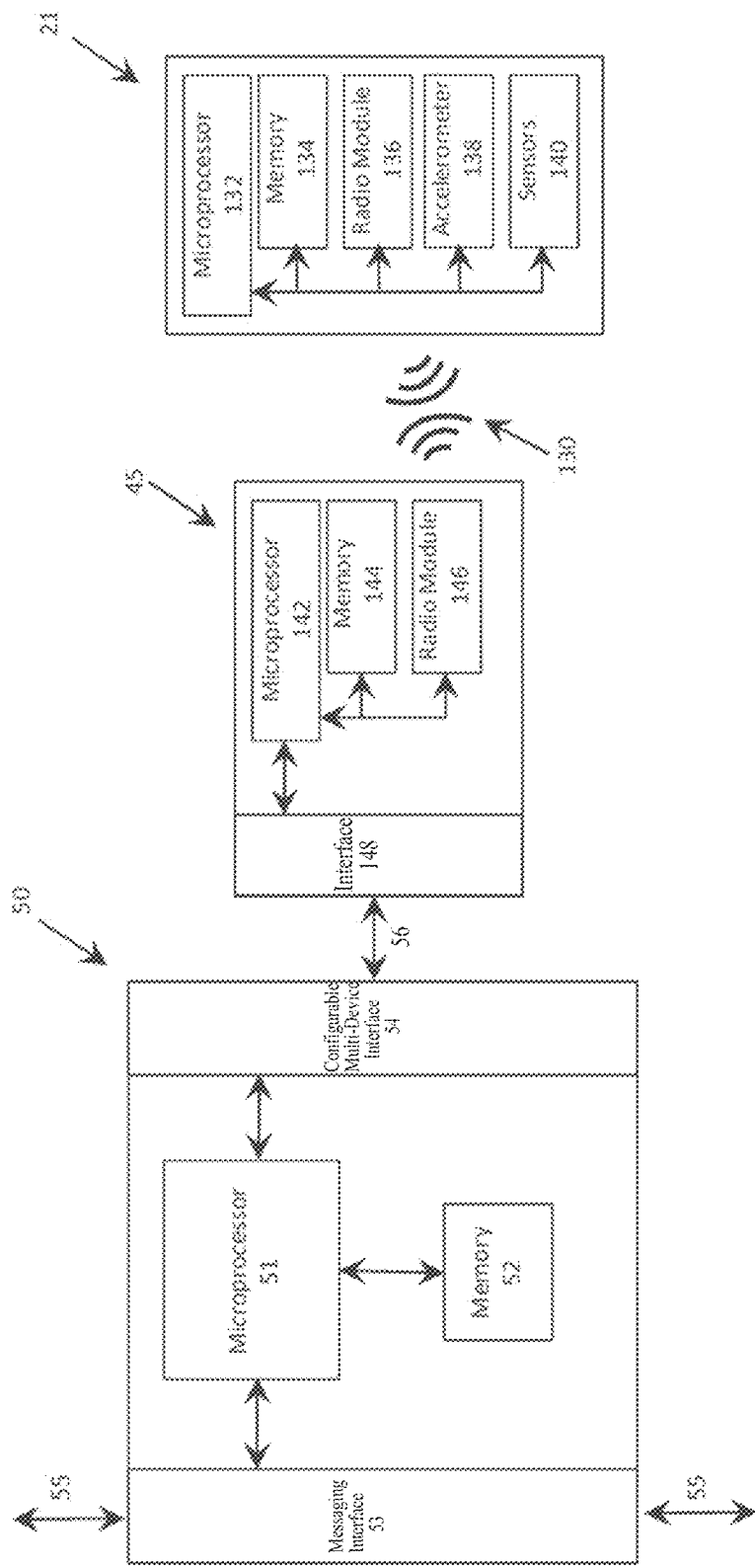
FIG. 2e is a diagrammatic view of an intelligent I/O expander and device capable of communication with at least one beacon module.

Referring now to FIGS. 2C, 2D and 2e, there are three alternative embodiments relating to the Bluetooth module 45 and Bluetooth beacon 21 for monitoring and receiving the 5th category of raw beacon data. The Bluetooth module 45 includes a microprocessor 142, memory 144 and radio module 146. The microprocessor 142, memory 144 and associated firmware provide monitoring of Bluetooth beacon data and information and subsequent communication of the Bluetooth beacon data, either directly or indirectly through an intelligent. I/O expander 50, to a vehicular telemetry hardware system 30.

In an embodiment, the Bluetooth module 45 is integral with the vehicular telemetry hardware system 30. Data and information is communicated 130 directly from the Bluetooth beacon 21 to the vehicular telemetry hardware system 30. In an alternate embodiment, the Bluetooth module 45 is integral with the intelligent I/O expander. Data and information is communicated 130 directly to the intelligent I/O expander 50 and then through the messaging interface 53 to the vehicular telemetry hardware system 30. In another alternate embodiment, the Bluetooth module 45 includes an interface 148 for communication 56 to the configurable multi-device interface 54 of the intelligent I/O expander 50. Data and information is communicated 130 directly to the Bluetooth module 45, then communicated 56 to the intelligent I/O expander and finally communicated 55 to the vehicular telemetry hardware system 30.

Data and information from a Bluetooth beacon 21 provides the 5th category of raw telemetry data and may include data and information concerning an object associated with a Bluetooth beacon 21. This data and information includes, but is not limited to, object acceleration data, object temperature data, battery level data, object pressure data, object luminance data and user defined object sensor data. This 5th category of data may be used to indicate damage to an article or a hazardous condition to an article.

Vehicular Telemetry Analytical Environment

Figure 3:
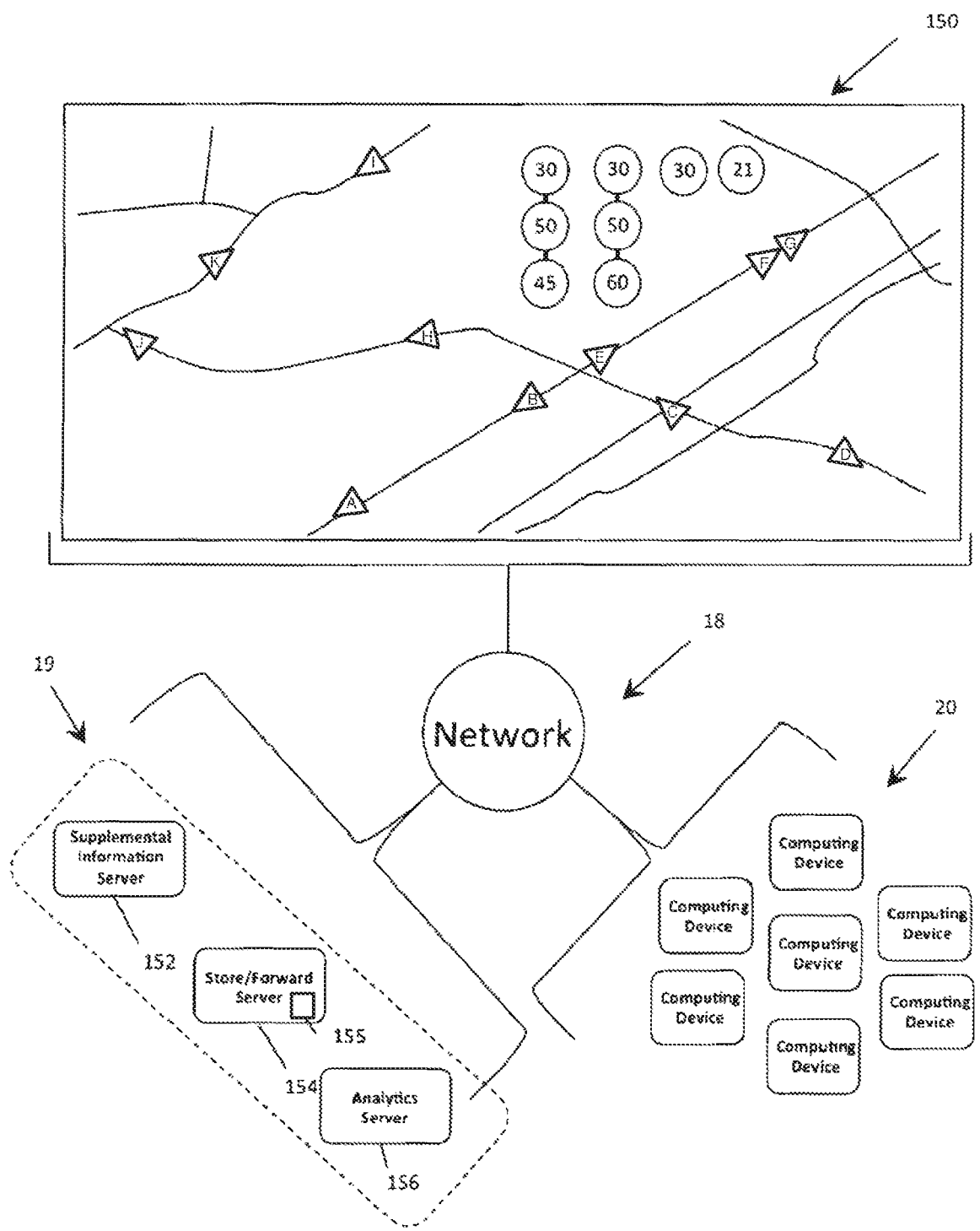
FIG. 3 is a diagrammatic view of a vehicular telemetry analytical environment including a network, mobile devices, servers and computing devices.
Figure 4:
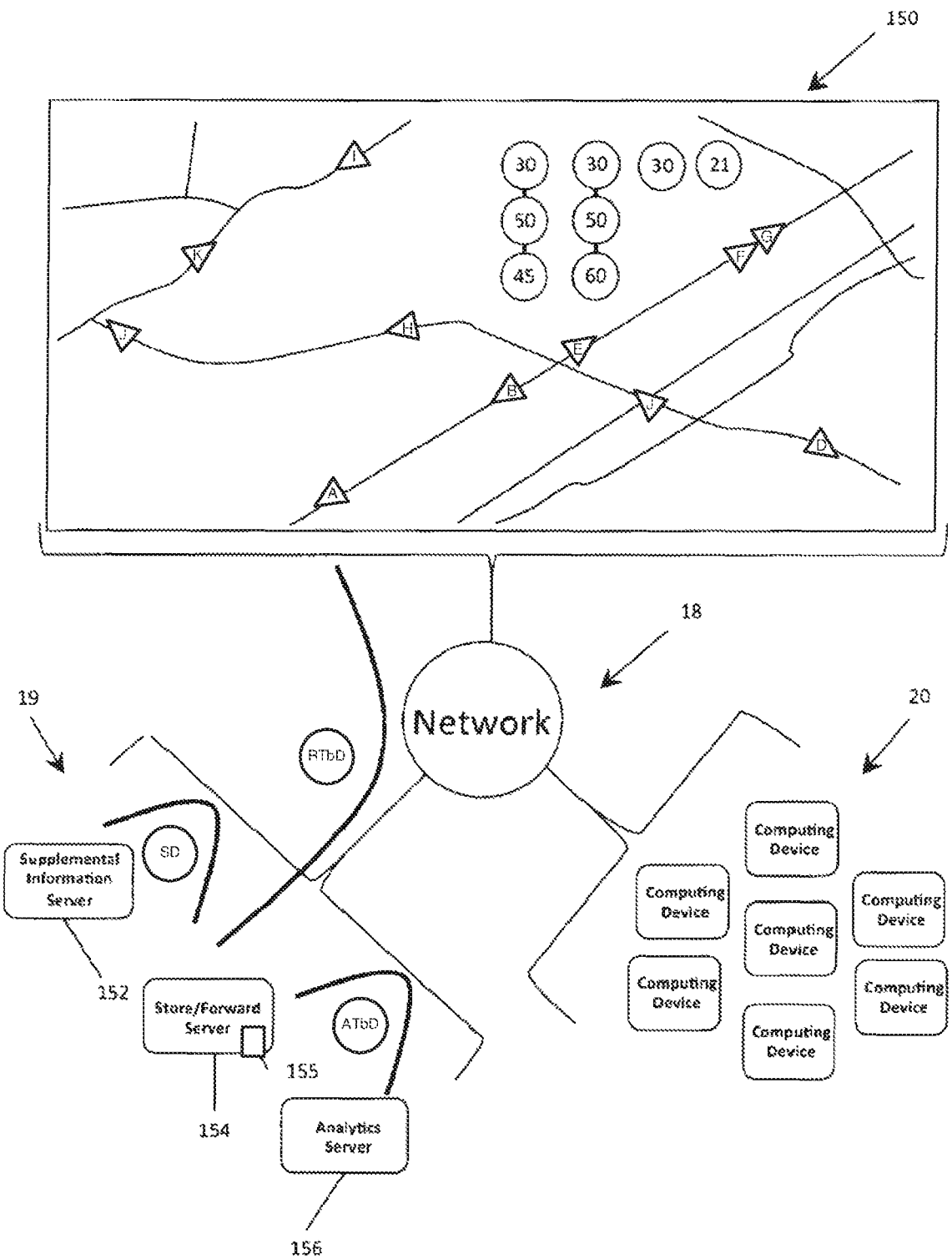
FIG. 4 is a diagrammatic view of a vehicular telemetry network illustrating raw telematics big data flow between the mobile devices and servers.
Figure 5:
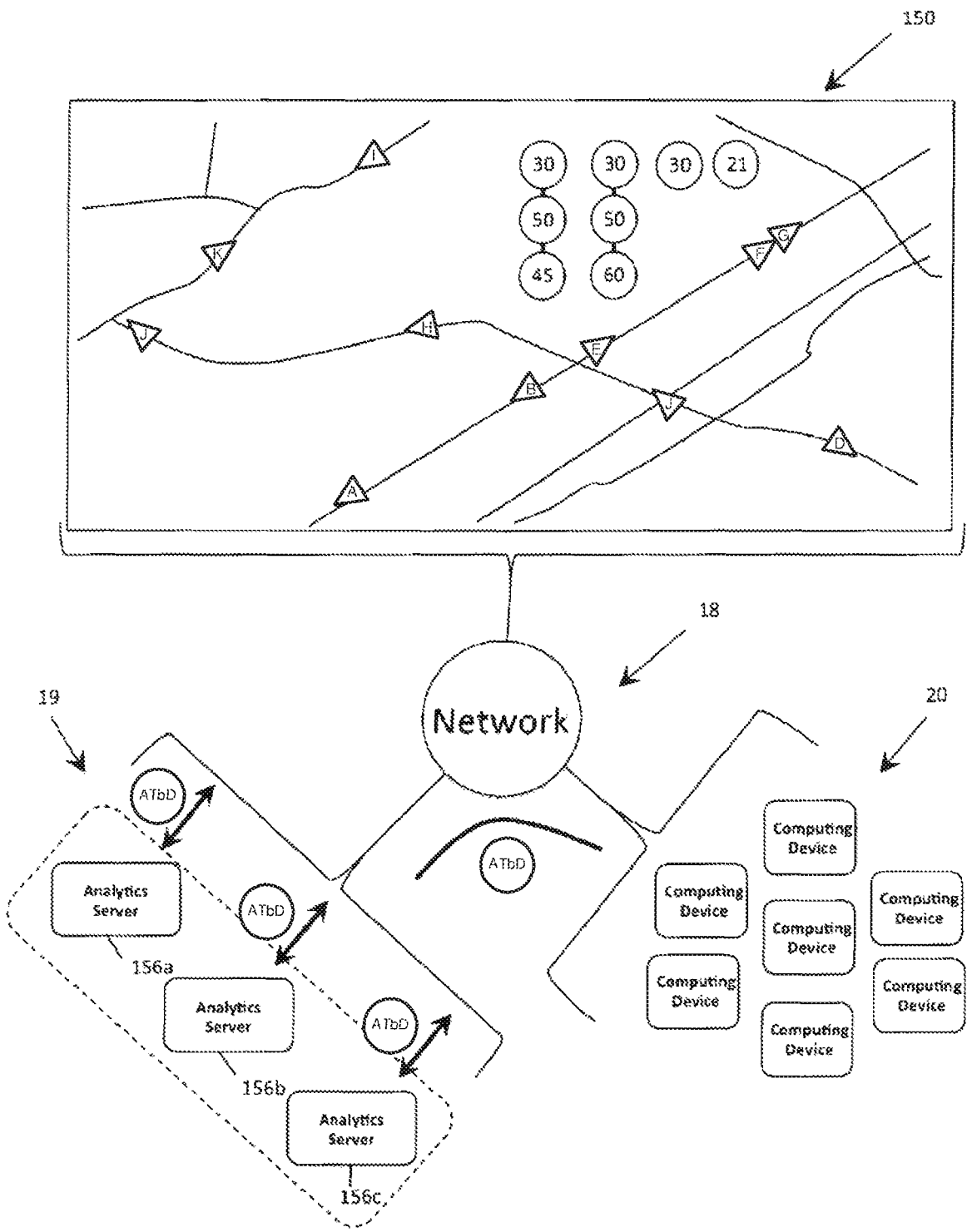
FIG. 5 is a diagrammatic view of a vehicular telemetry network illustrating analytical big telematics data flow between the servers and computing devices.

Referring now to FIGS. 3, 4 and 5, the vehicular telemetry analytical environment is further described. The map 50 illustrates a number of vehicles 11 (A through K) operating in real time. For example, Geotab presently has approximately 500,000 Geotab GO devices operating in 70 countries communicating multiple complex logs of raw telematics data to the special purpose server 19. Each of the vehicles 11 has at least a vehicular telemetry hardware system 30 installed and operational with the vehicle 11. Alternatively, some or all of the vehicles 11 may further include an intelligent I/O expander 50 communicating with a vehicular telemetry hardware system 30. The intelligent I/O expander 50 may further include devices 50 communicating with the intelligent I/O expander 50 and vehicular telemetry hardware system 30. Alternatively, a Bluetooth module 45 may be included with one of the vehicular telemetry hardware system 30, the device 60, or the intelligent I/O expander 50. When a Bluetooth module 45 is included, then Bluetooth beacons 21 may further communicate data with the Bluetooth module 45. Collectively, these alternative embodiments and different configurations of specialized hardware generate in real time the raw telematics big data. The vehicular telemetry hardware system 30 is capable to communicate the raw telematics big data over the network 18 to other special purpose servers 19 and computing devices 20. Communication of the raw telematics big data may occur at pre-defined intervals, Communication may also be triggered because of an event such as an accident. Communication may be periodic or aperiodic. Communication may also be further requested by a command sent from a special purpose server 19 or a computing device 20. Each vehicle 11 will provide a log of category 1 raw data through the vehicular telemetry hardware system 30. Then, dependent upon the specific configuration previously described, each vehicle 11 may further also include in a log, at least one of category 2, category 3, category 4 and category 5 raw telematics data through the vehicular telemetry hardware system 30.

A number of special purpose servers 19 are also part of the vehicular telemetry analytical environment and communicate over the network 18. The special purpose servers 19 may be one server, more than one server, distributed, Cloud based or portioned into specific types of functionality such as a supplemental information server 52, external third party servers, a store and forward server 54 and an analytics server 56. Computing devices 20 may also communicate with the special purpose servers 19 over the network 18.

In an embodiment of the invention, the logs of raw telematics data are communicated from a plurality of vehicles in real time and received by a server 54 with a store and forward capability as raw telematics big data (RTbD). In an embodiment of the invention, an analytical telematics big data constructor 55 is disposed with the server 54. The analytical telematics big data constructor 55 receives the raw telematics big data (RTbD) either directly or indirectly from the server 54. The analytical telematics big data constructor 55 has access to supplemental data (SD) located either directly or indirectly on a supplemental information server 52. Alternatively, the supplemental data (SD) may be disposed with the server 54. The analytical telematics big data constructor 55 transforms the raw telematics big data (RTbD) into analytical telematics big data (ATbD) for use with a server 56 having big data analytical capability 56. An example of such capability is the Google™ BigQuery technology. Then, computing devices 20 may access the analytical telematics big data (ATbD) in real time to perform fleet management queries and reporting. The server 56 with analytic capability may be a single analytics server or a plurality of analytic servers 56a, 56b, and 56c.

One example of transforming the raw telematics big data (RTbD) into analytical telematics big data (ATbD) is for performing queries and reporting concerning a mobile device communication fault with respect to a communications network. The raw telematics big data (RTbD) contains at least one GPS location of the mobile device and associated vehicle (latitude and longitude information). Supplemental information in the form of supplemental data (SD) may then add a particular location of the vehicle (road or street or address) on a map as illustrated in FIG. 4 with respect to the vehicle icons A through K inclusive. In addition, the supplemental data (SD) may also be applied to illustrate different communication zones or communication areas 51 on the map 50. This permits a correlation between a vehicle or mobile device location on the map with respect to the communication zone or area 51. Should a mobile device have a communication problem, the communication zone or area 51 may be identified from an analysis of the big data.

Analytical Telematics Big Data Constructor

Figure 6A:
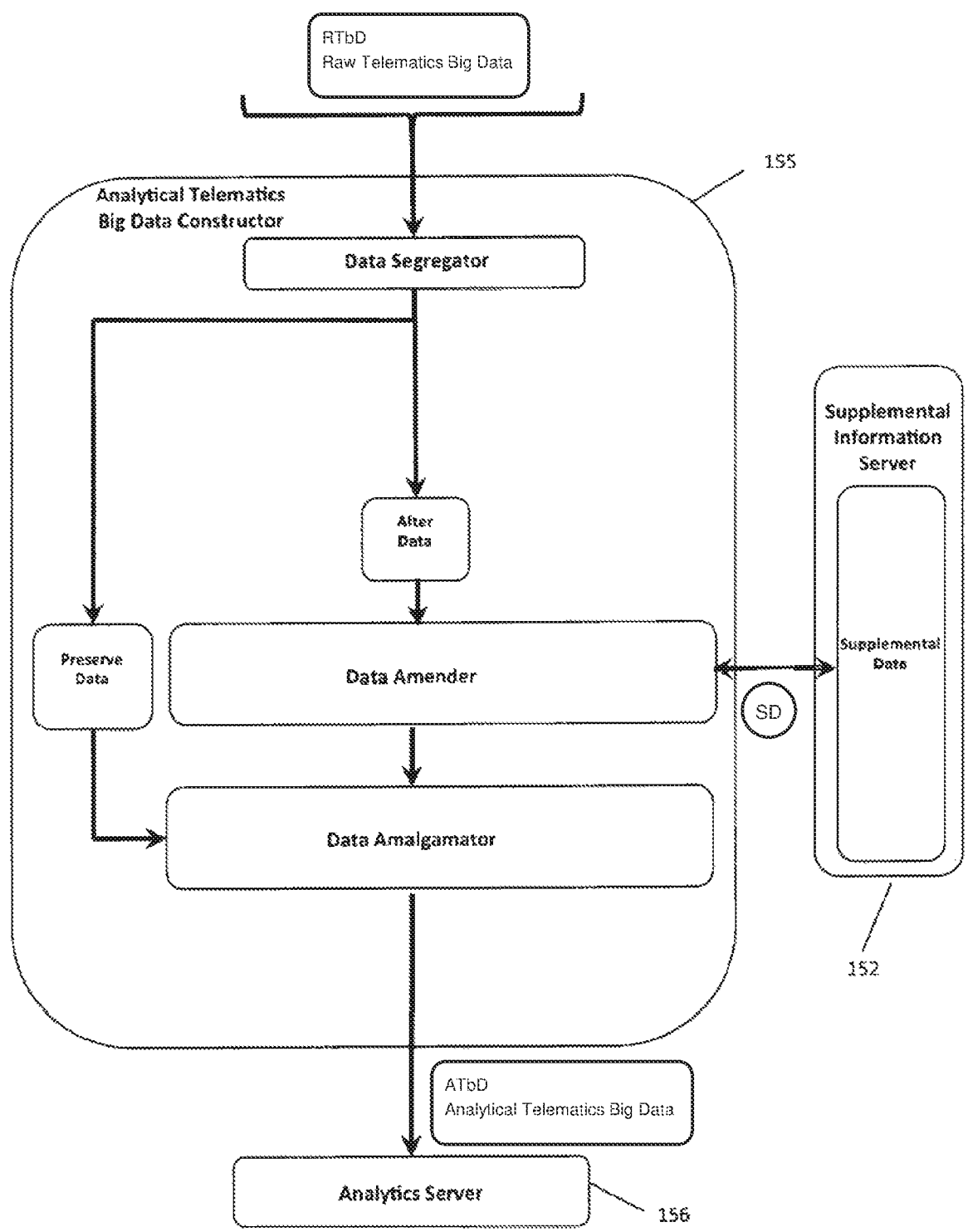
FIG. 6a is a diagrammatic representation of an embodiment of the analytical big telematics data constructor.

Referring now to FIG. 6a, an embodiment of the analytical telematics big data constructor 55 is described. Persons skilled in the art appreciate that the analytical telematics big data constructor 55 may be a stand-alone device with a microprocessor, memory, firmware or software with communications capability. Alternatively, the analytical telematics big data constructor 55 may be integral with a special purpose server, for example a store and forward server 54. Alternatively, the analytical telematics big data constructor 55 may be associated or integral with a vehicle telemetry hardware system 30. Alternatively, the functionality of the analytical telematics big data constructor 55 may be a Cloud based resource. Alternatively, there may be one or more analytical telematics big data constructors 55 for transforming in real time the raw telematics big data (RTbD) into analytical telematics big data (ATbD).

The analytical telematics big data constructor 55 receives in real time the raw telematics big data (RTbD) into a data segregator. The raw telematics big data (RTbD) is a mixed log of raw telematics data and includes category 1 raw vehicle data and at least one of category 2, category 3, category 4 or category 5 raw telematics data. Persons skilled in the art appreciate there may be more or less than five categories of raw telematics data. The data segregator processes each log of raw telematics data and identifies or separates the data into preserve data and alter data in real time. This is performed on a category-by-category basis, or alternatively, on a sub-category basis. The preserve data is provided in the raw format to a data amalgamator. The alter data is provided to a data amender. The data amender obtains supplemental data (SD) to supplement and amend the alter data with additional. information. The supplemental data (SD) may be resident with the analytical telematics big data constructor 55 or external, for example located on at least one supplemental information server 52, or located on at least one store and forward server 54 or in the Cloud and may further be distributed. The data amender then provides the alter data and the supplemental data to the data amalgamator. The data amalgamator reassembles or formats the preserve data, alter data and supplemental data (SD) to construct the analytical telematics big data (ATbD) in real time. The analytical telematics big data (ATbD) may then be communicated in real time, or streamed in real time, or stored in real time for subsequent real time fleet management analytics. In an embodiment of the invention, the analytical telematics big data (ATbD) is communicated and streamed in real time to an analytics server 56 having access to the Google BigQuery technology.

Figure 6B:
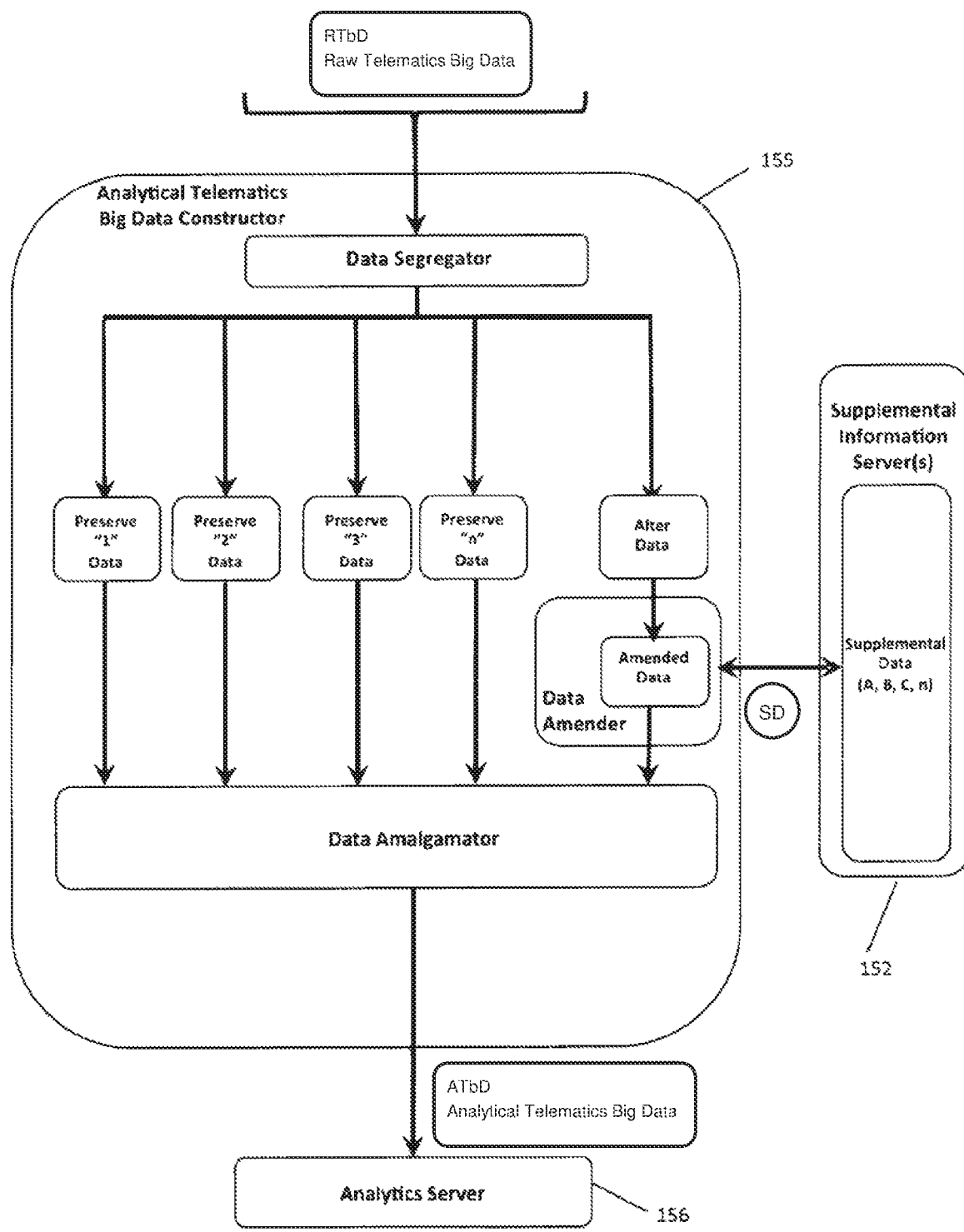
FIG. 6b is a diagrammatic representation of an embodiment of the analytical big telematics data constructor illustrating a plurality of preserve data type.

Referring now to FIG. 6*b,* another embodiment of the analytical telematics big data constructor 55 is described. In this embodiment, the data segregator process the raw telematics big data (RTbD) into a plurality of distinct data (1, 2, 3, n) types or groups based upon the categories. The plurality of preserve data is then provided to the data amalgamator for assembly with the amended data for assembly into the analytical telematics big data (ATbD).

Figure 6C:
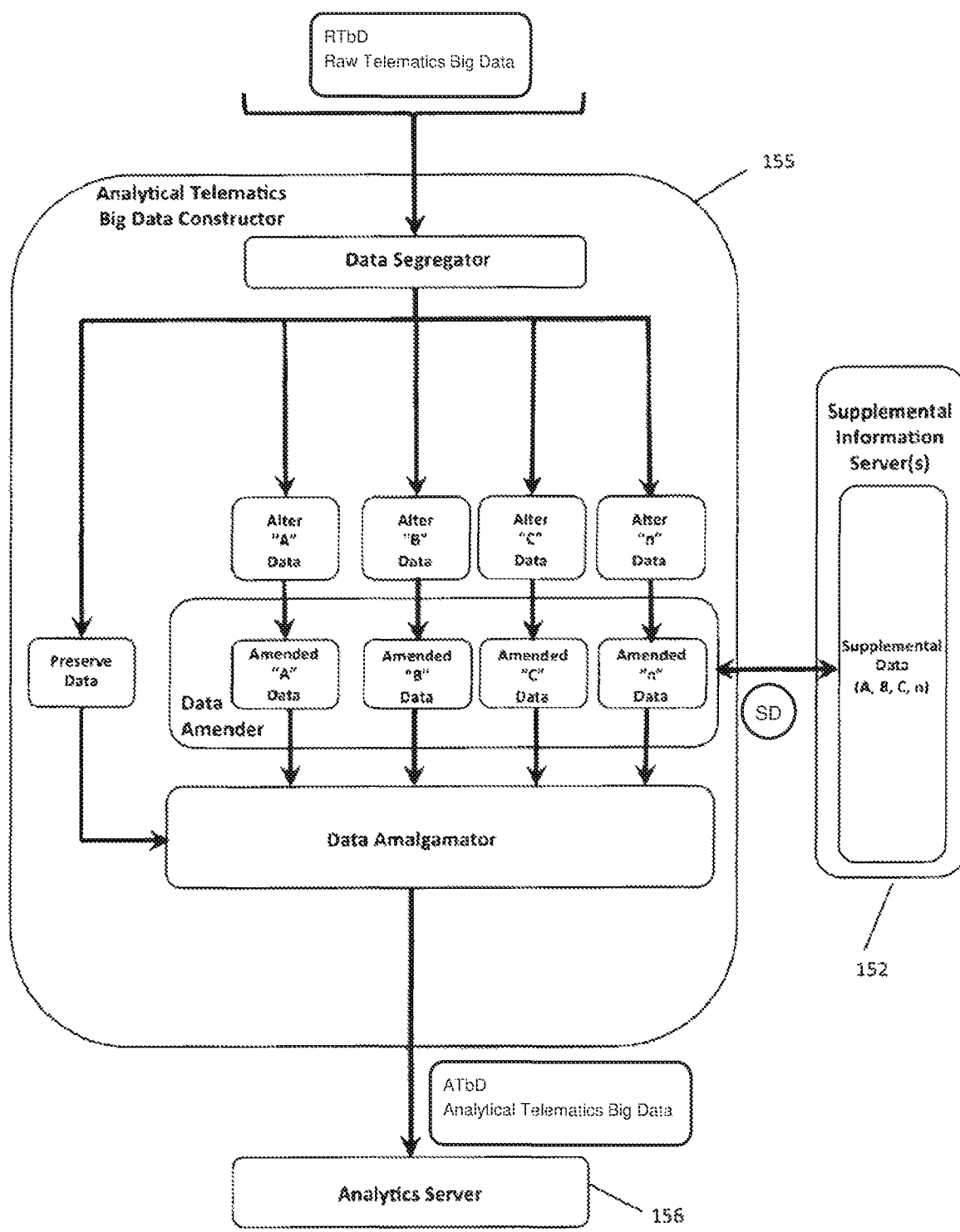
FIG. 6c is a diagrammatic representation of another embodiment of the analytical big telematics data constructor further illustrating a plurality of alter data and amended data types.

Referring now to FIG. 6*c,* another embodiment of the analytical telematics big data constructor 55 is described. In this embodiment the data segregator processes the raw telematics big data (RTbD) into preserve data (category 1) and a plurality of distinct alter data (A, B, C, n) types or groups based upon the categories (2, 3, 4 and 5). For example, one category may be engine data that is in a machine format. This machine format may be translated into a human readable format. Another example may be another category of GPS data in a machine format of latitude and longitude coordinates. This different machine format may be augmented with human readable information. The alter data types are provided to the data amender and the data amender obtains a plurality of corresponding supplemental data (SD) types (A, B, C, n). The data amender then amends the alter data types with the corresponding supplemental data types. The preserve data and the plurality of amended data is provided to the data amalgamator for assembly into the analytical telematics big data (ATbD).

Persons skilled in the art appreciate that there may be one preserve data, one alter data, at least one preserve data, at least one alter data in different combinations between the data segregator and data amalgamator.

Analytical Telematics Big Data Constructor and Active Buffers

Figure 7A:
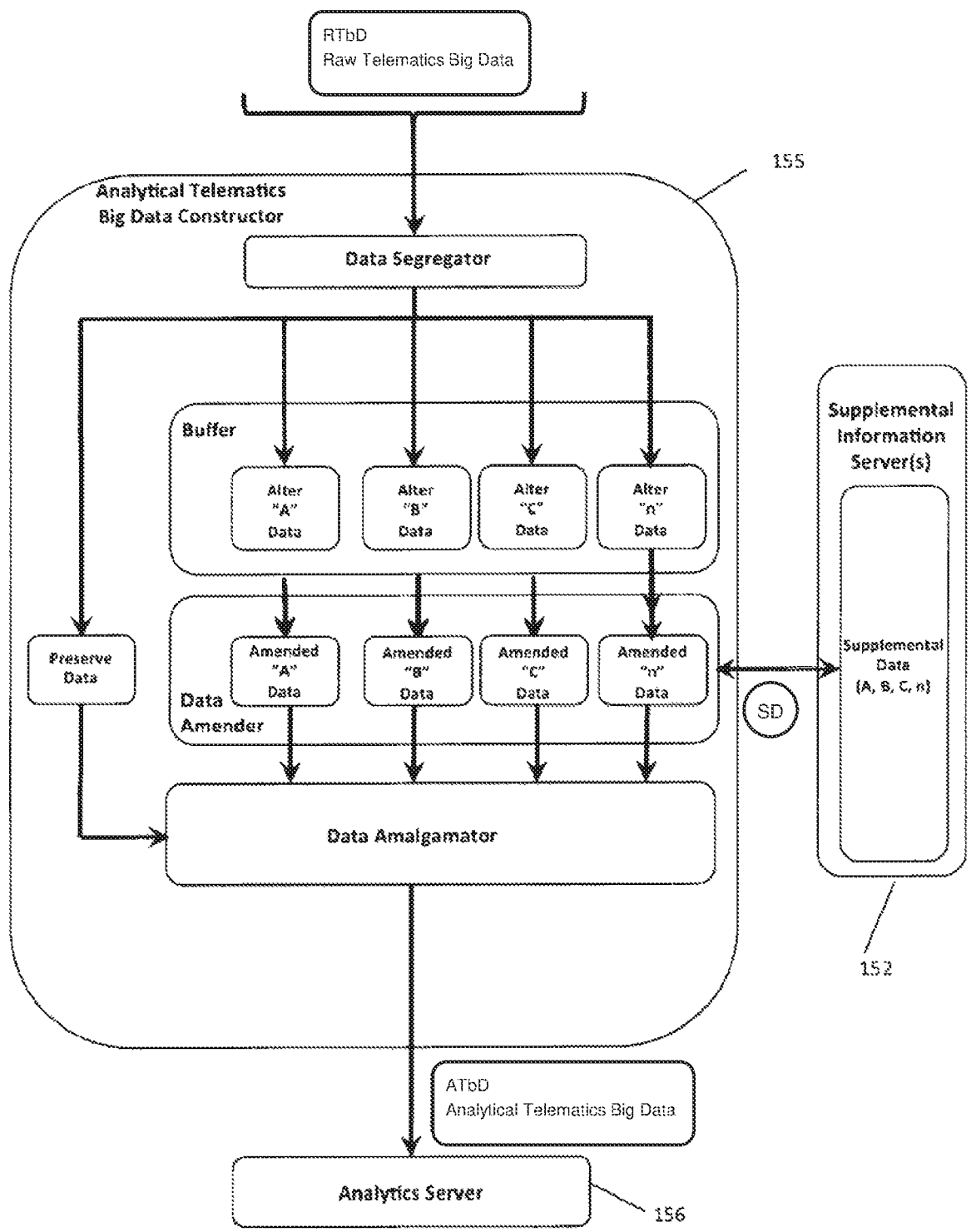
FIG. 7a is a diagrammatic representation of another embodiment of the analytical big telematics data constructor further illustrating a first buffer to accommodate the data amender and receipt of the raw telematics big data and the supplemental data.

Another embodiment of the invention including at least one active buffer or blocking queue is described. with reference to FIGS. 7*a,* 7*b,* and 7*c.* A first active buffer (see FIG. 7*a*) may be disposed with the analytical telematics big data constructor 55. The first active buffer may temporally retain at least one alter data. In an embodiment of the invention, the first active buffer is disposed intermediate the data segregator and data amalgamator. The first active buffer assists the analytical telematics big data constructor 55. For example, the processing of the raw telematics big data (RTbD) in the data segregator may be at a more constant rate in contrast to the processing of the alter data and supplemental data in the data amender. When a difference in processing rates occurs, or differences in timing, the first active buffer may smooth intermittent heavy data loads and minimize any impact of peak demand on availability and responsiveness of the analytical telematics big data constructor 55 and external services and supplemental data acquisition.

Figure 7B:
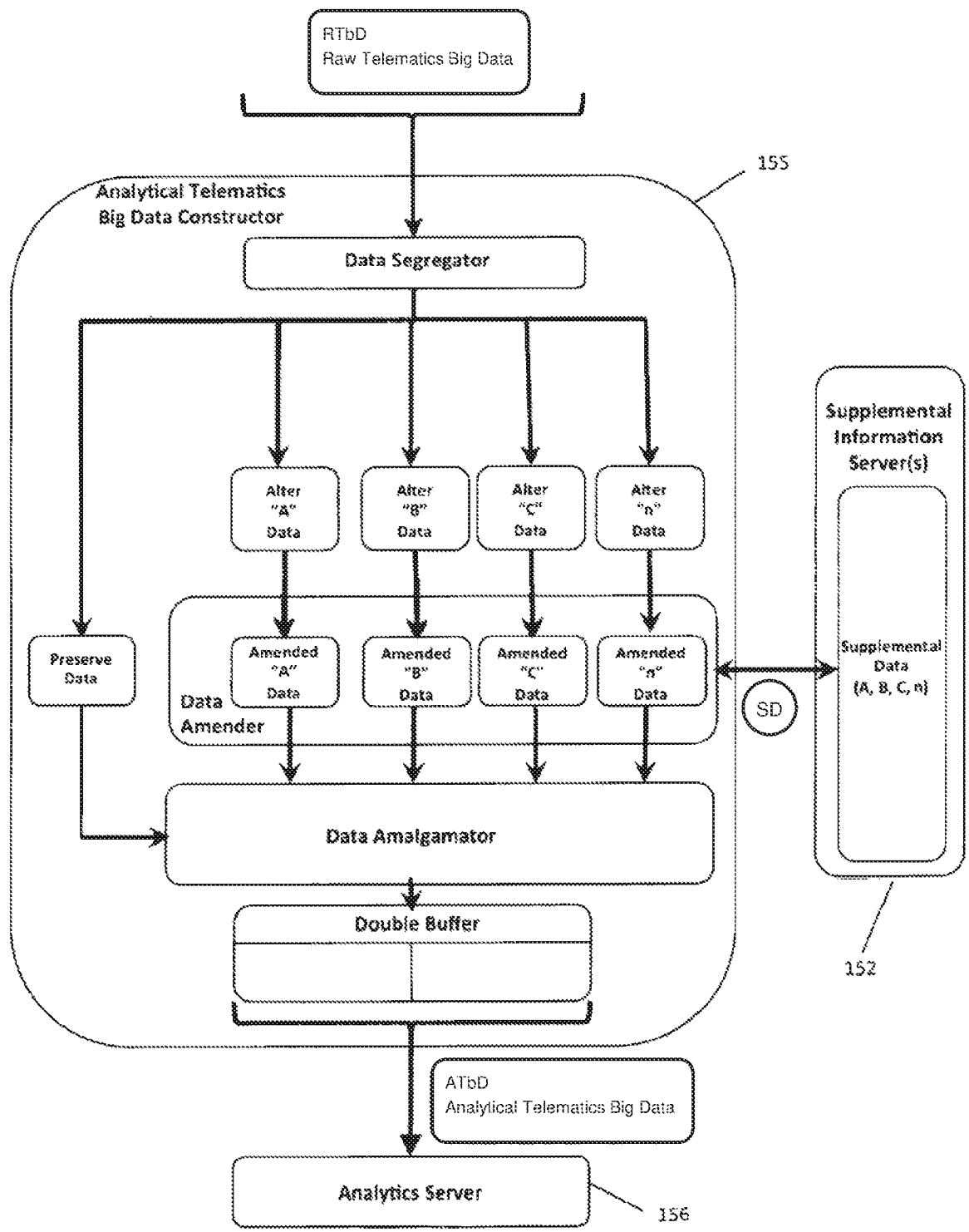
FIG. 7b is a diagrammatic representation of another embodiment of the analytical big telematics data constructor further illustrating a second buffer to accommodate a delay or errors in data flow through the analytical big telematics data constructor.

Alternatively, a second active double buffer or double blocking queue (see FIG. 7*b*) may also be disposed with the analytical telematics big data constructor 55. The second active double buffer may temporally retain the analytical telematics big data (ATbD). This may occur when a communication or streaming request fails due to either network issues or exceptions with the analytics server 56. The analytical telematics big data (ATbD) is held in the second active double buffer such that the data is available and communicated successfully to the analytics server 56 in a real time order and sequence. In an embodiment of the invention, the second active double buffer is disposed after the data amalgamator.

Figure 7C:
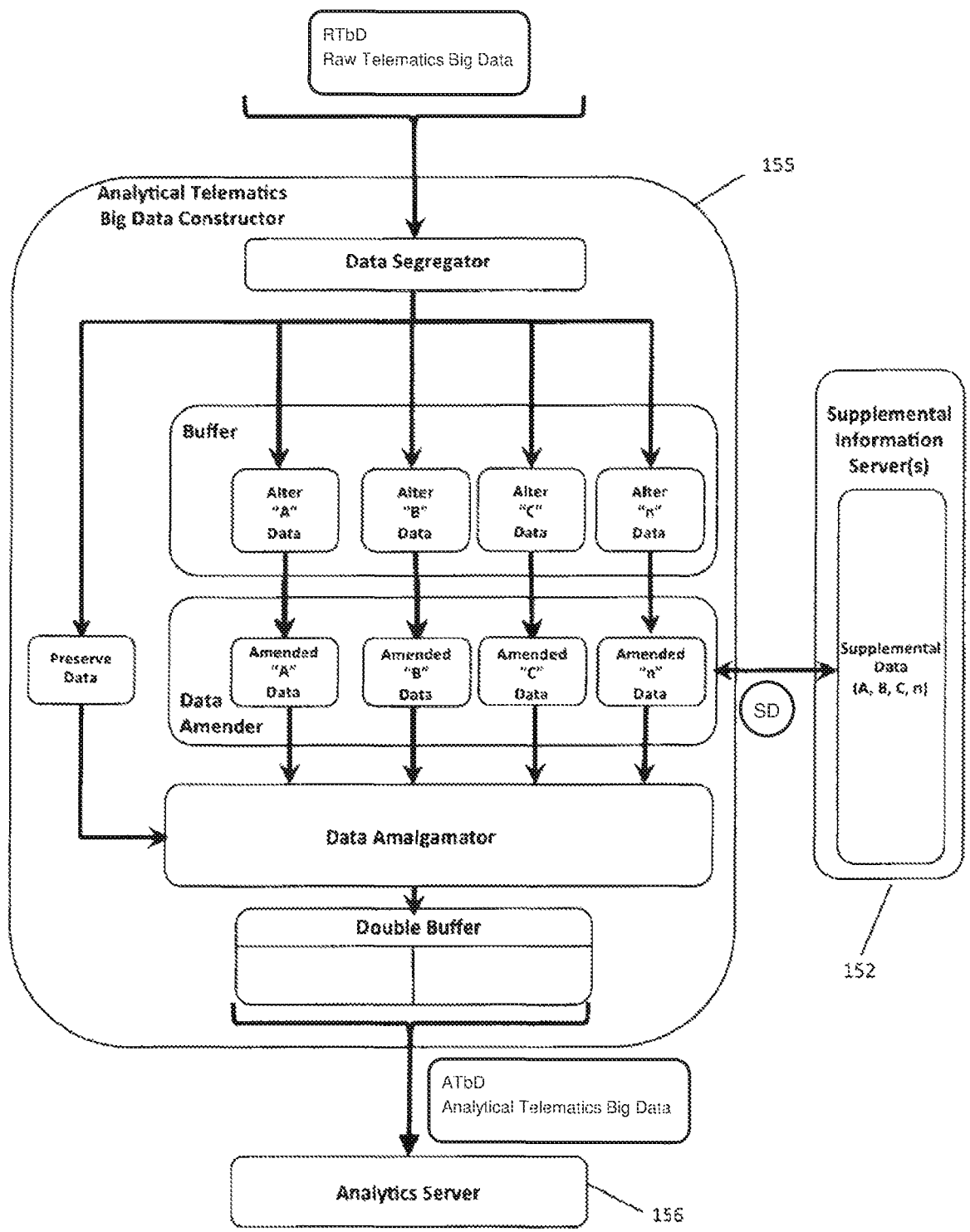
FIG. 7c is a diagrammatic representation of another embodiment of the analytical big telematics data constructor further illustrating a combination of the first and second buffer.

Alternatively, another embodiment with active buffers is illustrated in FIG. 7*c* and includes both the first active buffer and the second active double buffer.

Supplemental Data, Translation Data & Augmentation Data

Figure 8A:
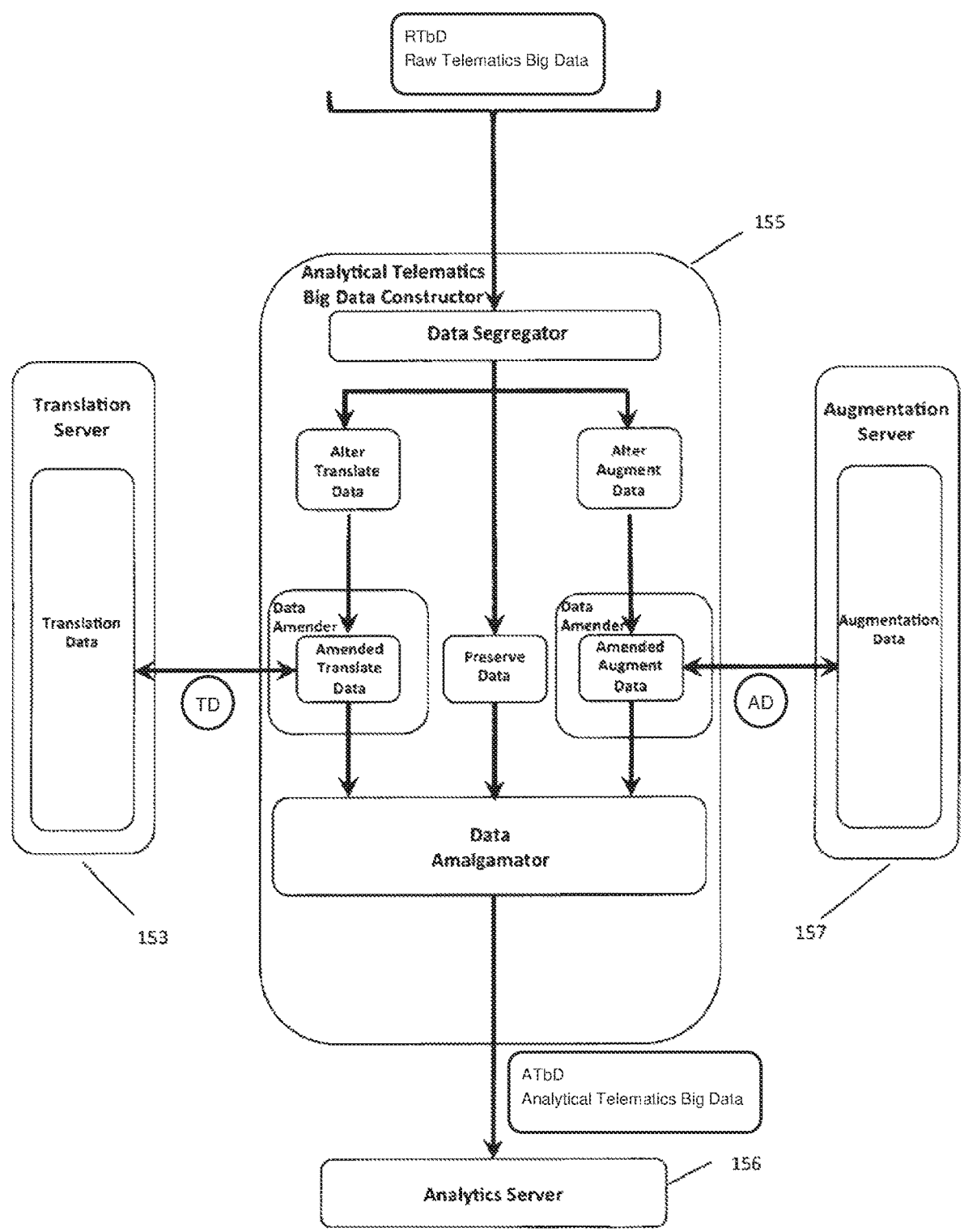
FIG. 8a is a diagrammatic representation of another embodiment of the analytical big telematics data constructor further illustrating a pair of supplemental information servers for translation data and augmentation data.

Another set of embodiments of the invention is illustrated with example classifications or groups of supplemental data as shown with reference to FIGS. 8*a,* 8*b* and 8*c.* The data segregator processes the raw telematics big data (RTbD) into three types or streams of data. The first type of data is preserve data that is passed directly to the data amalgamator. A second type of data is alter translate data and the third type of data is the alter augment data. The data amender for this embodiment may be at least one data amender.

The alter translate data requires translation data. The data amender obtains supplemental data (SD) in the form of translation data (TD) to amend the alter translate data. The translation data (TD) may be resident with the analytical telematics big data constructor 55 or external, for example located on at least one translation server 53.

The alter augment data requires augmentation data (AD). The data amender obtains supplement data (SD) in the form of augmentation data to amend the alter augment data. The augmentation data (AD) may be resident with the analytical telematics big data constructor 55 or external, for example located on at least one augmentation server 57. The data amalgamator reassembles or formats the preserve data, amended translate data and amended augment data to construct the analytical telematics big data (ATbD). The analytical telematics bid data (ATbD) may then be communicated or streamed in real time or stored in real time for subsequent real time fleet management analytics.

Figure 8B:
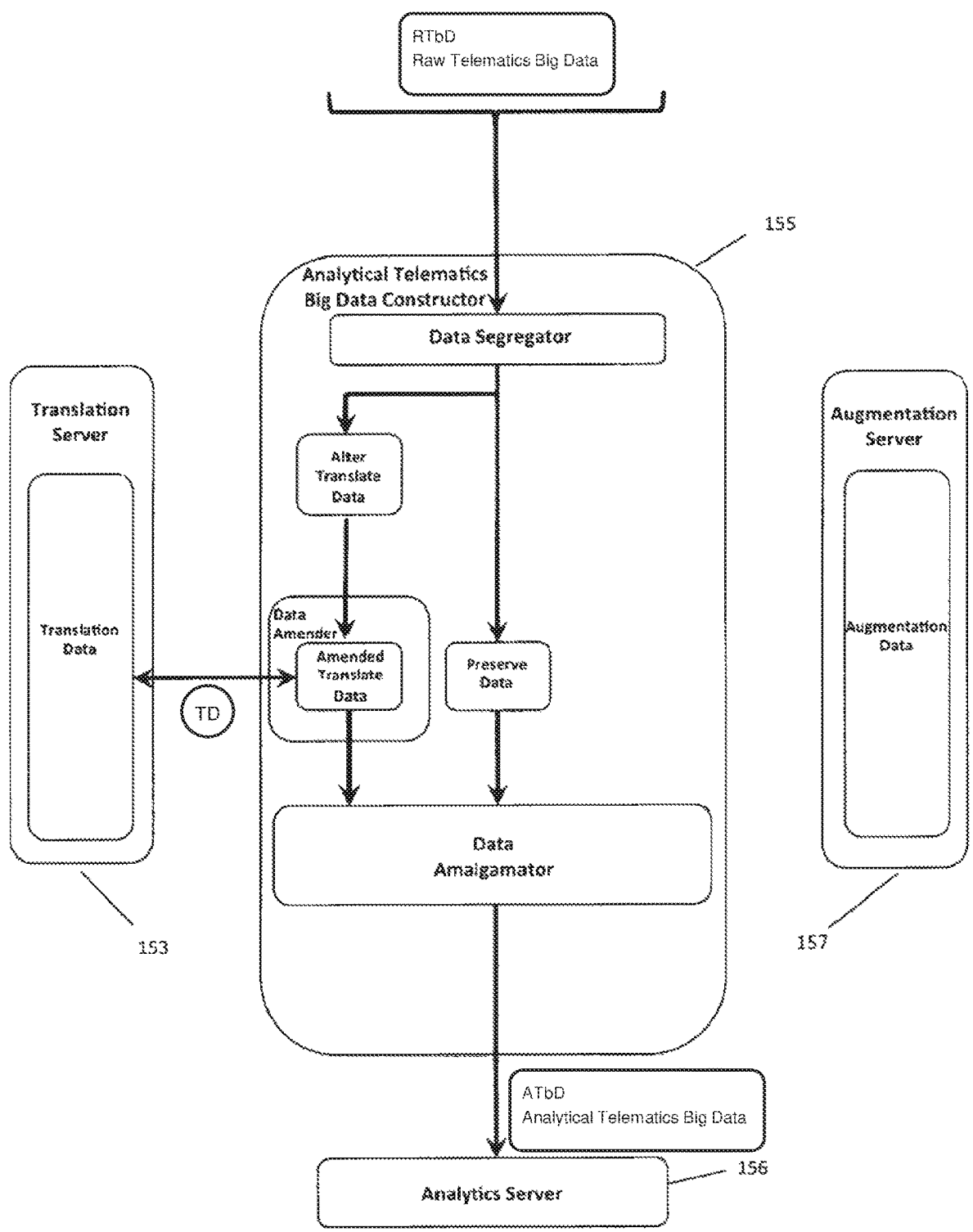
FIG. 8b is a diagrammatic representation of another embodiment of the analytical big telematics data constructor further illustrating one supplemental information server for translation data.
Figure 8C:
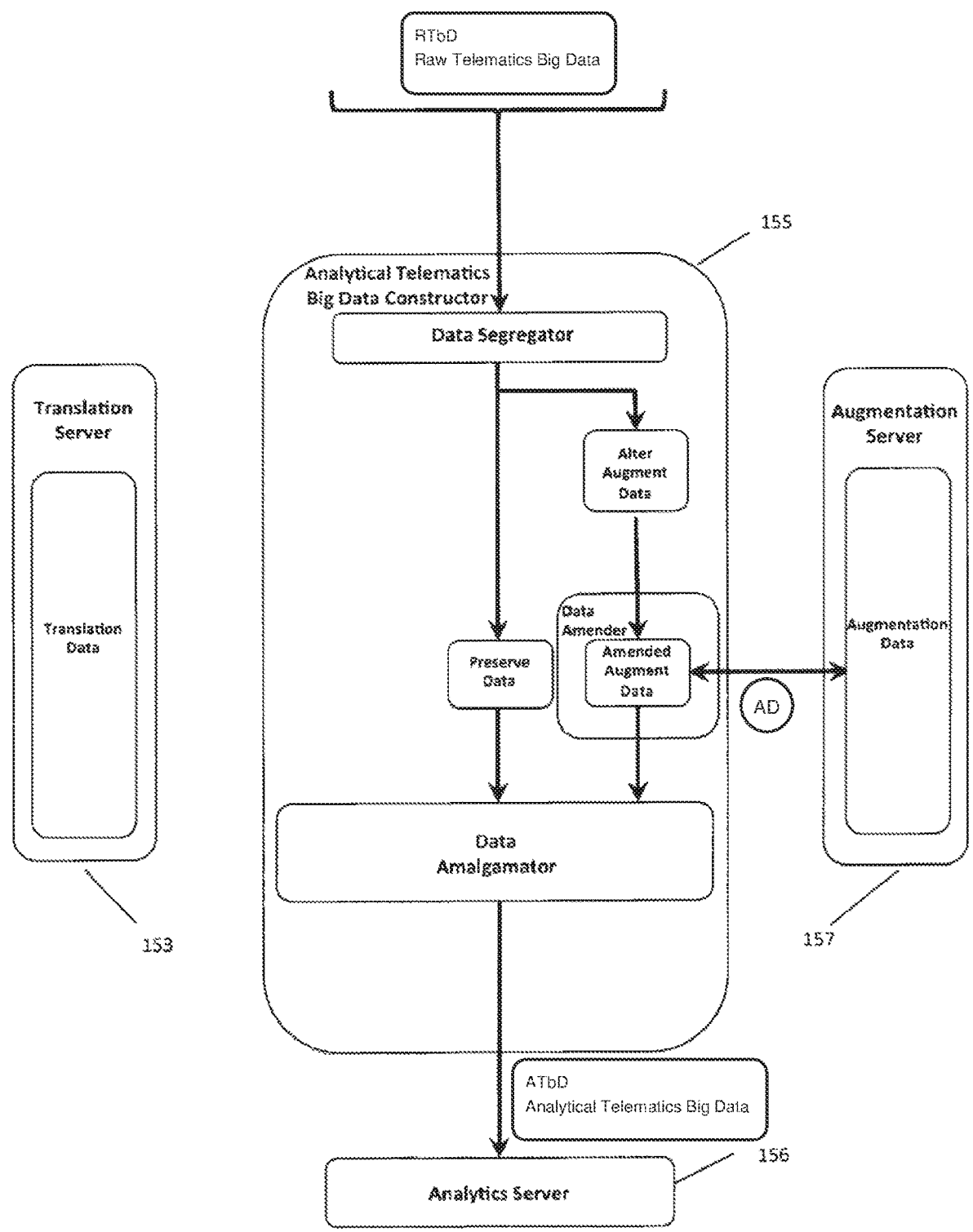
FIG. 8c is a diagrammatic representation of another embodiment of the analytical big telematics data constructor further illustrating one supplemental information server for augmentation data.

The embodiment in FIG. 8*b* is similar to the embodiment in FIG. 8*a,* but the analytical telematics big data constructor 55 only provides translation data and preserver data in the transformation to analytical telematics big data (ATbD). The embodiment in FIG. 8*c* is also similar to the embodiment in FIG. 8*a,* but the analytical telematics big data constructor 55 only provides augmentation and preserve data in the transformation to analytical telematics big data (ATbD). The alternative embodiments of FIG. 8*b* and FIG. 8*c* are examples of analytical telematics big data constructors 55 dedicated to particular streams and categories of raw telematics big data (RTbD). Persons skilled in the art appreciate the analytical telematics big data constructor may process preserve data, alter data, or a combination of preserve data and alter data.

Another set of embodiments of the invention includes example categories of supplemental data and active buffers. This is described with reference to FIGS. 9a, 9b and 9c. The data segregator processes the raw telematics big data (RTbD) into three types of data. The first type of data is preserve data that is passed directly to the data amalgamator. A second type of data is alter translate data and the third type of data is the alter augment data. At least one active buffer is provided to the analytical telematics big data generator 55 to buffer one of or both of the alter translate data and the alter augment data. The data amender obtains supplemental in the form of translation data (TD) to amend the alter translate data and the supplemental data (SD) in the form of augmentation data (AD) to amend the alter augment data, The data amalgamator reassembles or formats the preserve data, amended translate data and the amended augment data to construct the analytical telematics big data (ATbD) that may then be communicated or streamed in real time or stored in real time for subsequent real time fleet management analytics.

An example is described with respect to GPS data found in the raw telematics big data (RTbD). GPS data contains a latitude and longitude indication of a vehicle or mobile device. The GPS data may be transformed into analytical telematics bid data (ATbD) in two ways. The GPS data may be transformed into a location such as a road, highway, street or address. Then an icon representing the vehicle may be associated with a moving map 50 to provide a location of the vehicle. The GPS data may also be transformed into a network area or zone or cell 51 or multiple areas or zones 51 (see FIG. 4). Then the icon representing the vehicle may be also associated with a network area or zone 51 on the moving map 50.

Figure 9A:
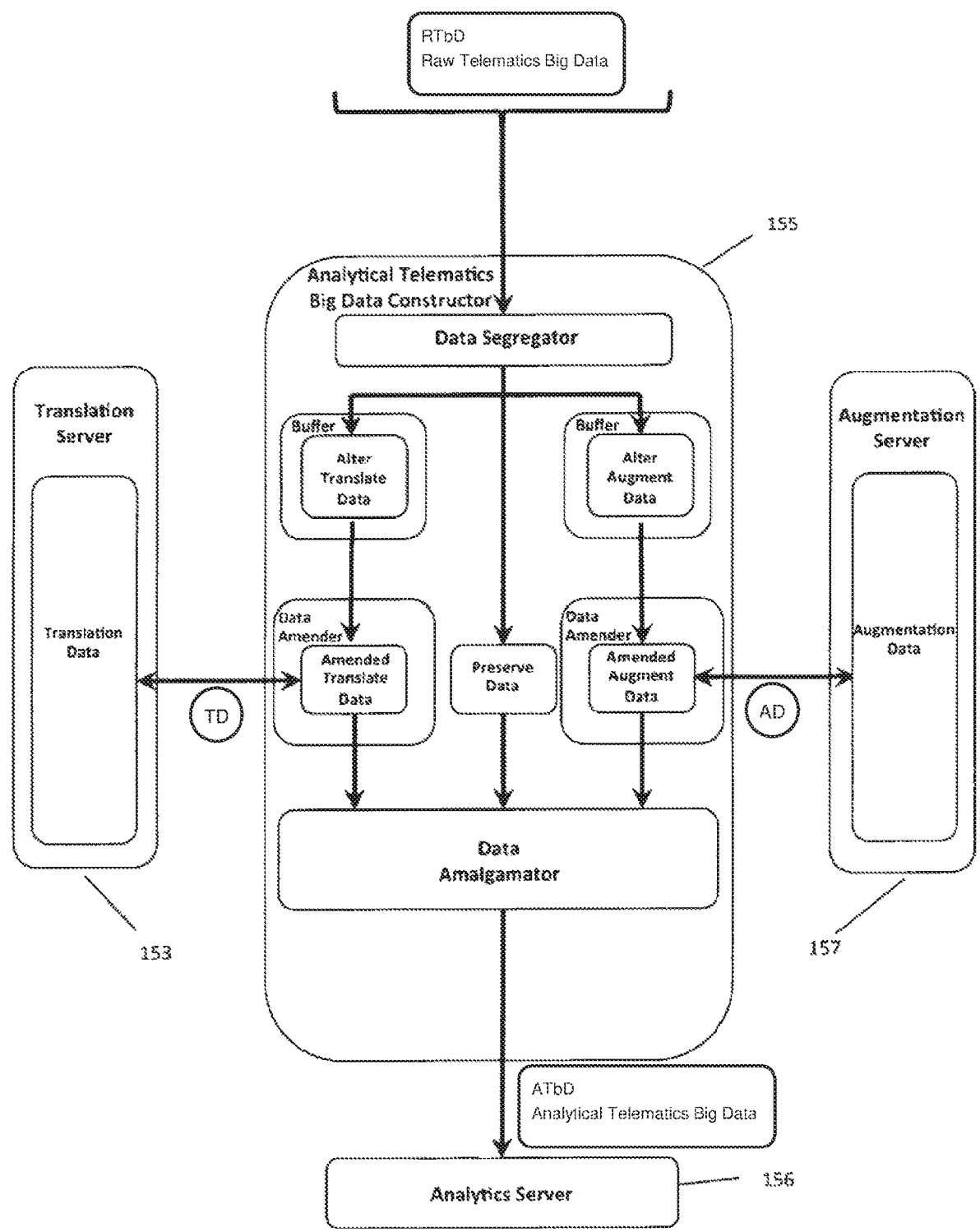
FIG. 9a is a diagrammatic representation of another embodiment of the analytical big telematics data constructor further illustrating a first buffer to accommodate the data amender and a pair of supplemental information servers for translation data and augmentation data.
Figure 9B:
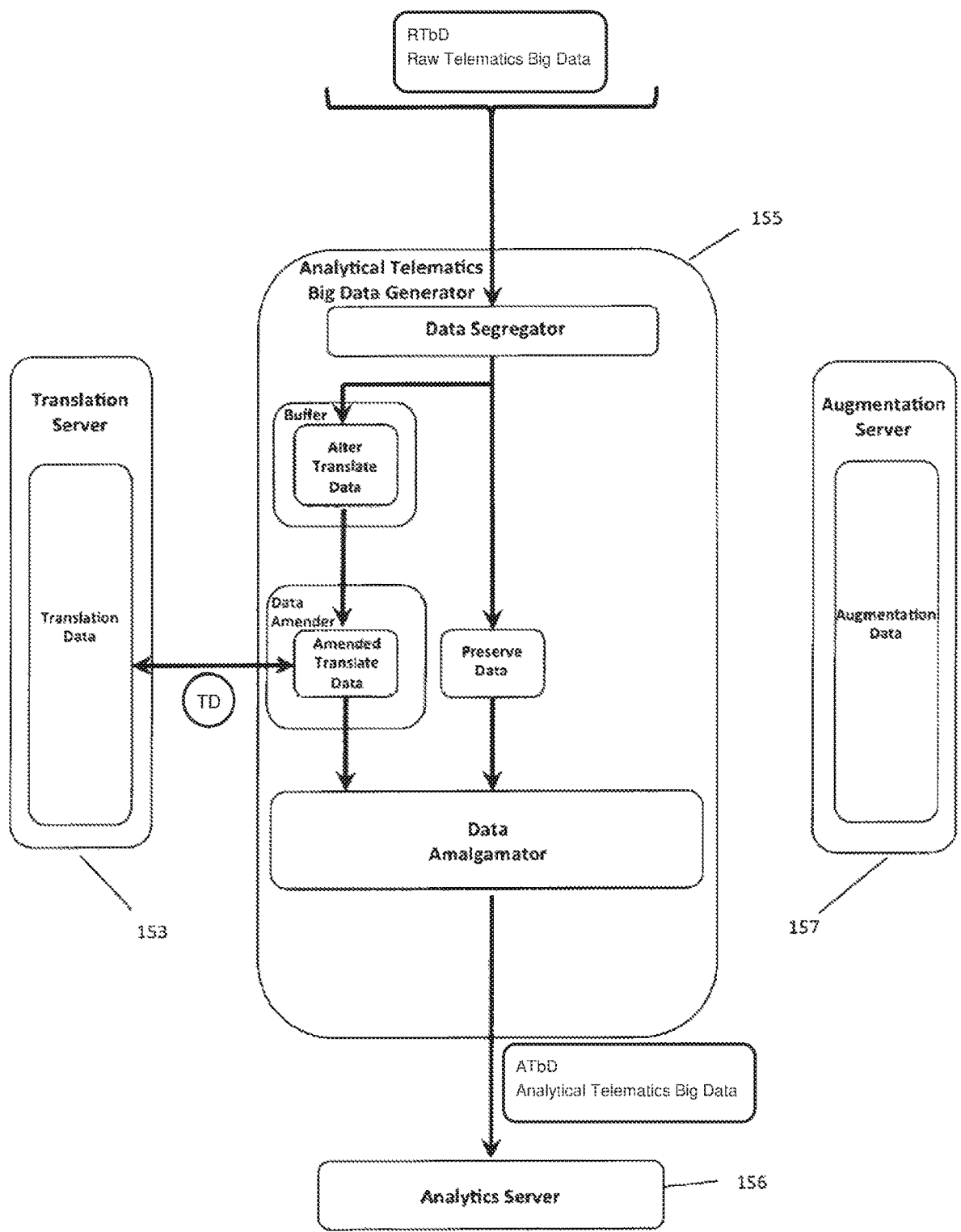
FIG. 9b is a diagrammatic representation of another embodiment of the analytical big telematics data constructor further illustrating a first buffer to accommodate the data amender and one supplemental information server for translation data.
Figure 9C:
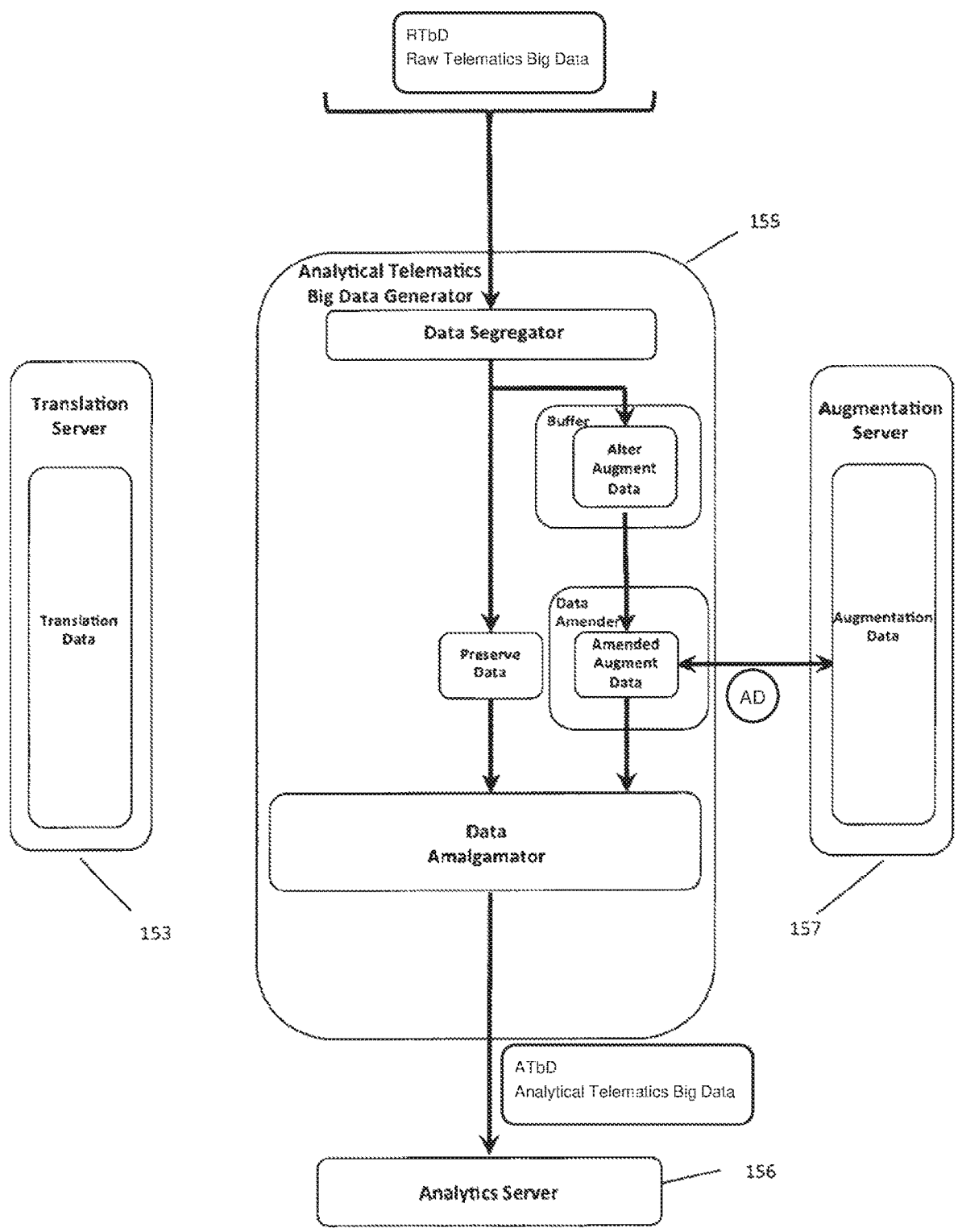
FIG. 9c is a diagrammatic representation of another embodiment of the analytical big telematics data constructor further illustrating a first buffer to accommodate the data amender and one supplemental information server for augmentation data.

The embodiment in FIG. 9b is similar to the embodiment in FIG. 9a, but the analytical telematics big data constructor 55 only provides translation data and preserve data in the transformation to analytical telematics big data (ATbD). The embodiment in FIG. 9c is also similar to the embodiment in FIG. 9a, but the analytical telematics big data constructor 55 provides augmentation and preserve data in the transformation to analytical telematics big data (ATbD). These alternative embodiments of FIG. 9b and FIG. 9c are also examples of analytical telematics big data constructors 55 dedicated to particular streams and categories of raw telematics big data (RTbD).

Figure 10A:
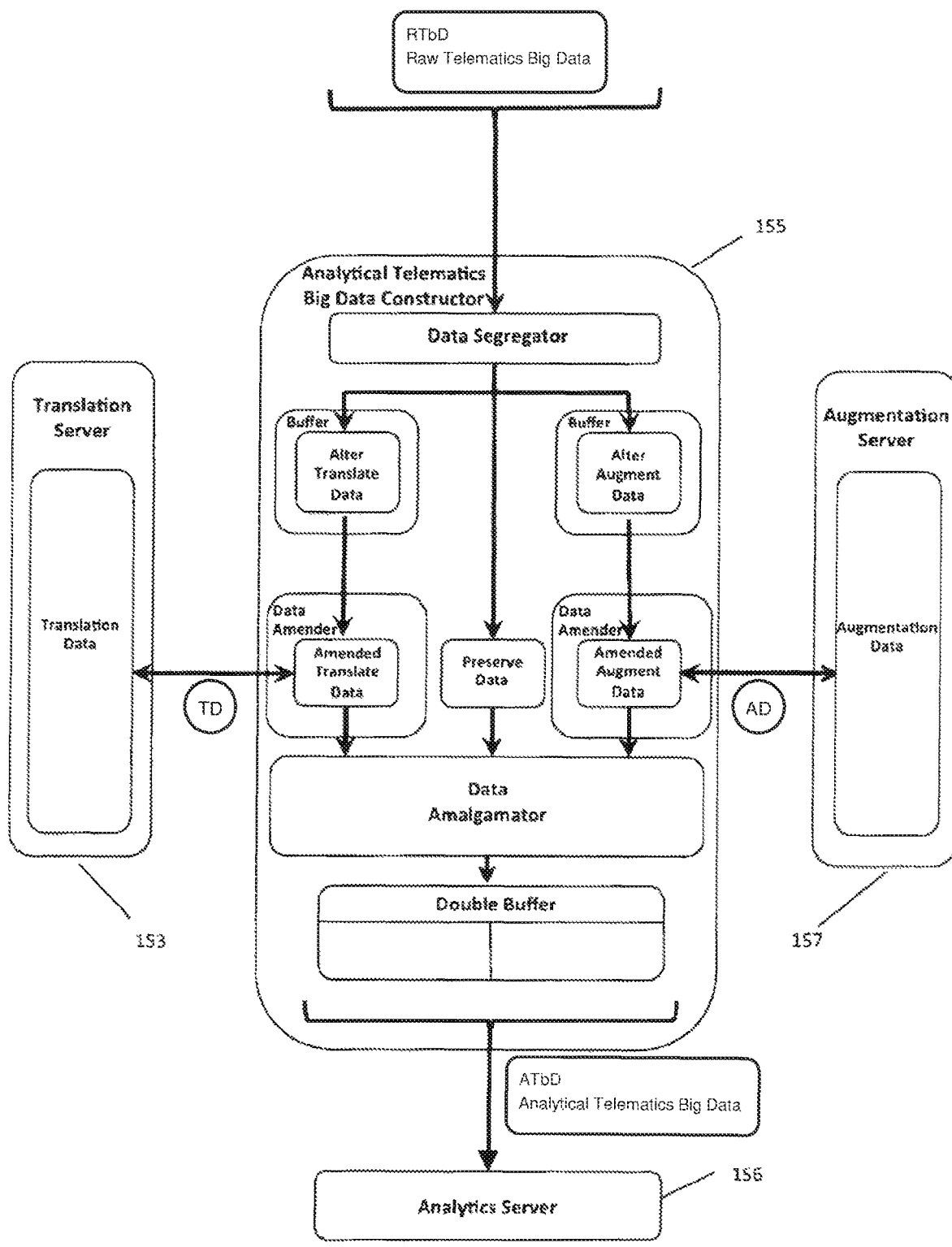
FIG. 10a is a diagrammatic representation of another embodiment of the analytical big telematics data constructor further illustrating a first buffer to accommodate the data amender, a second buffer to accommodate a delay or errors in data flow through the analytical big telematics data constructor and a pair of supplemental information servers for translation data and augmentation data.
Figure 10B:
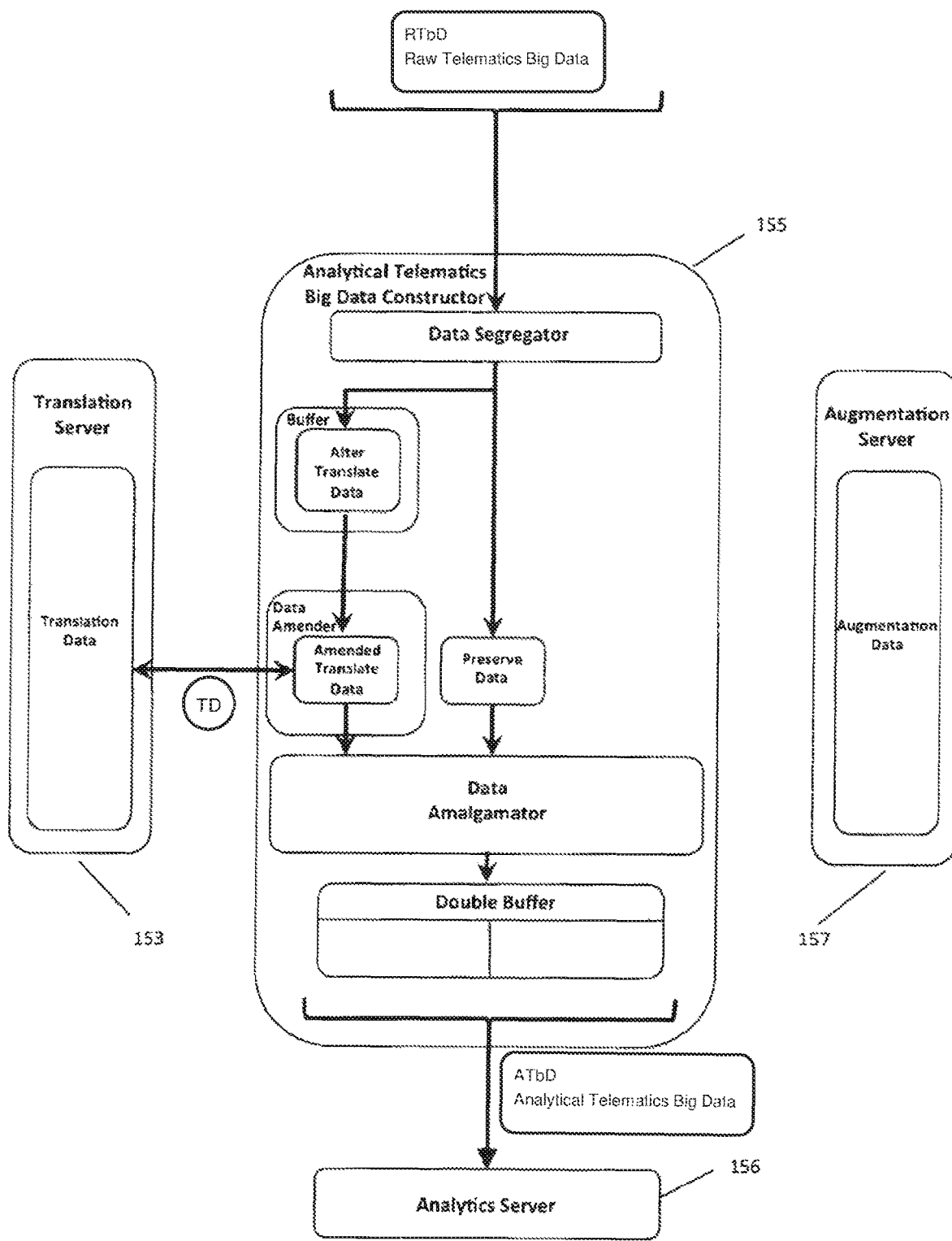
FIG. 10b is a diagrammatic representation of another embodiment of the analytical big telematics data constructor further illustrating a first buffer to accommodate the data amender, a second buffer to accommodate a delay or errors in data flow through the analytical big telematics data constructor and one supplemental information server for translation data.
Figure 10C:
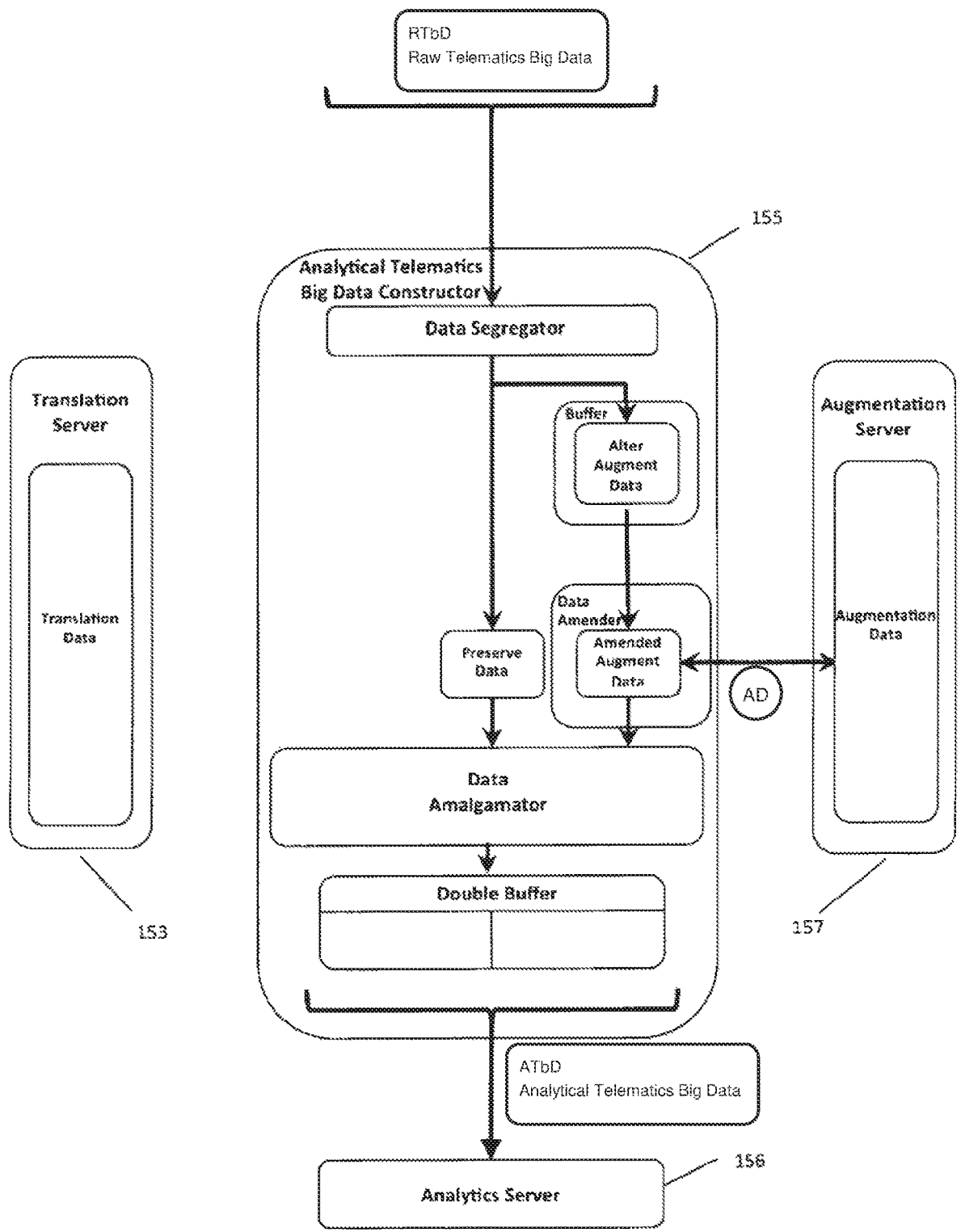
FIG. 10c is a diagrammatic representation of another embodiment of the analytical big telematics data constructor further illustrating a first buffer to accommodate the data amender, a second buffer to accommodate a delay or errors in data flow through the analytical big telematics data constructor and one supplemental information server for augmentation data.

The embodiments illustrated in FIGS. 10a, 10b and 10c are similar to the embodiments in FIGS. 9a, 9b and 9c and further include both the first active buffer and second active double buffer. The first active buffer is disposed in the analytical telematics big data constructor 55 intermediate the data segregator and data amalgamator. The second active double buffer is disposed after the data amalgamator.

Analytical Telematics Big Data Constructor & Example Data Flow

Figure 11:
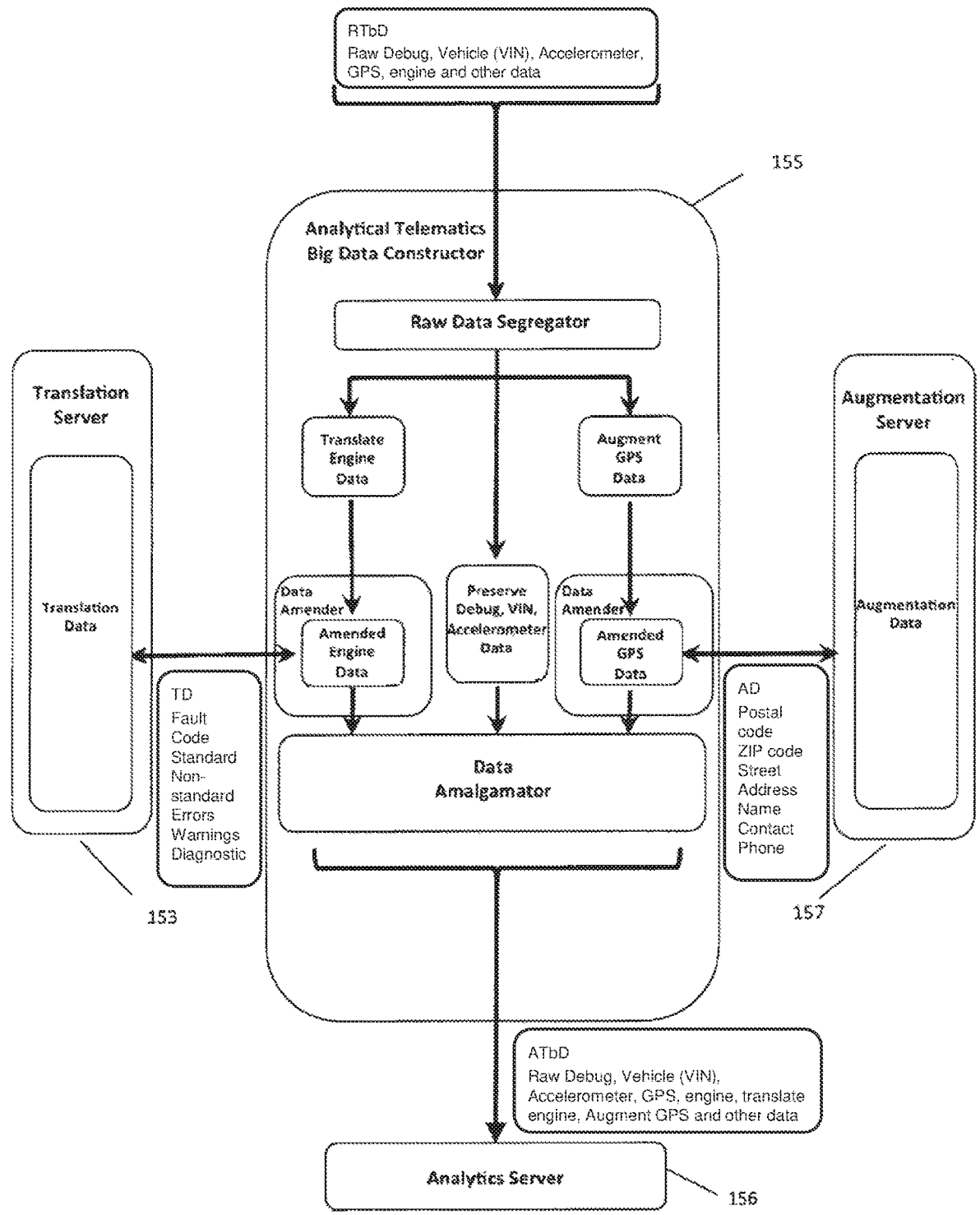
FIG. 11 is a diagrammatic representation of another embodiment of the invention illustrating examples of raw telematics big data, translation data, augmentation data and analytics big telematics data.

FIG. 11 illustrates an embodiment of the invention with example data flow through the analytical telematics big data constructor 55. In this example, the raw telematics big data(RTbD) includes category 1 data in two subcategories. The first subcategory includes debug data and vehicle identification number (VIN) data. The second subcategory includes engine specific data. Category 2 data includes GPS data and category 3 data includes accelerometer data.

The raw telematics big data (RTbD) including category 1 (and subcategories), 2, and 3 is provided to the data segregator. The data segregator identifies preserve data from the raw telematics big data (RTbD). The preserve data includes the portions of category 1 data (debug data and vehicle identification number (VIN) data) and the category 3 accelerometer data. This preserve data is provided directly to the data amalgamator.

The data segregator also identifies alter translate data and includes a portion of the category 1 data (engine specific data). The translation data (TD) required includes at least one of fault code data, standard fault code data, non-standard fault code data, error descriptions, warning descriptions and diagnostic information. The data amender then provides the alter translate data and translation data (TD) in the form of amended engine data.

The data segregator also identifies alter augment data and includes the category 2 data (GPS data). The argumentation data (AD) required includes at least one of postal code or zip code data, street address data, contact data, network zone data, network area data, or network cell data. The data amender then provides the alter augment data and augmentation data in the form of amended GPS data.

The data amalgamator then assembles or formats and provides the analytical telematics big data (ATbD) in real time. The analytical telematics big data (ATbD) includes debug data, vehicle identification number (VIN) data, accelerometer data, engine data, at lease one of fault code data, standard fault code data, non-standard fault code data, error descriptions, warning descriptions, diagnostic information, GPS data and at least one of postal code data, zip code data, street address data, or contact data.

Categories of Data, Example Data & Supplemental. Data

Table 1 provides an example list of categories of raw telematics data, example data for each category and an indication for any supplemental data required by each category. Category 1 is illustrated as a pair of sub-categories 1a and 1b but may also be organized into two separate categories. Table 1 is an example where the raw telematics data includes different groups or types of similar data in the form of data subsets.

TABLE 1

Example Raw, Augment and Translate Data.

| Category Number | Category Type | Example Data | Supplemental Data | |
|---|---|---|---|---|
| | | | Example Augment Data | Example Translate Data |
| 1a | Raw Vehicle Data | Manufacturer indications for VIN, or debug data. | Not required. | Not required. |
| 1b | | Engine status data or engine fault | Not required. | Fault descriptions, odometer value, fuel and |

TABLE 1-continued

Example Raw, Augment and Translate Data.

| Category Number | Category Type | Example Data | Supplemental Data | |
|---|---|---|---|---|
| | | | Example Augment Data | Example Translate Data |
| | | data. Fault data may be GO device specific data and vehicle specific data. | | air metering, ignition system, emissions, vehicle speed control, idle control, transmission, current speed, engine RPM, battery voltages, pedal positions, tire pressure, oil level, airbag status, seatbelt indications, emission control data, engine temperature, intake manifold pressure, braking information, fuel levels, or mass air flow values. |
| 2 | Raw GPS Data | Latitude and longitude coordinates | Postal codes, zip codes, street names, addresses, or commercial businesses or communication network zone or cell or area data. | Not required. |
| 3 | Raw Accelerometer Data. | One or two or three dimensional values for g-force in at least one axis or direction. | Not required. | Not required. |
| 4 | Raw Expander Data. | Sensor or manufacturer specific data, sensor data, near field communication data. | Not required. | Traffic data, hours of service data, driver identification data, distance data, time data, amounts of material (solid, liquid), truck scale weight data, driver distraction data, remote worker data, school bus warning light activation, or door open/closed. |
| 5 | Raw Beacon Object Data | One or two-dimensional values for g-force in at least one axis or direction, temperatures, battery level value, pressure, luminance and user defined sensor data. | Not required. | Object damage or hazardous conditions have occurred. |

Persons skilled in the art appreciate other categories, or sub-categories of raw telematics big data (RTbD) and other categories or sub-categories of supplement data (SD) may be included and transformed into analytical telematics big data (ATbD) by the analytical telematics big data constructor 55 of the present invention.

State Machine Representation

Figure 12A:
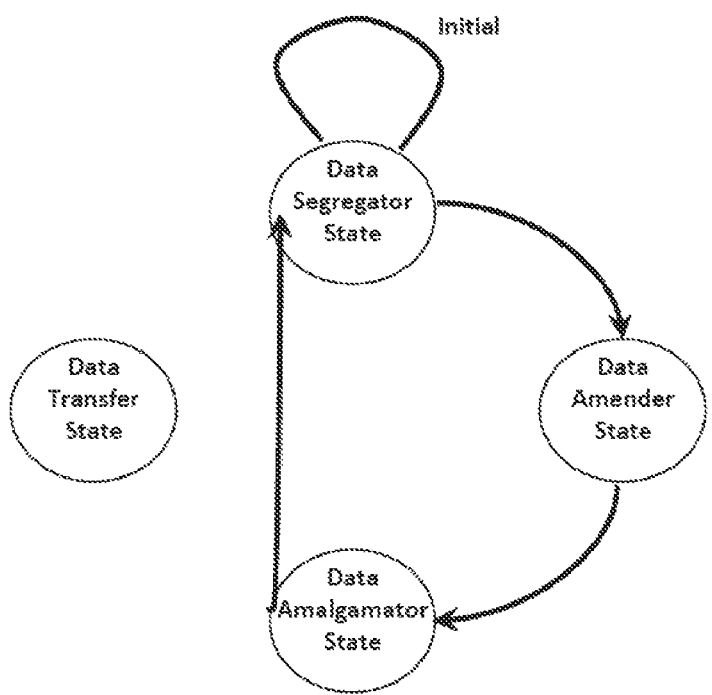
FIG. 12a is a diagrammatic state machine representation of the real time analytical big telematics data constructing logic.
Figure 12B:
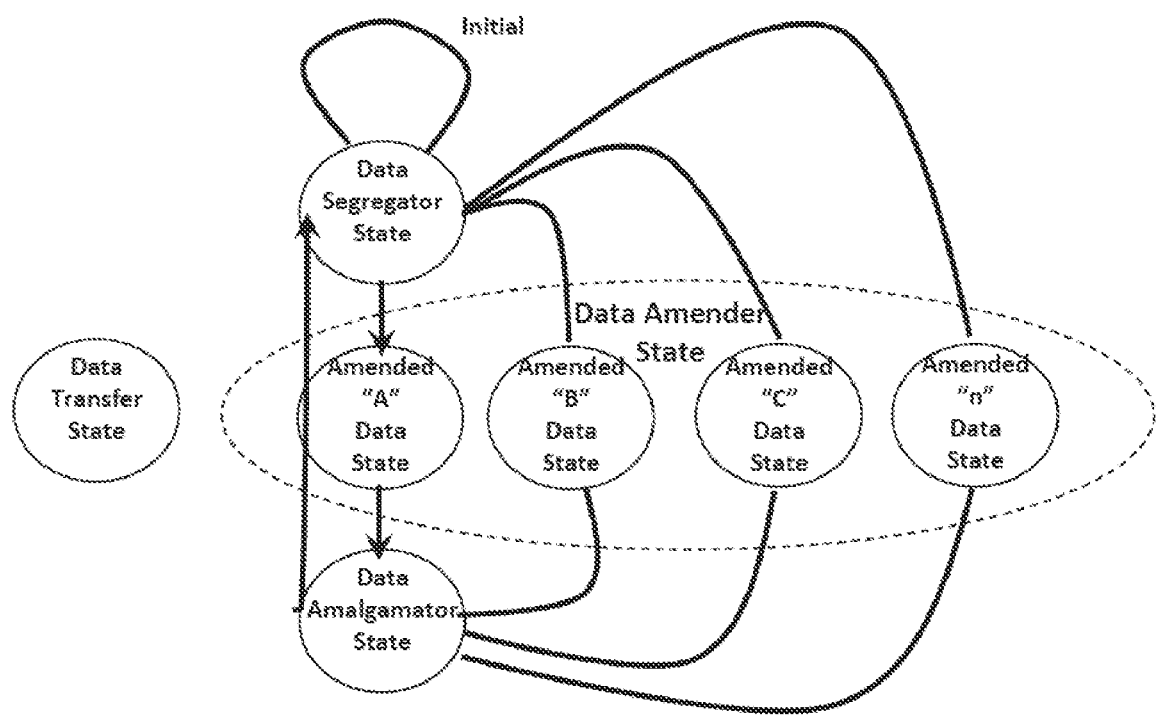
FIG. 12b is a diagrammatic state machine representation of the real time analytical big telematics data constructing logic further illustrating a number of data amender sub-states.
Figure 12C:
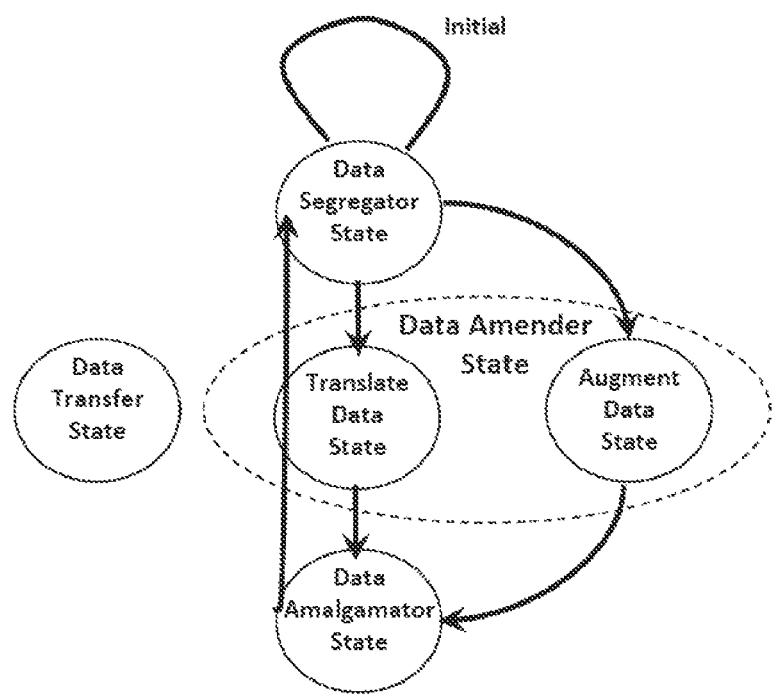
FIG. 12c is a diagrammatic state machine representation of the real time analytical big telematics data constructing logic further illustrating an example pair of data amender sub-states for translate data and augment data.
Figure 13A:
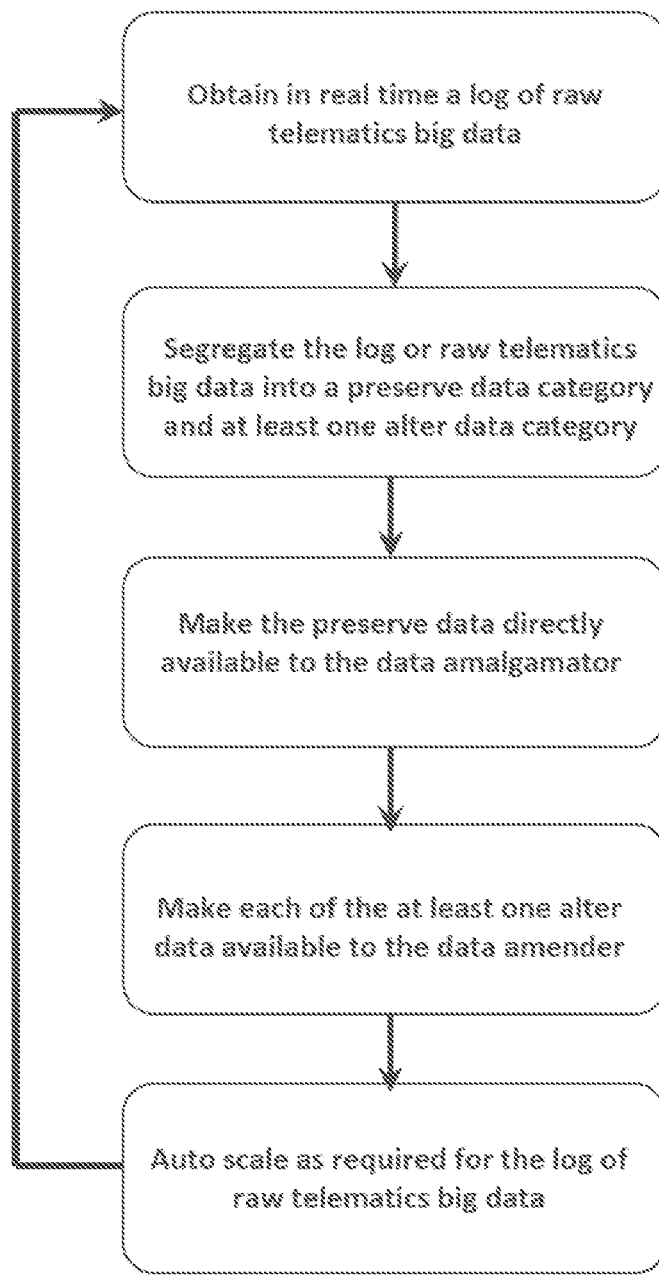
FIG. 13a is a diagrammatic representation of the data segregator state logic and tasks for sequential processing.
Figure 13B:
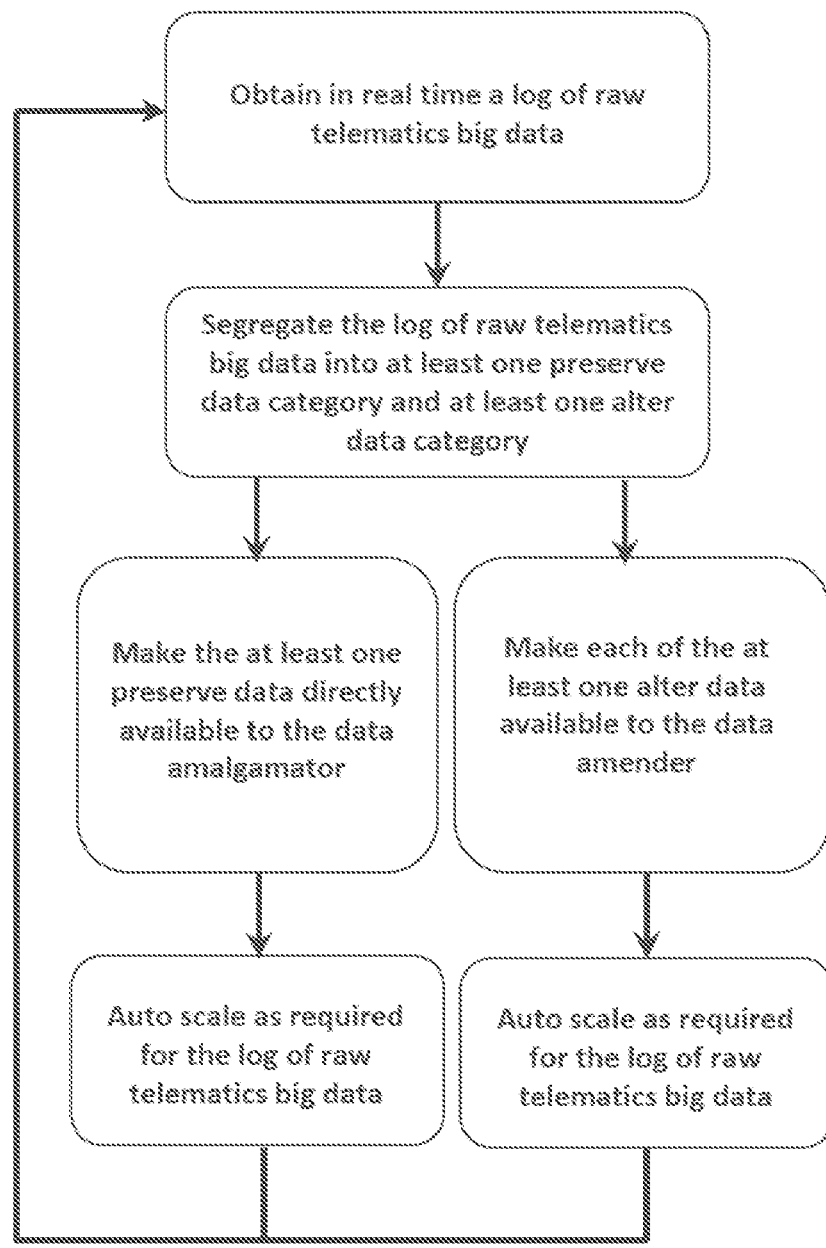
FIG. 13b is an alternate diagrammatic representation of the data segregator state logic and tasks for parallel processing.
Figure 13C:
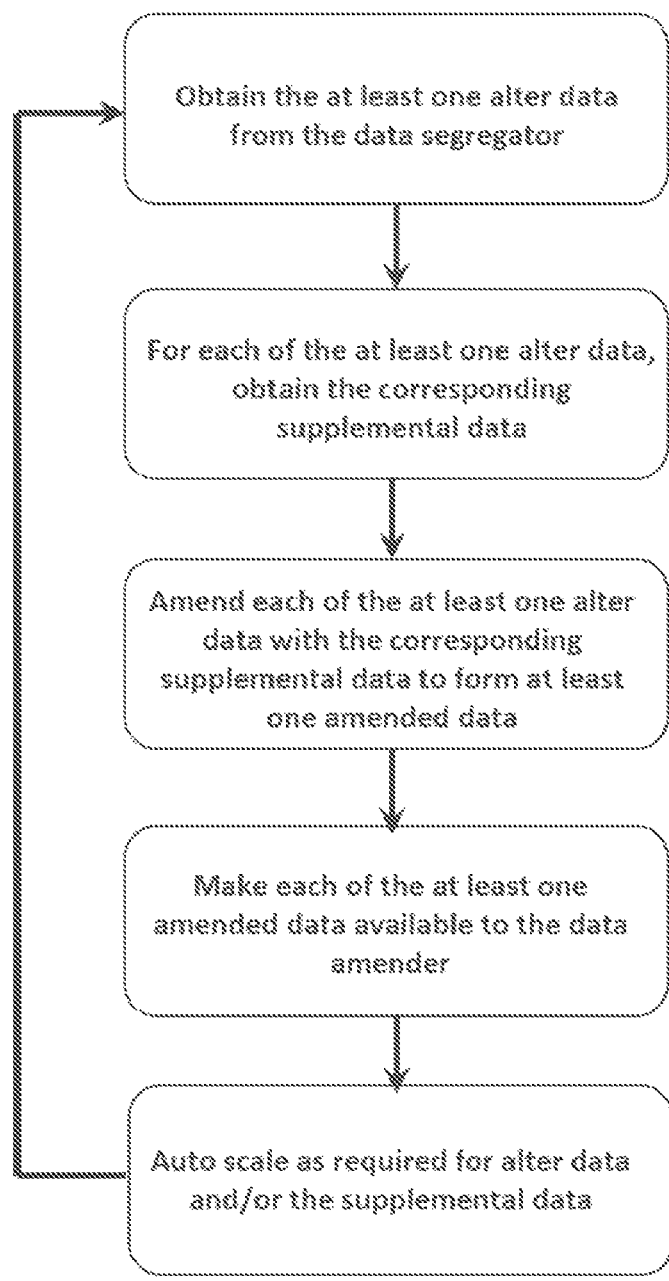
FIG. 13c is a diagrammatic representation of the data amender state logic and tasks.
Figure 13D:
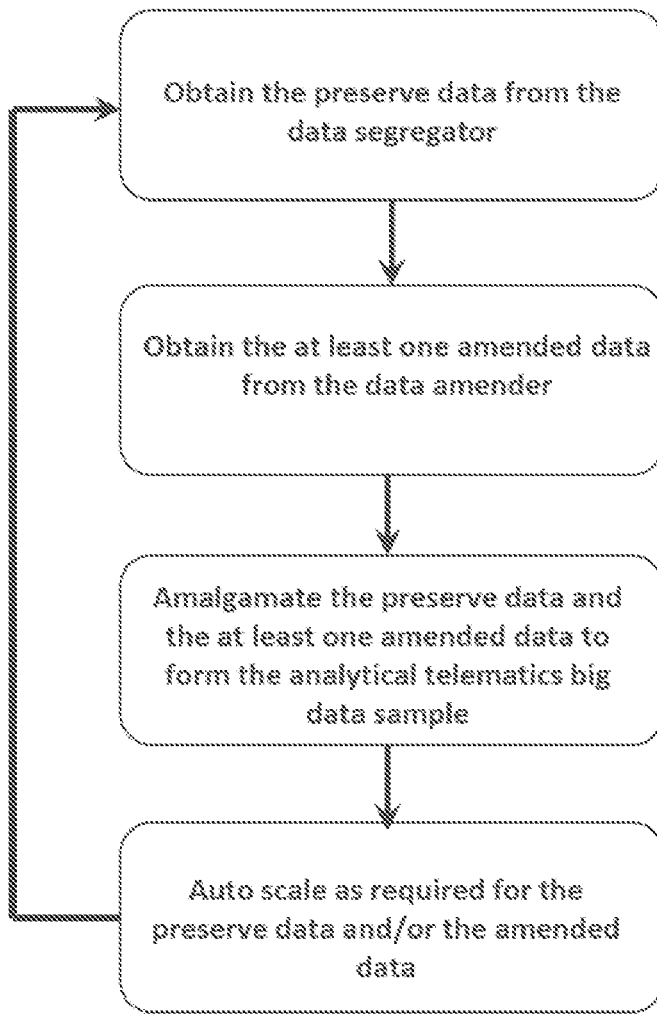
FIG. 13d is a diagrammatic representation of the data amalgamator state logic and tasks for sequential processing.
Figure 13E:
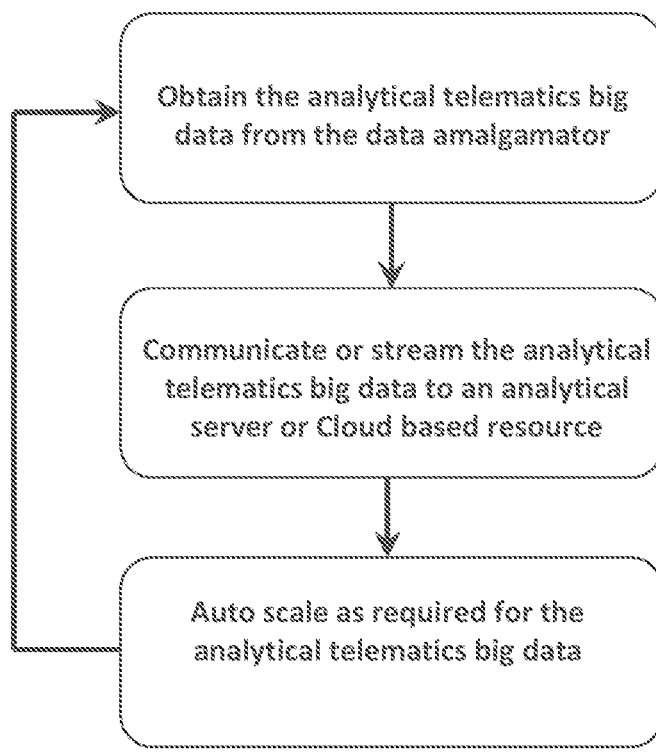
FIG. 13e is a diagrammatic representation of the data amalgamator state logic and tasks for parallel processing.
Figure 13F:
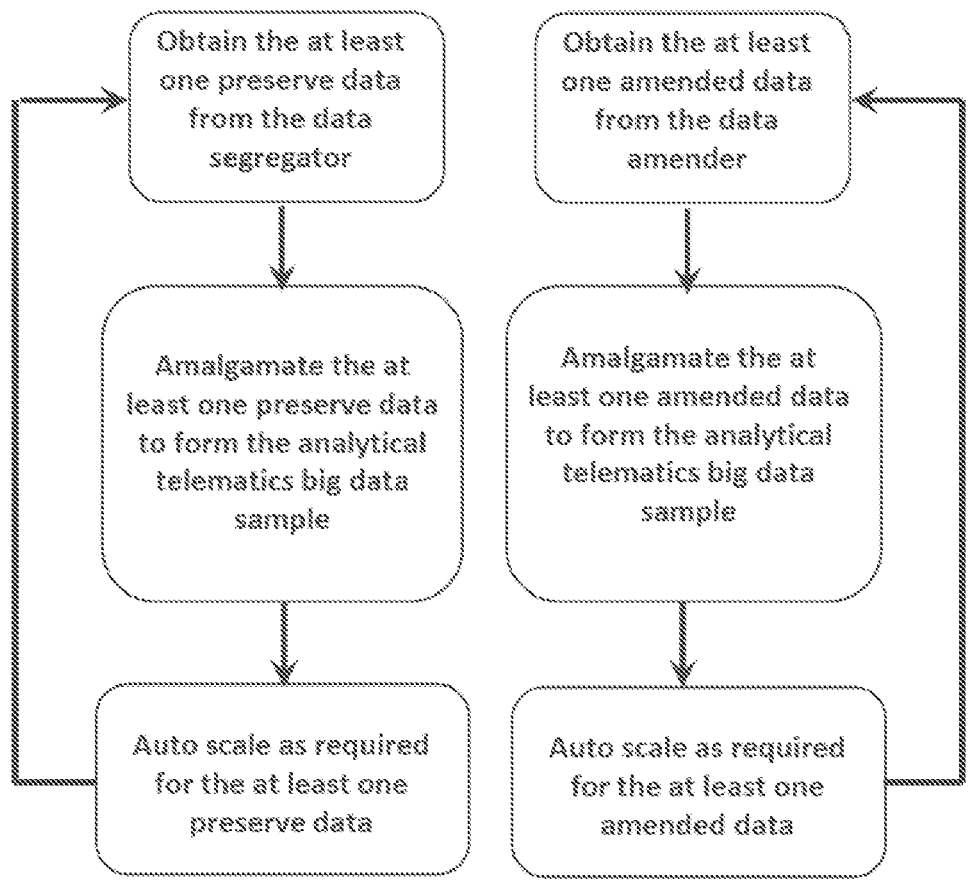
FIG. 13f is a diagrammatic representation of the data transfer state logic and tasks.

Referring now to FIGS. 12a, 12b, and 12c, a state machine representation of the logic associated with the analytical big telematics constructor 55 is described. There are four states to the logic that operate concurrently and in parallel. There may further be multiple instances of each state. The initial state is the data segregator state. The logic of the data segregator state is to filter, identify and separate the raw telematics big data (RTbD) into preserve data and alter data. The data segregator state waits for receipt of a log or portion of raw telematics big data (RTbD). Upon receipt, the data segregator processes the raw telematics big data (RTbD) into either at least one preserve data path or at least one alter data path. The raw telematics big data (RTbD) in the at least one preserve data path is optionally provided to a first active buffer or directly to the data amalgamator state. The raw telematics big data (RTbD) in the alter data path is optionally provided to a first active buffer or directly to the data amender state. Then, the data segregator state waits for receipt of the next log or portion of raw telematics big data (RTbD).

In an example embodiment of the invention, category 1a and 3 are preserve data and are provided to the data amalgamator state. Category 1b, 2, 4 and 5 are alter data and are provided to the data amender state.

The logic of the data amender state is to identify each category of alter data and associate a category of supplemental data with each category of alter data and provide amended data (alter data and supplemental data) to the data amalgamator state. The data amender state waits for receipt of a portion of raw telematics big data (RTbD) that is identified as alter data. Then, the data amender state obtains supplemental data for the alter data. This occurs for each category of alter data and associated supplemental data. Finally, the data amender state provides the amended data (each alter and each supplemental data) to the data amalgamator state.

In an embodiment of the invention, the data amender state has two sub-states, the translate data state and the augment data state. The translate data state obtains translate data for particular categories of alter data that require a translation. The augment data state obtains augment data for particular categories of alter data that require augmentation. Persons skilled in the art appreciate other sub-states may be added to the data amender state.

In an example embodiment of the invention Category 2 requires augment data and category 1b, 4 and 5 require translate data. Example augment data and translate data are previously illustrated in Table 1.

The logic of the data amalgamator state is to assemble, or format, or integrate the preserve data, alter data and supplemental data into the analytical telematics big data (ATbD). The data amalgamator state receives the preserve data from the data segregator and the amended data from the data amender state. The preserve data is processed into the format for the analytical telematics big data (ATbD). The analytical big telematics data (ATbD) in the preserve data path is optionally provided to a second active double buffer or directly to the data amalgamator state.

The logic of the data transfer state is to communicate or store or stream the analytical big telematics data (ATbD) to an analytics server 56 or a Cloud computing based resource. The data transfer state receives the analytical big telematics data (ATbD) either directly from the data amalgamator state or indirectly from the second active double buffer. The analytical big telematics data (ATbD) is then provided to the analytics server 56 or the Cloud computing based resource.

Process Logic & Tasks

The process logic and tasks of the present invention are described with reference to FIGS. 13a, 13b, 13c, 13d, 13e and 13f. The data segregator state logic and tasks begins by obtaining in real time a log of raw telematics big data (RTbD). The log of raw telematics big data (RTbD) is segregated into at least one preserve data category and at least one alter data category. In an embodiment of the invention, there is than one preserve data category, and no alter category etc. The preserve data is made available to the data amalgamator. The at least one alter data is made available to the data amender. The process logic and tasks may auto scale as required for the log of raw telematics big data (RTbD). The data segregator state logic and tasks may be either sequential processing or parallel processing or a combination of sequential and parallel processing.

The process logic and tasks for the data amender state logic and tasks begins by obtaining the at least one alter data from the data segregator. For each of the at least one alter data, the corresponding supplemental data is obtained. Each of the at least one alter data is amended with the corresponding supplemental data to form at least one amended data. The at least one amended data is made available to the data amender. The process logic and tasks may auto scale as required for either the alter data and/or the supplemental data.

The process logic and tasks for the data amalgamator state logic and tasks begins by obtaining the at least one preserve data from the data segregator and the at least one amended data from the data amender. The at least one preserve data and the at least one amended data is amalgamated to form the analytical telematics big data. The process logic and tasks may auto scale as required either for the at least one preserve data and/or the at least one amended data. The data amalgamator state logic and tasks may be either sequential processing or parallel processing or a combination of sequential and parallel processing.

The process logic and tasks for the data transfer state logic and tasks begins by obtaining the analytical telematics big data (ATbD) from the data amalgamator. The analytical telematics big data (ATbD) is communicated or streamed to an analytical server or Cloud based resource. The process logic and tasks may auto scale as required for the analytical telematics big data (ATbD).

Load Balancing

Another broad feature of the present invention is described with reference to FIGS. 3, 6b, 7c, 12b, 13a, 13b, 13c, 13d, 13e and 13f. As illustrated on the map 50, many different vehicles 11 can be operational at any given time throughout the world in many different time zones all monitoring, logging and communicating raw telematics data to a analytical telematics big data constructor 55 in real time. The categories and type of raw telematics data (see Table 1) may also vary greatly dependent upon the specific configurations of each vehicle 11 (vehicular telemetry hardware system 30, intelligent I/O expanders 50, devices 60, Bluetooth modules 45 and Bluetooth Beacons 21 associated with a plurality of objects). This results in a unique big data velocity, timing, variety and amount of raw telematics data that collectively forms the raw telematics big data (RTbD) entering the data segregator of the analytical telematics big data constructor 55. This is collectively referred to as a raw telematics big data (RTbD) load.

There are also many different types of supplemental data (SD) required by the data amender available from many different locations and remote sources. The supplemental data (SD) is also dependent upon the portion or mix of raw telematics big data (RTbD). This results in another unique big data velocity, timing, variety and amount of supplemental data (SD) (see Table 1 augment data and translate data) required by the data amender. This is collectively referred to as a supplemental data load.

Communicating or streaming the analytical telematics big data (ATbD) to an analytics server 56 or a Cloud based resource is also dependent upon the analytics server 56 or Cloud based resources ability to receive the analytical telematics big data (ATbD). This results in another big data unique velocity, timing, variety and availability Lo communicate or stream the analytical telematics big data (ATbD). This is collectively referred to as an analytical telematics big data (ATbD) load.

The end result is a plurality of potential imbalances for the load, velocity, timing variety and amount of raw telematics big data (RTbD), supplemental data (SD) and analytical telematics big data (ATbD). Therefore, the analytical telematics big data constructor 55, finite state machine, process and tasks of the present invention must be able to deal in real time with this imbalance in real time.

In an embodiment of the invention, this imbalance is resolved by the unique arrangement of the pipelines, filters and tasks associated with the analytical telematics big data constructor 55. This unique arrangement permits load balancing and scaling when imbalances occur in the system. For example, the pipelines, filters and tasks may be dynamically increased or decreased (concurrent instances) based upon the real time load. The data is standardized into specific formats for each of the finite states, logic, resources, processes and tasks. This includes the raw telematics big data (RTbD) format, the supplemental data (SD) format, the preserve data format, the alter data format, the augment data (AD) format, translation data (TD) format and the analytical telematics big data (ATbD) format. In addition, a unique pipeline structure is provided for the analytical telematics bid data constructor 55 to balance the load in the system. The raw telematics big data enters the analytical telematics big data constructor through a first pipeline to the data segregator. The data segregator then passes data through at least two pipelines as preserve data and alter data. The alter data pipeline may further include additional pipelines (A, B, C, n). The alter data pipelines feed into the data amender with the corresponding supplemental data (SD) pipelines. The amended data pipelines and the preserve data feed into the data amalgamator and finally, the analytical telematics bid data (ATbD) feeds into the communication or streaming pipeline. This architecture of telematics specific pipelines permits running parallel and multiple instances of the data segregator state, the data amender state, the data amalgamator state and the data streaming state enabling the system to spread the load and improve the throughput of the analytical telematics bid data constructor 55. This also assists with balancing the system in situations where the data, for example raw telematics bid data (RTbD) and the supplemental data (SD) are not in the same geographical location.

In another embodiment of the invention, this imbalance is resolved by the application of the first active buffer and/or the second active buffer either alone or in combination. The first active buffer handles the imbalance between the raw telematics big data (RTbD) and the supplemental data (SD). The second active buffer handles the potential imbalance when communicating or streaming the analytical telematics big data (ATbD) to an analytics server 56 or a Cloud based resource. The buffers may scale up or down dependent upon the needs of the analytical telematics big data constructor 55.

In another embodiment of the invention, this imbalance is resolved by the layout of the finite state machine, the logic, the resources, the process and the tasks of the process through a unique and specific telematics computing resource consolidation.

The data segregator state, logic, process and tasks automatically deal with scalability of the raw telematics big data (RTbD) and associated processing tasks to filter the data into preserve data and alter data. This includes both scaling up or down dependent upon the corresponding load required by the raw telematics big data (RTbD) and the amount of processing required to segregate portions of the data into preserve data or alter data. Additional instances of the data segregator state, logic, process and tasks may be automatically started or stopped according to the load, demand or communication requirements.

The data amender state, logic, process and tasks automatically deal with the scalability with the supplemental data (SD). This includes both scaling up or down dependent upon the corresponding load required by the supplement data (SD) and the amount of processing required to amend each alter data. Additional instances of the data amender state, logic, process and tasks may be automatically started or stopped according to the load, demand or communication requirements.

The data amalgamator state, logic process and tasks automatically deal with the scalability with the preserve data, amended data and ability to communicate or stream the analytical telematics big data (ATbD) to an analytics server 56 or Cloud based computing resource. Additional instances of the data amalgamator state, logic, process and tasks may be automatically started or stopped according to the load, demand or communication requirements.

The analytical telematics big data constructor 55 enables real time insight based upon the real time analytical telematics big data. For example, the data may be applied to monitor the number of Geotab GO devices currently connecting to the special purpose server 19 and compare that to the number of GO devices that is expected to be connected at any given time during the day; or be able to use the real time analytical telematics big data to monitor the GO devices that are connecting to their special purpose server 19 from each cellular or satellite network provider. Using this data, managers are able to determine if a particular network carrier is having issues for proactive notification with customers that may be affected by the carrier's outage.

Real Time Network Communication Fault Determination

The big telematics data communication fault monitoring system is next described with respect to FIG. 4 and FIG. 11. Each mobile device communicates to the remove device in the form of raw telematics big data (RTbD). This data includes GPS data that is identified for amendment. The amendment includes augmentation data in the form of postal codes, or ZIP codes, or street address, or names of contacts or addresses to permit associating a vehicle location on a map 50. The amendment also includes augmentation data in the form of network areas or network zones or networks cells 51 to permit associating a vehicle location within a communication network and the overlay of the area or zone or cell 51 on a map 50. In an embodiment of the invention, the augmentation data is a cell identification number used to identify a base transceiver station or sector of a base transceiver station within a location area code. The cell identification number pertains to GSM, CDMA, UMTS, LTE, WiFi and other forms of communication networks. In addition, the augmentation data may further include mobile network codes and the identification number of the carrier or operator. The identification numbers are available from a number of different databases and service providers As illustrated in FIG. 4, the map 50 illustrates a number of icons representative of vehicles (A through K) moving in real time. There are three network zones or areas 51 also overlaid on the map 50. In one communication zone or area 51, there is vehicle D. In another communication zone or area 51, there are vehicles A, B, C, E, and H. In another communication zone or area 51 there are vehicles I, J, and K. And finally, vehicles F and G are not associated with a communication zone or area 51.

If a mobile device associated with vehicle D were to cease communication, it may be a communication fault with the mobile device associated with vehicle D or it may be a fault with the communication network. If mobile devices associated vehicles A, B, C, E and H cease communication, the most likely fault is with respect to the communication network zone or area associated with these vehicles. Likewise, if mobile devices associated with vehicles I, J, and K were to cease communication, the most likely fault is with respect to the communication network zone or area associated with these vehicles. However, if mobile devices associated with vehicles F and G were to cease communication, this would be expected as the vehicles are not longer associated within a communication zone or area.

Figure 14A:
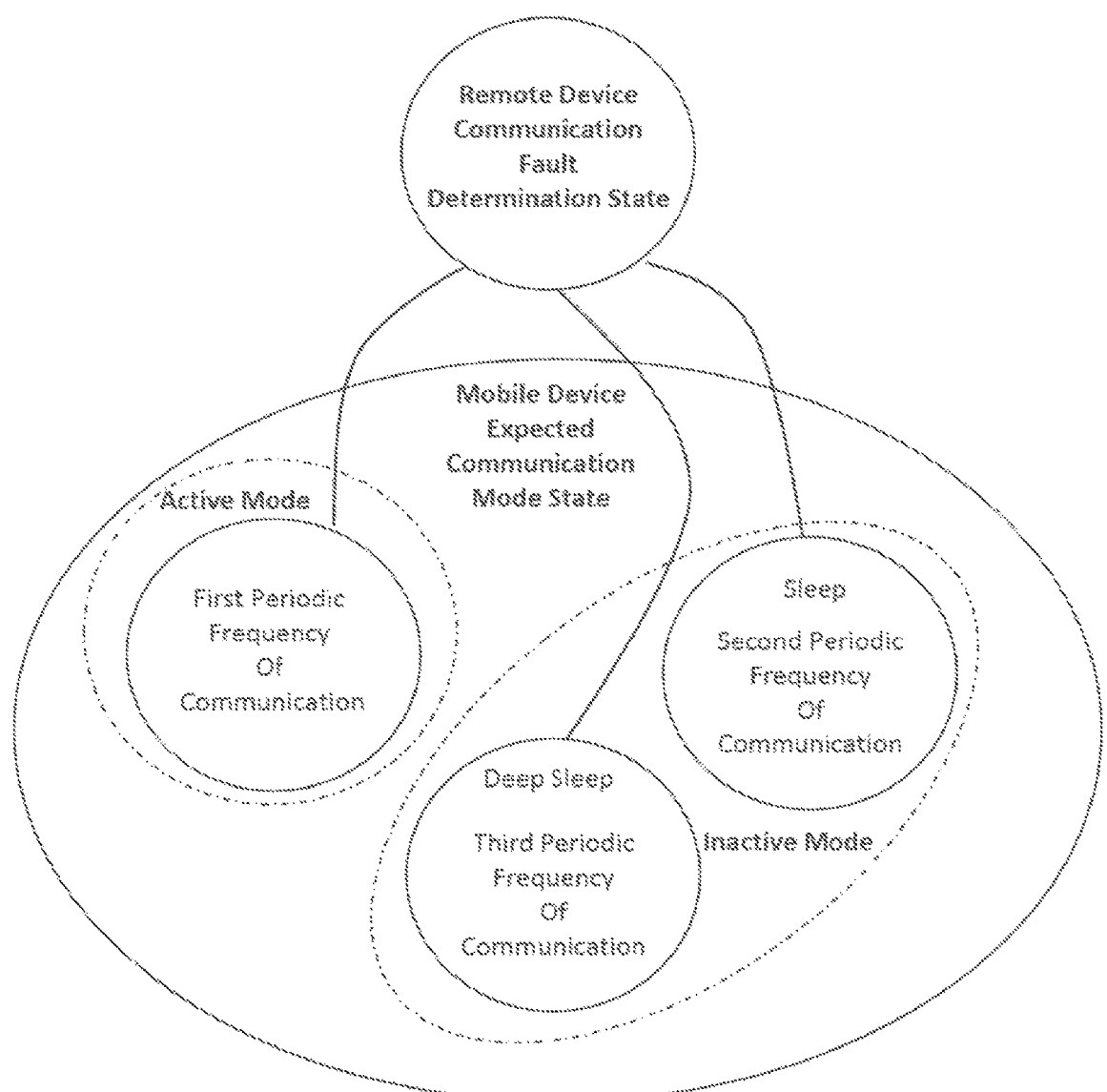
FIG. 14a is a diagrammatic representation of a state representation for determining a network communication fault based upon expected communications and actual communications.

Referring now to FIG. 14a, a state representation for determining a communication fault based upon expected communication and actual communication is next described. There are two primary states, the remote device communication fault determination state and the mobile device expected communication mode state. The mobile device expected communication mode state includes an active mode sub-state and an inactive mode sub-state. The inactive mode state, representative of tiered power saving modes for the mobile device further include two sub-states, a sleep state and a deep sleep state.

The remote device communication fault determination state and the mobile device expected communication mode state are asynchronous and may be concurrent or non-concurrent. The remote device communication fault determination state provides a determination of a potential communication fault by comparing the total number of expected communications from a plurality of mobile devices with the actual number of communications in a particular time frame sample.

The active mode occurs when a mobile device is fully powered up and operational. The active mode provides a first periodic frequency of communication, or a first expected communication for the remote device. In an embodiment of the invention, the first frequency of communication is every 100 seconds and persons skilled in the art will appreciate that the first frequency of communication may include other different values.

The inactive mode occurs when a mobile device is powered down into at least one power saving mode. The sleep sub-state or mode is a first power saving mode and it provides a second periodic frequency of communication, or second expected communication for the remote device. In an embodiment of the invention, the second frequency of communication is every 30 minutes, or 1800 seconds and persons skilled in the art will also appreciate that the second frequency of communication may include other different values. The deep sleep sub-state or mode is a second power saving mode and it provides a third periodic frequency of communication, or third expected communication for the remote device. In an embodiment of the invention, the second frequency of communication is every 24 hours, or 86,400 seconds and persons skilled in the art will also appreciate that the third frequency of communication may include other different values.

The three frequency of communications provide three known expected communication time frames, or thresholds for the remote device. The expected communication could be in the form of a signal, data, and/or a message dependent upon the mobile device. For example, if the mobile device is ready to communicate a log of data, the communication could be in the form of data. If the mobile device is not ready to communicate a log of data, the communication could be in the form of a message with a device id.

The remote device communication fault determination logic tracks and sums the expected connections based upon the mobile device expected communication mode states and as illustrated in Table 2 may include a plurality of mobile devices operating with the first frequency of communication, or a plurality of mobile devices operating with the second frequency of communication, or a plurality of mobile devices operating with the third frequency of communication as well as combinations of the first, second and third frequencies of communication.

TABLE 2

Example Expected Communication For A Number Of Mobile Devices.

| Fault Determination Time Frame | Active Mode Ignition State "ON" | Inactive Mode Ignition State "Off" | | Expected Connection Sum |
|---|---|---|---|---|
| | First Frequency Period Expected Communication Count (100 s) | Second Frequency Period Expected Communication Count (1800 s) | Third Frequency Period Expected Communication Count (82,400 s) | |
| 0001 | ✓ | | | 1 |
| 0002 | ✓ | ✓ | | 2 |
| 0003 | | ✓ | | 1 |
| 0004 | | | ✓ | 1 |
| 0005 | | ✓ | | 1 |
| 0006 | ✓ | ✓ | ✓ | 3 |
| 0007 | | ✓ | ✓ | 2 |
| 0008 | ✓ | | ✓ | 2 |
| 0009 | | | ✓ | 1 |
| 000n | | | | |

Figure 14B:
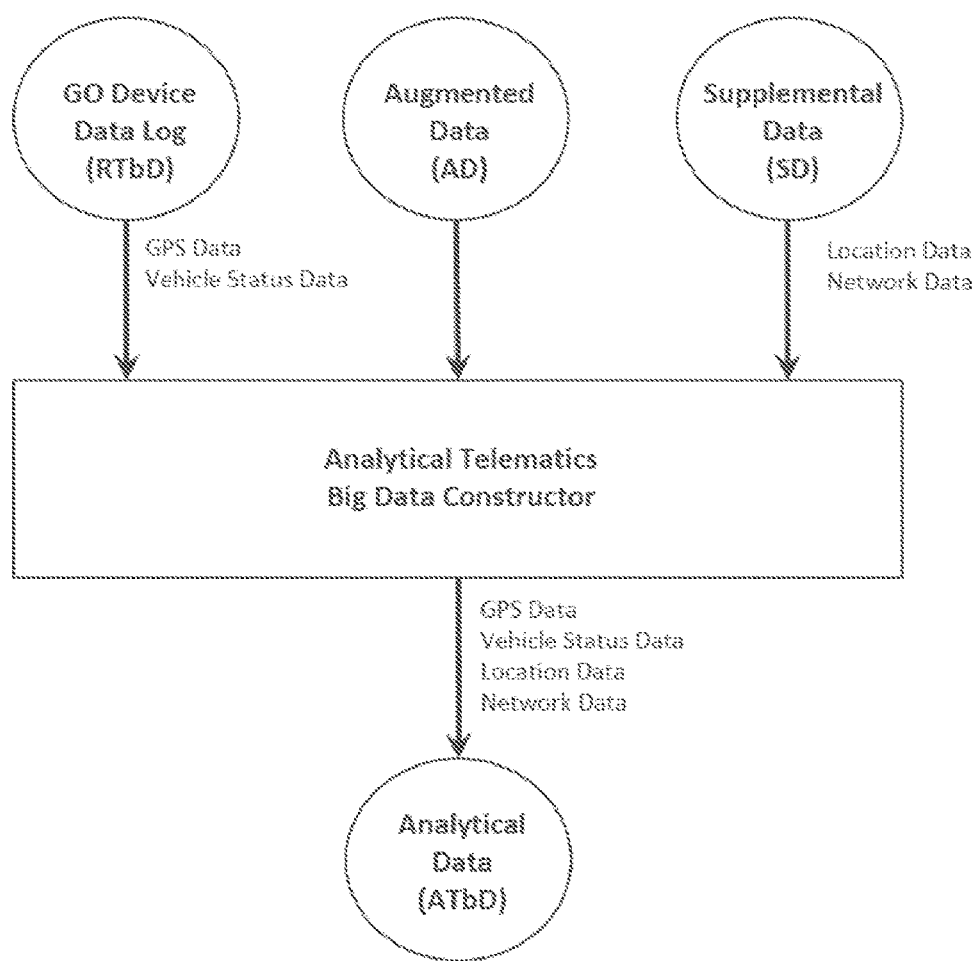
FIG. 14b, is a diagrammatic representation of data pre-processing for determining a network communication fault based upon expected communication and a period of actual communication.

Referring now to FIG. 14b, the data preprocessing for determining a communication fault based upon expected communication and a period of actual communication is described. Different types and categories of data are preprocessed in real time to create the analytical telematics big data (ATbD) used for determining a network communication fault. The preprocessing may be with a special purpose server 19, or another computing device 20. The GO device data log (RTbD) is historical data over a period of time and includes at least one GPS data and an indication of the vehicle status. The supplemental data (SD) includes location data and network data. The GO device data log (RTbD) is combined with the supplemental data (SD) to form the analytical data (ATbD). The supplemental data may be sourced internally with the system or externally to the system. In an embodiment of the invention the, the GPS data is in the form of latitude and longitude coordinates, including a time indication, and the vehicle status data is an engine on or off indication or another indication representative of an active mode and inactive mode for the mobile device. In an embodiment of the invention, the location data may include at least one of a postal code, a ZIP code, a street address, a road indication, a highway indication, a name, contact information or a phone number. In an embodiment of the invention, the network data may include at least one of a service provider name, a network area, a network zone or a network cell indication.

The preprocessing of data may include an auto scale capability to balance the real time streaming of the data. In embodiments of the invention, the auto scale capability may be a buffer, a double buffer or a combination of a buffer and double buffer.

Figure 15:
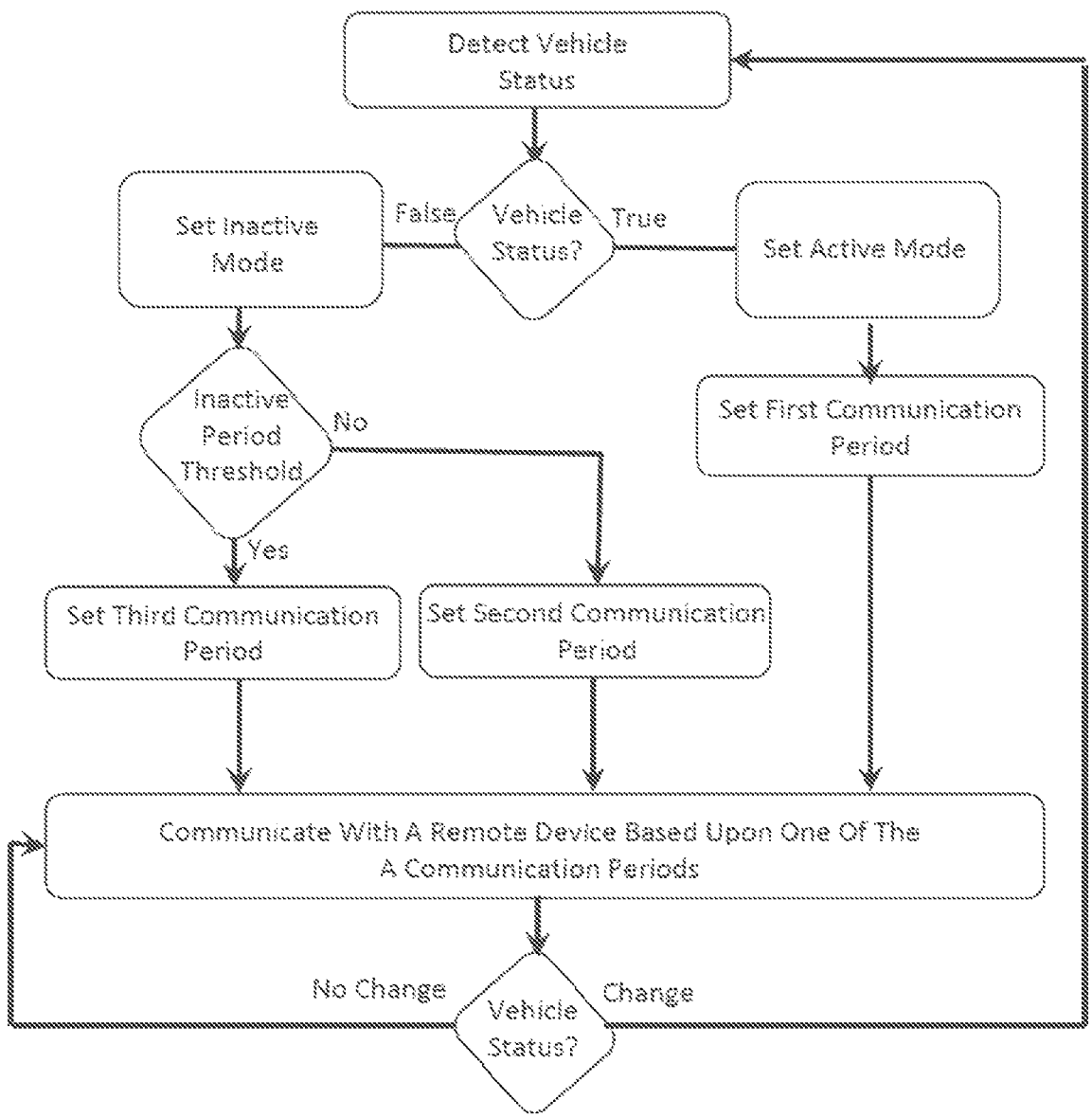
FIG. 15 is a diagrammatic representation of expected communication period determination logic for a mobile device.

Referring now to FIG. 15, the mobile device expected communication period determination logic is described. The mobile device detects the vehicle status. In an embodiment of the invention, the detection occurs between the interface 36 of the vehicular telemetry hardware system 30 and the vehicle network communications bus 37. After the vehicle status has been detected, the vehicle status is checked to determine if the status is true or false. In an embodiment of the invention, the vehicle status is a code for "ignition on" and if the status is "on", the check is true or if the status is "off", the check is false. If the check is true, then the active mode is set to indicate a first communication period.

If the check is false, then the inactive mode is set. For the case wherein there are a plurality of power saving modes, a subsequent check is made with respect to an inactive period threshold. If the threshold has not been reached (indicative of a first power saving mode), then a second communication period is set. If the threshold has been reached (indicative of a second power saving mode), then a third communication period is set.

Once the first or second or third communication periods have been set or re-set between the periods based upon the logic, the mobile device communicates with a remote device based upon one of the communication periods as an expected communication. The vehicle status is checked to determine if the vehicle status has changed. Then, the mobile device expected communication period determination logic is executed in each mobile device. In an embodiment of the invention, the mobile device expected communication period determination logic is also a first asynchronous process.

Figure 16A:
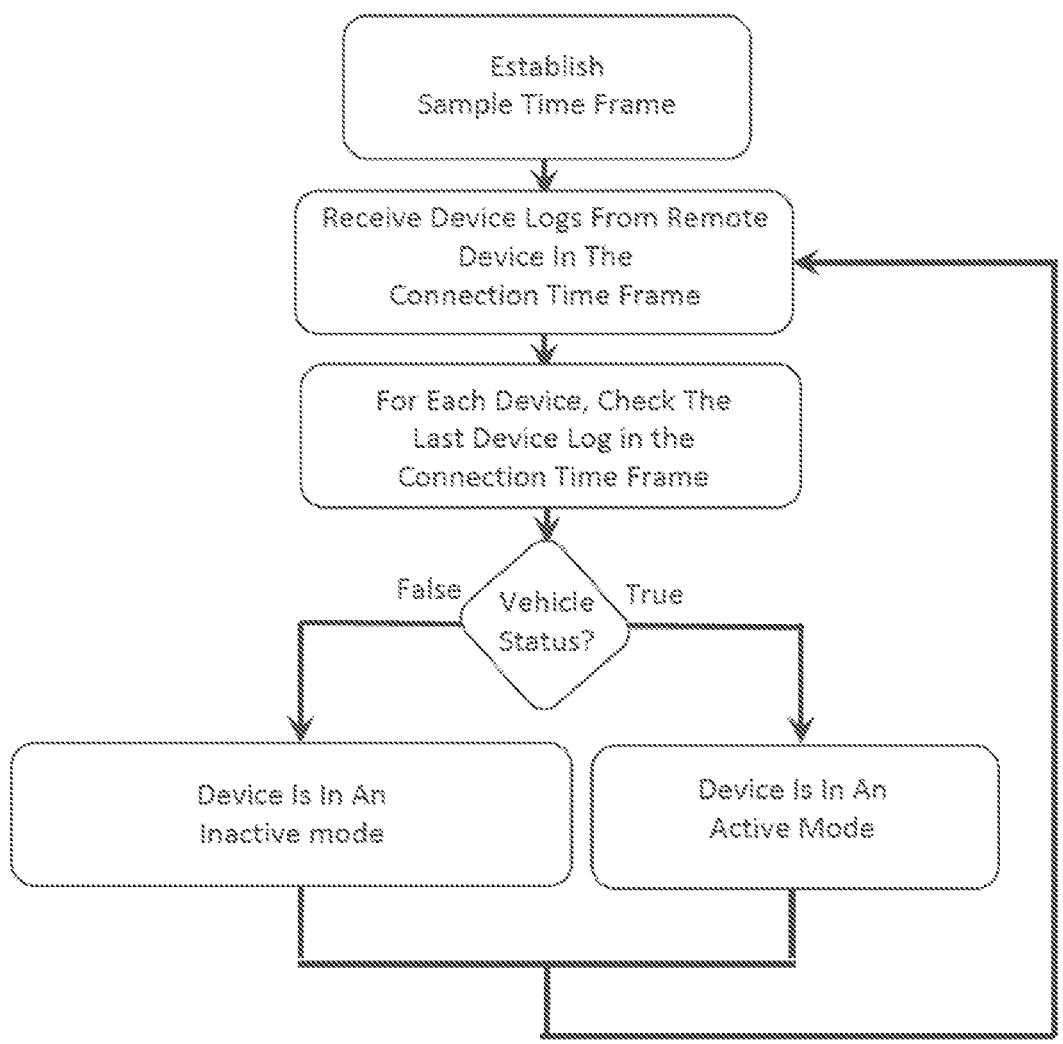
FIG. 16a is a diagrammatic representation of the remote device logic for determining the active or inactive state of each mobile device.

Referring now to FIG. 16a, the remote device active/inactive determination logic for each mobile device is next described. The remote device establishes a sample time frame or timing to check and determine the presence of one or more communication faults. Then, the remote device receives mobile device logs of data from each of the remote devices within the sample time frame. For each device log of data, the previous log is decoded to identify the vehicle status indicator from the log. If the vehicle status is true, then the remote device determines the mobile device is in an active mode. If the vehicle status is false, then the remote device determines the mobile device is in an inactive mode. The remote device may then track each mobile device and the corresponding state of active or inactive.

Figure 16B:
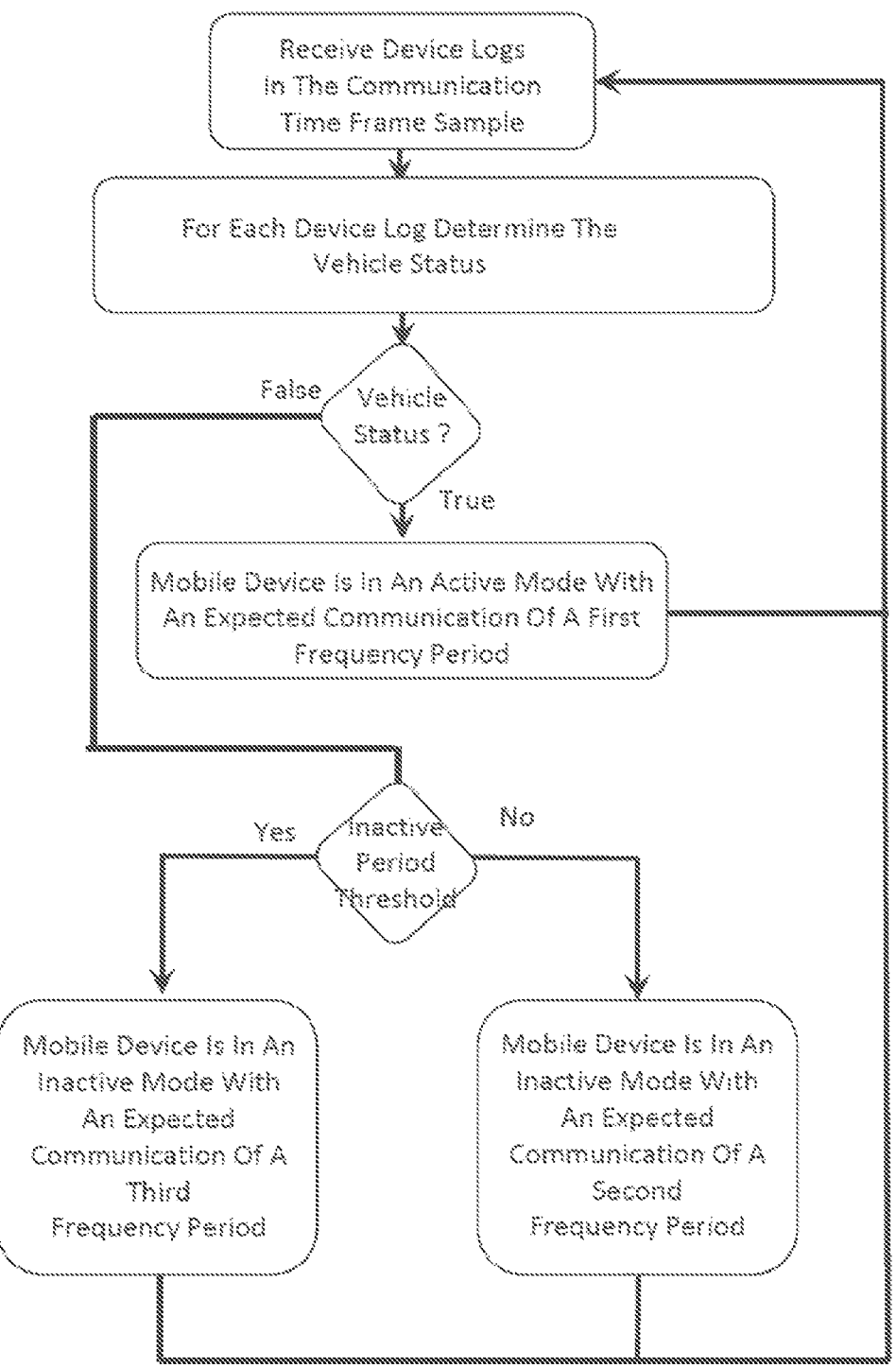
FIG. 16b is a diagrammatic representation of the remote device logic for determining the expected communication for each mobile device.

Referring now to FIG. 16b, the remote device expected communication determination logic for each mobile device is described. The remote device receives a plurality of mobile device logs of data within the communication time frame sample. For each log of data, the vehicle status is determined. If the vehicle status is true, then the mobile device is in an active mode with an expected communication of a first frequency period. If the vehicle status if false, then the inactive period threshold is checked. If the threshold has not been reached, then the mobile device is in an inactive mode with an expected communication of a second frequency period. If the threshold has been reached, then the mobile device is in an inactive mode with an expected communication of a third frequency period. The remote device tracks each mobile device mode, expected communication and frequency period for use and comparison with receipt of the next set of mobile device logs in the next communication time frame sample for comparison with the next number of actual communications from the mobile devices.

In an embodiment of the invention, the remote device active/inactive determination logic for each mobile device and the remote device expected communication period determination logic are also a second asynchronous concurrent process.

Figure 16C:
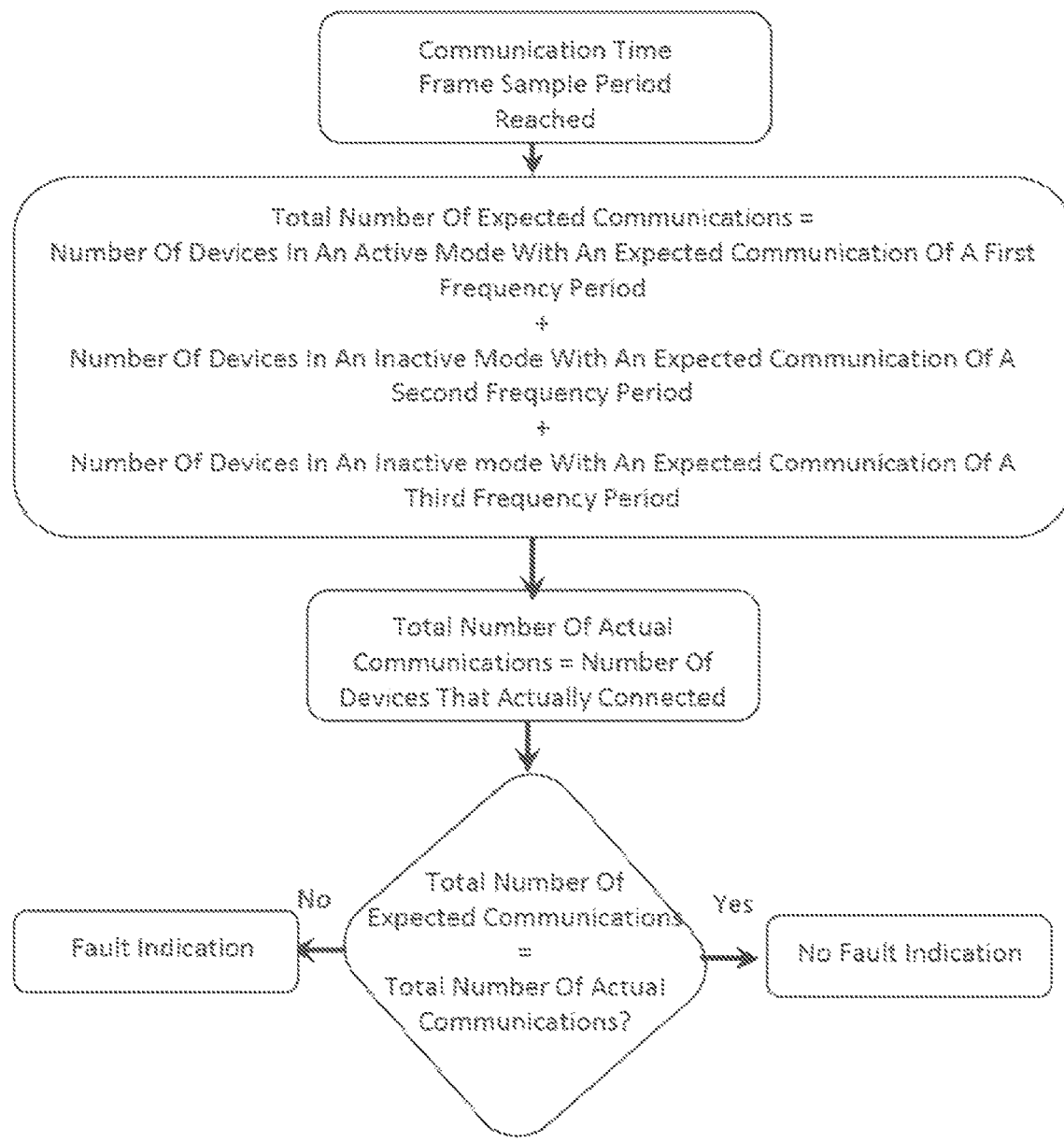
FIG. 16c is a diagrammatic representation of the remote device logic for determining a fault based upon the expected communication and the actual communication.

Referring now to FIG. 16c, the remote device expected and actual communication fault determination logic is described. When the communication time frame sample period has been reached, determine the total number of expected connections. The total number of expected connections is the sum of the number of mobile devices in an active mode with an expected connection of a first frequency period plus the number of mobile devices in an inactive mode with an expected connection of a second frequency period. Alternatively, the total number of expected connections may also include the number of devices in an inactive mode with an expected connection of a third frequency period.

A comparison is made with respect to the total number of actual connections with the number of mobile devices that actually connected. When the total number of expected connections is equal to the total number of actual connections, there is no fault with the communications. When the total number of expected connections is not equal to the total number of actual connections, there is a fault with the communications. When there is a fault with the communications, for each mobile device that did not connect, access the augmented GPS coordinates from the data and compare with the coordinates with a network zone, or area or cell to determine the location of the fault in the network.

Figure 17:
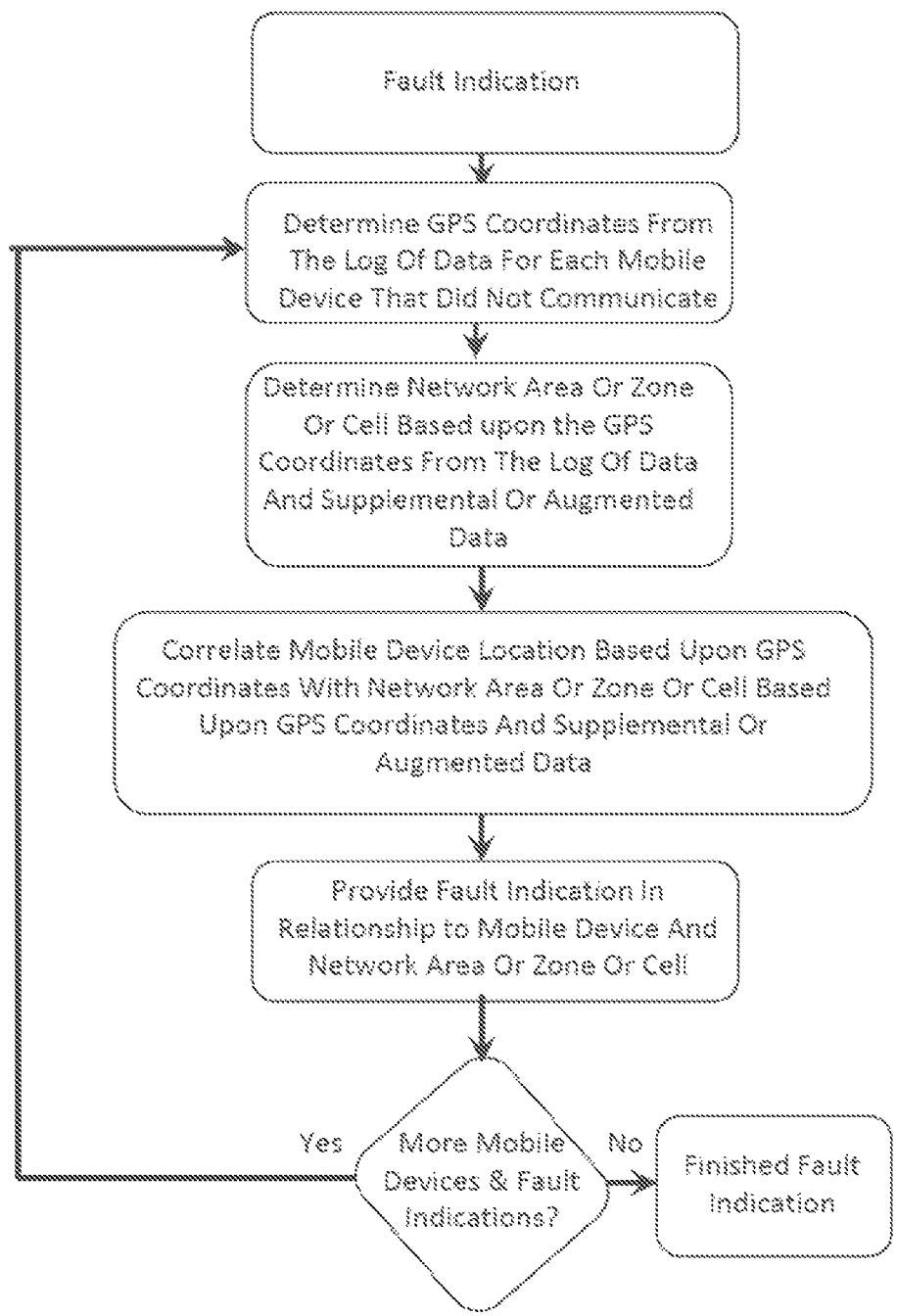
FIG. 17 is a diagrammatic representation of the remote device network communication fault indication logic.

Referring now to FIG. 17, the remote device network communication fault determination logic is described. For each communication fault determination associated with a mobile device, determine the augmented GPS coordinates from the data for the mobile device that was expected to communicate and did not communicate. Determine the network area or zone or cell based upon the augmented GPS coordinates from the data. Alternatively, determine the network area or zone or cell based upon the GPS coordinates from the log of data and supplemental data or augmented data. Correlate the mobile device location based upon the GPS coordinates with the network area or zone or cell based upon the GPS coordinates of the mobile device or alternatively the GPS coordinates and the supplemental data or augmented data. Provide a fault indication in relationship to each mobile device that did not communicate and the network area or zone or cell. Repeat for each mobile device that did not communicate when expected to communicate.

The fault indication may be in the form of a graphic indication on the map 50 identifying the mobile device(s) and the associated network area or zone or cell. Alternatively, the fault indication may be a textual message or an audio message indicating the fault and associated network area or zone or cell or report.

Summary

In summary, the big telematics data network communication fault identification system includes a number of specialized computing components based upon hardware, firmware, software, mobile devices, remote devices, telematics technology and telecommunications technology. Embodiments of the present invention, including the devices, system and methods, individually and/or collectively provide one or more technical effects. Ability to provide deeper business insight and analysis in real time based upon the faster availability of the analytical real time telematics big data. Improving the network communication fault determination response time based upon access in real time to analytical real time telematics big data (ATbD). Faster access to analytical telematics big data (ATbD) and a shorter cycle time to network communication fault information. Access to a diverse set of multi-petabytes of data in a single cloud data source to support network communication fault determination analytics. Real time telematics big data that may incorporate translation data and alter data in the transformation to analytical telematics big data (ATbD). Real time telematics big data that may further incorporate augmentation data and alter data in the transformation to analytical telematics big data (ATbD). In an example embodiment of the invention, identifying unpredictable network communication fault determination issues. A device, system and methods capable of pre-processing raw telematics big data (RTbD) logs in real time according to the specific needs and requirements for specific data types contained in the logs.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

What is claimed is:

1. At least one non-transitory computer-readable storage medium storing processor-executable instructions that, when executed by at least one processor of a remote device, cause the at least one processor to perform a method for monitoring faults in one or more network zones, the method comprising:
    determining, by the at least one processor of the remote device, an expected communication rate for a network zone, wherein determining the expected communication rate comprises:
        determining a device expected communication rate for a mobile device disposed in the network zone based on a state of the mobile device, wherein the mobile device is associated with a vehicle; and
        determining the expected communication rate for the network zone based on the device expected communication rate determined for the mobile device disposed in the network zone; and
    determining, by the at least one processor of the remote device, whether the network zone is experiencing a fault, wherein determining whether the network zone is experiencing a fault comprises:
        comparing for a first time frame an actual communication rate for the network zone, reflecting communications from the mobile device disposed in the network zone, to said expected communication rate for the network zone; and
        indicating the fault in the network zone when said actual communication rate is not equal to said expected communication rate within said first time frame.

2. The least one non-transitory computer-readable storage medium of claim 1, wherein determining the device expected communication rate for the mobile device comprises determining a vehicle status of the vehicle associated with the mobile device.

3. The least one non-transitory computer-readable storage medium of claim 2, wherein determining the vehicle status comprises receiving, from the mobile device, an indication of the vehicle status.

4. The least one non-transitory computer-readable storage medium of claim 3, wherein said vehicle status is an ignition status indication for the vehicle.

5. The least one non-transitory computer-readable storage medium of claim 1, wherein determining the device expected communication rate comprises:
    setting the device expected communication rate for the mobile device to a first rate when the mobile device is in an active state, and
    setting the device expected communication rate for the mobile device to one of at least one lower rate lower than the first rate when the mobile device is in an inactive state.

6. The least one non-transitory computer-readable storage medium of claim 5, wherein said first rate is at least one communication with said remote device in each of at least one period of 100 seconds.

7. The least one non-transitory computer-readable storage medium of claim 6, wherein said inactive state includes a sleep state associated with a second rate of the at least one lower rate, and the second rate is at least one communication with said remote device in each of at least one period of 1800 seconds.

8. The least one non-transitory computer-readable storage medium of claim 7, wherein said inactive state includes a deep sleep state associated with a third rate of the at least one lower rate, the third rate is lower than the second rate, and the third rate is at least one communication with said remote device in each of at least one period of 86,400 seconds.

9. The least one non-transitory computer-readable storage medium of claim 5, wherein:
    the method further comprises in response to determining that the mobile device is in an inactive state, determining whether the mobile device is in a first power saving mode or a second power saving mode.

10. The least one non-transitory computer-readable storage medium of claim 9, wherein:
    setting the device expected communication rate to one of the at least one lower rate comprises:
        setting the device expected communication rate to a second rate, of the at least one lower rate, in response to determining that the mobile device is in the first power saving mode; and
        setting the device expected communication rate to a third rate, of the at least one lower rate, that is lower than the second rate, in response to determining that the mobile device is in the second power saving mode.

11. The least one non-transitory computer-readable storage medium of claim 10, wherein determining whether the mobile device is in the first power saving mode or the second power saving mode comprises:
    determining that the mobile device is in the first power saving mode in response to determining that the mobile device is in the inactive state; and
    determining that the mobile device is in the second power saving mode in response to determining that more than a threshold period of time has elapsed since the mobile device was determined to be in the inactive state.

12. The least one non-transitory computer-readable storage medium of claim 1, wherein:
    one or more mobile devices are disposed in the network zone;

determining the expected communication rate for the network zone comprises determining, for each time frame of a plurality of time frames and based upon the device expected communication rate for each mobile device of the one or more mobile devices, a total number of communications expected to be received in the time frame from the one or more mobile devices, the plurality of time frames including the first time frame;

the method further comprises determining the actual communication rate for the network zone for the first time frame, wherein determining the actual communication rate comprises determining a total number of communications received in the first time frame from the one or more mobile devices; and comparing for the first time frame the actual communication rate for the network zone to said expected communication rate comprises comparing the actual communication rate for the first time frame to the expected communication rate determined for the first time frame.

13. The least one non-transitory computer-readable storage medium of claim 12, further comprising:
indicating the fault in the network zone when said actual communication rate is not equal to said expected communication rate within said first time frame.

14. The least one non-transitory computer-readable storage medium of claim 12, wherein:
the expected communication rate relates to a total number of network connections expected to be established by the one or more mobile devices disposed within the network zone within a period of time;
the device expected communication rate relates to a total number of network connections expected to be established by the mobile device disposed within the network zone within the period of time; and
the actual communication rate relates to a total number of network connections established by the one or more mobile devices within the period of time.

15. A remote device comprising:
at least one processor; and
at least one non-transitory computer-readable storage medium storing processor-executable instructions that, when executed by the at least one processor, cause the at least one processor to perform a method for monitoring faults in one or more network zones, the method comprising:
determining, by the at least one processor, an expected communication rate for a network zone, wherein determining the expected communication rate comprises:
determining a device expected communication rate for a mobile device disposed in the network zone based on a state of the mobile device, wherein the mobile device is associated with a vehicle; and
determining the expected communication rate for the network zone based on the device expected communication rate determined for the mobile device disposed in the network zone; and
determining, by the at least one processor, whether the network zone is experiencing a fault, wherein determining whether the network zone is experiencing a fault comprises:
comparing for a first time frame an actual communication rate for the network zone, reflecting communications from the mobile device disposed in the network zone, to said expected communication rate for the network zone; and
indicating the fault in the network zone when said actual communication rate is not equal to said expected communication rate within said first time frame.

16. The remote device of claim 15, wherein determining the device expected communication rate for the mobile device comprises determining a vehicle status of the vehicle associated with the mobile device.

17. The remote device of claim 15, wherein determining the device expected communication rate comprises:
setting the device expected communication rate for the mobile device to a first rate when the mobile device is in an active state, and
setting the device expected communication rate for the mobile device to one of at least one lower rate lower than the first rate when the mobile device is in an inactive state.

18. The remote device of claim 17, wherein:
the method further comprises in response to determining that the mobile device is in the inactive state, determining whether the mobile device is in a first power saving mode or a second power saving mode.

19. The remote device of claim 18, wherein:
setting the device expected communication rate to one of the at least one lower rate comprises:
setting the device expected communication rate to a second rate, of the at least one lower rate, in response to determining that the mobile device is in the first power saving mode; and
setting the device expected communication rate to a third rate, of the at least one lower rate, that is lower than the second rate, in response to determining that the mobile device is in the second power saving mode.

20. The remote device of claim 19, wherein determining whether the mobile device is in the first power saving mode or the second power saving mode comprises:
determining that the mobile device is in the first power saving mode in response to determining that the mobile device is in the inactive state; and
determining that the mobile device is in the second power saving mode in response to determining that more than a threshold period of time has elapsed since the mobile device was determined to be in the inactive state.

21. The remote device of claim 15, wherein:
one or more mobile devices are disposed in the network zone;
determining the expected communication rate for the network zone comprises determining, for each time frame of a plurality of time frames and based upon the device expected communication rate for each mobile device of the one or more mobile devices, a total number of communications expected to be received in the time frame from the one or more mobile devices, the plurality of time frames including the first time frame;
the method further comprises determining the actual communication rate for the network zone for the first time frame, wherein determining the actual communication rate comprises determining a total number of communications received in the first time frame from the one or more mobile devices;
comparing for the first time frame the actual communication rate for the network zone to said expected communication rate comprises comparing the actual communication rate for the first time frame to the expected communication rate determined for the first time frame; and indicating the fault in the network zone when said actual communication rate is not equal to said expected communication rate within said first time frame.

22. The remote device of claim 15, wherein the method further comprises:

determining a location of the fault in the network zone based at least in part on position information of the mobile device, wherein the mobile device includes a positional device configured to provide the position information of the mobile device; and providing a fault indication in response to determining that the network zone is experiencing the fault, the fault indication identifying the location of the fault in the network zone.

* * * * *